(12) United States Patent
Drebin et al.

(10) Patent No.: US 7,034,828 B1
(45) Date of Patent: Apr. 25, 2006

(54) RECIRCULATING SHADE TREE BLENDER FOR A GRAPHICS SYSTEM

(75) Inventors: Robert A. Drebin, Palo Alto, CA (US); Timothy J. Van Hook, Atherton, CA (US); Patrick Y. Law, Milpitas, CA (US); Mark M. Leather, Saratoga, CA (US); Matthew Komsthoeft, Santa Clara, CA (US)

(73) Assignee: Nintendo Co., Ltd., Kyoto (JP)

(*) Notice: Subject to any disclaimer, the term of this patent is extended or adjusted under 35 U.S.C. 154(b) by 271 days.

(21) Appl. No.: 09/722,367

(22) Filed: Nov. 28, 2000

Related U.S. Application Data

(60) Provisional application No. 60/226,888, filed on Aug. 23, 2000.

(51) Int. Cl.
G06T 15/60 (2006.01)

(52) U.S. Cl. .............. 345/426; 345/506; 345/582; 345/589; 345/519; 345/552

(58) Field of Classification Search ............ 345/419, 345/423, 426, 582, 422, 506, 552, 584, 586, 345/589, 522, 519
See application file for complete search history.

(56) References Cited

U.S. PATENT DOCUMENTS

| | | | |
|---|---|---|---|
| 4,275,413 A | 6/1981 | Sakamoto et al. |
| 4,357,624 A | 11/1982 | Greenberg |
| 4,388,620 A | 6/1983 | Sherman |
| 4,425,559 A | 1/1984 | Sherman |
| 4,463,380 A | 7/1984 | Hooks, Jr. |
| 4,491,836 A | 1/1985 | Collmeyer et al. |
| 4,570,233 A | 2/1986 | Yan et al. |
| 4,586,038 A | 4/1986 | Sims et al. |
| 4,600,919 A | 7/1986 | Stern |
| 4,601,055 A | 7/1986 | Kent |

(Continued)

FOREIGN PATENT DOCUMENTS

| | | |
|---|---|---|
| CA | 2070934 | 12/1993 |
| CA | 2147846 | 3/1995 |
| CA | 2294233 | 1/1999 |
| EP | 0 637 813 A2 | 2/1995 |
| EP | 0 837 429 A | 4/1998 |
| EP | 1 074 945 | 2/2001 |
| EP | 1 075 146 | 2/2001 |
| EP | 1 081 649 | 3/2001 |
| JP | 9-330230 | 12/1997 |
| JP | 11053580 | 2/1999 |

(Continued)

OTHER PUBLICATIONS

Photograph of Sony PlayStation II System.
Photograph of Sega Dreamcast System.
Photograph of Nintendo 64 System.
Whitepaper: 3D Graphics Demystified, Nov. 11, 1999 www.nvidia.com.
Whitepaper: "Z Buffering, Interpolation and More W–Buffering", Doug Rogers, Jan. 31, 2000, www.nvidia.com.

(Continued)

Primary Examiner—Mark Zimmerman
Assistant Examiner—Kimbinh T. Nguyen
(74) Attorney, Agent, or Firm—Nixon & Vanderhye P.C.

(57) ABSTRACT

A hardware-accelerated recirculating programmable texture blender/shader arrangement circulates computed color and alpha data over multiple texture blending/shading cycles (stages) to provide multi-texturing and other effects. Up to sixteen independently programmable consecutive stages, forming a chain of blending operations, are supported for applying multiple textures to a single object in a single rendering pass.

47 Claims, 20 Drawing Sheets

U.S. PATENT DOCUMENTS

| | | |
|---|---|---|
| 4,615,013 A | 9/1986 | Yan et al. |
| 4,625,289 A | 11/1986 | Rockwood |
| 4,653,012 A | 3/1987 | Duffy et al. |
| 4,658,247 A | 4/1987 | Gharachorloo |
| 4,692,880 A | 9/1987 | Merz et al. |
| 4,695,943 A | 9/1987 | Keeley et al. |
| 4,710,876 A | 12/1987 | Cline et al. |
| 4,725,831 A | 2/1988 | Coleman |
| 4,768,148 A | 8/1988 | Keeley et al. |
| 4,785,395 A | 11/1988 | Keeley |
| 4,790,025 A | 12/1988 | Inoue et al. |
| 4,808,988 A | 2/1989 | Burke et al. |
| 4,812,988 A | 3/1989 | Duthuit et al. |
| 4,817,175 A | 3/1989 | Tenenbaum et al. |
| 4,829,295 A | 5/1989 | Hiroyuki |
| 4,829,452 A | 5/1989 | Kang et al. |
| 4,833,601 A | 5/1989 | Barlow et al. |
| 4,855,934 A | 8/1989 | Robinson |
| 4,862,392 A | 8/1989 | Steiner |
| 4,866,637 A | 9/1989 | Gonzalez-Lopez et al. |
| 4,888,712 A | 12/1989 | Barkans et al. |
| 4,897,806 A | 1/1990 | Cook et al. |
| 4,901,064 A | 2/1990 | Deering |
| 4,907,174 A | 3/1990 | Priem |
| 4,914,729 A | 4/1990 | Omori et al. |
| 4,918,625 A | 4/1990 | Yan |
| 4,935,879 A | 6/1990 | Ueda |
| 4,945,500 A | 7/1990 | Deering |
| 4,965,751 A | 10/1990 | Thayer et al. |
| 4,974,176 A | 11/1990 | Buchner et al. |
| 4,974,177 A | 11/1990 | Nishiguchi |
| 4,975,977 A | 12/1990 | Kurosu et al. |
| 4,989,138 A | 1/1991 | Radochonski |
| 4,996,666 A | 2/1991 | Duluk, Jr. |
| 5,003,496 A | 3/1991 | Hunt, Jr. et al. |
| 5,016,183 A | 5/1991 | Shyong |
| 5,018,076 A | 5/1991 | Johary et al. |
| 5,043,922 A | 8/1991 | Matsumoto |
| 5,056,044 A | 10/1991 | Frederickson et al. |
| 5,062,057 A | 10/1991 | Blacken et al. |
| 5,086,495 A | 2/1992 | Gray et al. |
| 5,091,967 A | 2/1992 | Ohsawa |
| 5,097,427 A | 3/1992 | Lathrop et al. |
| 5,136,664 A | 8/1992 | Bersack et al. |
| 5,144,291 A | 9/1992 | Nishizawa |
| 5,163,126 A | 11/1992 | Einkauf et al. |
| 5,170,468 A | 12/1992 | Shah et al. |
| 5,179,638 A | 1/1993 | Dawson et al. |
| 5,204,944 A | 4/1993 | Wolberg et al. |
| 5,224,208 A | 6/1993 | Miller, Jr. et al. |
| 5,239,624 A | 8/1993 | Cook et al. |
| 5,241,658 A | 8/1993 | Masterson et al. |
| 5,255,353 A | 10/1993 | Itoh |
| 5,268,995 A | 12/1993 | Diefendorff et al. |
| 5,268,996 A | 12/1993 | Steiner et al. |
| 5,278,948 A | 1/1994 | Luken, Jr. |
| 5,293,235 A | 3/1994 | Guede et al. |
| 5,307,450 A | 4/1994 | Grosssman |
| 5,315,692 A | 5/1994 | Hansen et al. |
| 5,345,541 A | 9/1994 | Kelley et al. |
| 5,353,424 A | 10/1994 | Partovi et al. |
| 5,357,579 A | 10/1994 | Buchner et al. |
| 5,361,386 A | 11/1994 | Watkins et al. |
| 5,363,475 A | 11/1994 | Baker et al. |
| 5,377,313 A | 12/1994 | Scheibl |
| 5,392,385 A | 2/1995 | Evangelisti et al. |
| 5,392,393 A | 2/1995 | Deering |
| 5,394,516 A | 2/1995 | Winser |
| 5,402,532 A | 3/1995 | Epstein et al. |
| 5,404,445 A | 4/1995 | Matsumoto |
| 5,408,650 A | 4/1995 | Arsenault |
| 5,412,796 A | 5/1995 | Olive |
| 5,415,549 A | 5/1995 | Logg |
| 5,416,606 A | 5/1995 | Katayama et al. |
| 5,421,028 A | 5/1995 | Swanson |
| 5,422,997 A | 6/1995 | Nagashima |
| 5,432,895 A | 7/1995 | Myers |
| 5,432,900 A | 7/1995 | Rhodes et al. |
| 5,438,663 A | 8/1995 | Matsumoto et al. |
| 5,448,689 A | 9/1995 | Matsuo et al. |
| 5,457,775 A | 10/1995 | Johnson, Jr. et al. |
| 5,461,712 A | 10/1995 | Chelstowski et al. |
| 5,467,438 A | 11/1995 | Nishio et al. |
| 5,467,459 A | 11/1995 | Alexander et al. |
| 5,469,535 A | 11/1995 | Jarvis et al. |
| 5,473,736 A | 12/1995 | Young |
| 5,475,803 A | 12/1995 | Stearns et al. |
| 5,481,669 A | 1/1996 | Poulton et al. |
| 5,487,146 A | 1/1996 | Guttag et al. |
| 5,490,240 A | 2/1996 | Foran et al. |
| 5,495,563 A | 2/1996 | Winser |
| 5,504,499 A | 4/1996 | Horie et al. |
| 5,504,917 A | 4/1996 | Austin |
| 5,506,604 A | 4/1996 | Nally et al. |
| 5,535,288 A | 7/1996 | Chen et al. |
| 5,535,374 A | 7/1996 | Olive |
| 5,543,824 A | 8/1996 | Priem et al. |
| 5,544,292 A | 8/1996 | Winser |
| 5,548,709 A | 8/1996 | Hannah et al. |
| 5,553,228 A | 9/1996 | Erb et al. |
| 5,557,712 A | 9/1996 | Guay |
| 5,559,954 A | 9/1996 | Sakoda et al. |
| 5,561,746 A | 10/1996 | Murata et al. |
| 5,561,752 A | 10/1996 | Jevans |
| 5,563,989 A | 10/1996 | Billyard |
| 5,566,285 A | 10/1996 | Okada |
| 5,572,634 A | 11/1996 | Duluk, Jr. |
| 5,573,402 A | 11/1996 | Gray |
| 5,574,835 A | 11/1996 | Duluk, Jr. et al. |
| 5,579,456 A | 11/1996 | Cosman |
| 5,582,451 A | 12/1996 | Baumann |
| 5,586,234 A | 12/1996 | Sakuraba et al. |
| 5,593,350 A | 1/1997 | Bouton et al. |
| 5,594,854 A | 1/1997 | Baldwin et al. |
| 5,596,686 A | 1/1997 | Duluk, Jr. et al. |
| 5,600,763 A | 2/1997 | Greene et al. |
| 5,606,650 A | 2/1997 | Kelley et al. |
| 5,607,157 A | 3/1997 | Nagashima |
| 5,608,424 A | 3/1997 | Takahashi et al. |
| 5,608,864 A | 3/1997 | Bindlish et al. |
| 5,616,031 A | 4/1997 | Logg |
| 5,621,867 A | 4/1997 | Murata et al. |
| 5,628,686 A | 5/1997 | Svancarek et al. |
| 5,638,535 A | 6/1997 | Rosenthal et al. |
| 5,644,364 A | 7/1997 | Kurtze et al. |
| 5,649,082 A | 7/1997 | Burns |
| 5,650,955 A | 7/1997 | Puar et al. |
| 5,651,104 A | 7/1997 | Cosman |
| 5,657,045 A | 8/1997 | Katsura et al. |
| 5,657,443 A | 8/1997 | Krech, Jr. |
| 5,657,478 A | 8/1997 | Recker et al. |
| 5,659,671 A | 8/1997 | Tannenbaum et al. |
| 5,659,673 A | 8/1997 | Nonoshita |
| 5,659,715 A | 8/1997 | Wu et al. |
| 5,664,162 A | 9/1997 | Dye |
| 5,666,439 A | 9/1997 | Ishida et al. |
| 5,669,010 A | 9/1997 | Duluk, Jr. |
| 5,678,037 A | 10/1997 | Osugi et al. |
| 5,682,522 A | 10/1997 | Huang et al. |
| 5,684,941 A | 11/1997 | Dye |
| 5,687,304 A | 11/1997 | Kiss |

| | | | | | |
|---|---|---|---|---|---|
| 5,687,357 A | 11/1997 | Priem | 5,838,334 A | 11/1998 | Dye |
| 5,691,746 A | 11/1997 | Shyu | 5,844,576 A | 12/1998 | Wilde et al. |
| 5,694,143 A | 12/1997 | Fielder et al. | 5,850,229 A | 12/1998 | Edelsbrunner et al. |
| 5,696,892 A | 12/1997 | Redmann et al. | 5,856,829 A | 1/1999 | Gray, III et al. |
| 5,701,444 A | 12/1997 | Baldwin | 5,859,645 A | 1/1999 | Latham |
| 5,703,806 A | 12/1997 | Puar et al. | 5,861,888 A | 1/1999 | Dempsey |
| 5,706,481 A | 1/1998 | Hannah et al. | 5,861,893 A | 1/1999 | Strugess |
| 5,706,482 A | 1/1998 | Matsushima et al. | 5,867,166 A * | 2/1999 | Myhrvold et al. .......... 345/419 |
| 5,714,981 A | 2/1998 | Scott-Jackson et al. | 5,870,097 A | 2/1999 | Snyder et al. |
| 5,721,947 A | 2/1998 | Priem et al. | 5,870,098 A | 2/1999 | Gardiner |
| 5,724,561 A | 3/1998 | Tarolli et al. | 5,870,102 A | 2/1999 | Tarolli et al. |
| 5,726,689 A | 3/1998 | Negishi et al. | 5,870,109 A | 2/1999 | McCormack et al. |
| 5,726,947 A | 3/1998 | Yamazaki et al. | 5,870,587 A | 2/1999 | Danforth et al. |
| 5,727,192 A | 3/1998 | Baldwin | 5,872,902 A | 2/1999 | Kuchkuda et al. |
| 5,734,386 A | 3/1998 | Cosman | 5,874,969 A | 2/1999 | Storm et al. |
| 5,739,819 A | 4/1998 | Bar-Nahum | 5,877,741 A | 3/1999 | Chee et al. |
| 5,740,343 A | 4/1998 | Tarolli et al. | 5,877,770 A | 3/1999 | Hanaoka |
| 5,740,383 A | 4/1998 | Nally et al. | 5,877,771 A | 3/1999 | Drebin et al. |
| 5,740,406 A | 4/1998 | Rosenthal et al. | 5,880,736 A | 3/1999 | Peercy et al. |
| 5,742,749 A | 4/1998 | Foran et al. | 5,880,737 A | 3/1999 | Griffen et al. |
| 5,742,788 A | 4/1998 | Priem et al. | 5,883,638 A | 3/1999 | Rouet et al. |
| 5,745,118 A | 4/1998 | Alcorn et al. | 5,886,701 A | 3/1999 | Chauvin et al. |
| 5,745,125 A | 4/1998 | Deering et al. | 5,886,705 A | 3/1999 | Lentz |
| 5,748,199 A | 5/1998 | Palm | 5,887,155 A | 3/1999 | Laidig |
| 5,748,986 A | 5/1998 | Butterfield et al. | 5,890,190 A | 3/1999 | Rutman |
| 5,751,291 A | 5/1998 | Olsen et al. | 5,892,517 A | 4/1999 | Rich |
| 5,751,292 A | 5/1998 | Emmot | 5,892,974 A | 4/1999 | Koizumi et al. |
| 5,751,295 A | 5/1998 | Becklund et al. | 5,894,300 A | 4/1999 | Takizawa |
| 5,751,930 A | 5/1998 | Katsura et al. | 5,900,881 A | 5/1999 | Ikedo |
| 5,754,191 A | 5/1998 | Mills et al. | 5,903,283 A | 5/1999 | Selwan et al. |
| 5,757,382 A | 5/1998 | Lee | 5,909,218 A | 6/1999 | Naka et al. |
| 5,758,182 A | 5/1998 | Rosenthal et al. | 5,909,225 A | 6/1999 | Schinnerer et al. |
| 5,760,783 A | 6/1998 | Migdal et al. | 5,912,675 A | 6/1999 | Laperriere |
| 5,764,228 A | 6/1998 | Baldwin | 5,912,676 A | 6/1999 | Malladi et al. |
| 5,764,237 A | 6/1998 | Kaneko | 5,914,721 A | 6/1999 | Lim |
| 5,764,243 A | 6/1998 | Baldwin | 5,914,725 A | 6/1999 | Mcinnis et al. |
| 5,767,856 A | 6/1998 | Peterson et al. | 5,914,729 A | 6/1999 | Lippincott |
| 5,767,858 A | 6/1998 | Kawase et al. | 5,917,496 A | 6/1999 | Fujita et al. |
| 5,768,626 A | 6/1998 | Munson et al. | 5,920,326 A | 7/1999 | Rentschler et al. |
| 5,768,629 A | 6/1998 | Wise et al. | 5,920,876 A | 7/1999 | Ungar et al. |
| 5,774,133 A | 6/1998 | Neave et al. | 5,923,332 A | 7/1999 | Izawa |
| 5,777,623 A | 7/1998 | Small | 5,923,334 A | 7/1999 | Luken |
| 5,777,629 A | 7/1998 | Baldwin | 5,926,182 A | 7/1999 | Menon et al. |
| 5,781,927 A | 7/1998 | Wu et al. | 5,926,647 A | 7/1999 | Adams et al. |
| 5,791,994 A | 8/1998 | Hirano et al. | 5,933,150 A | 8/1999 | Ngo et al. |
| 5,798,770 A | 8/1998 | Baldwin | 5,933,154 A | 8/1999 | Howard et al. |
| 5,801,706 A | 9/1998 | Fujita et al. | 5,933,155 A | 8/1999 | Akeley |
| 5,801,711 A | 9/1998 | Koss et al. | 5,933,529 A | 8/1999 | Kim |
| 5,801,716 A | 9/1998 | Silverbrook | 5,936,641 A | 8/1999 | Jain et al. |
| 5,801,720 A | 9/1998 | Norrod et al. | 5,936,683 A | 8/1999 | Lin |
| 5,805,175 A | 9/1998 | Priem | 5,940,086 A | 8/1999 | Rentschler et al. |
| 5,805,868 A | 9/1998 | Murphy | 5,940,089 A | 8/1999 | Dilliplane |
| 5,808,619 A | 9/1998 | Choi et al. | 5,940,538 A | 8/1999 | Spiegel et al. |
| 5,808,630 A | 9/1998 | Pannell | 5,943,058 A | 8/1999 | Nagy |
| 5,809,219 A | 9/1998 | Pearce et al. | 5,943,060 A | 8/1999 | Cosman et al. |
| 5,809,278 A | 9/1998 | Watanabe et al. | 5,945,997 A | 8/1999 | Zhao et al. |
| 5,815,165 A | 9/1998 | Blixt | 5,949,421 A | 9/1999 | Ogletree et al. |
| 5,815,166 A | 9/1998 | Baldwin | 5,949,423 A | 9/1999 | Olsen |
| 5,818,456 A | 10/1998 | Cosman et al. | 5,949,424 A | 9/1999 | Cabral et al. |
| 5,819,017 A | 10/1998 | Akeley et al. | 5,949,428 A | 9/1999 | Toelle et al. |
| 5,821,940 A | 10/1998 | Morgan et al. | 5,949,440 A | 9/1999 | Krech, Jr. et al. |
| 5,821,949 A | 10/1998 | Deering | 5,956,042 A | 9/1999 | Tucker et al. |
| 5,822,516 A | 10/1998 | Krech, Jr. | 5,956,043 A | 9/1999 | Jensen |
| 5,828,382 A | 10/1998 | Wilde | 5,958,020 A | 9/1999 | Evoy et al. |
| 5,828,383 A | 10/1998 | May et al. | 5,959,640 A | 9/1999 | Rudin et al. |
| 5,828,907 A | 10/1998 | Wise et al. | 5,963,220 A | 10/1999 | Lee et al. |
| 5,831,624 A | 11/1998 | Tarolli et al. | 5,966,134 A | 10/1999 | Arias |
| 5,831,625 A | 11/1998 | Rich et al. | 5,969,726 A | 10/1999 | Rentschler et al. |
| 5,831,640 A | 11/1998 | Wang et al. | 5,977,977 A * | 11/1999 | Kajiya et al. ................ 345/418 |
| 5,835,096 A | 11/1998 | Baldwin | 5,977,979 A | 11/1999 | Clough et al. |
| 5,835,792 A | 11/1998 | Wise et al. | 5,977,984 A | 11/1999 | Omori |

| | | | | | | |
|---|---|---|---|---|---|---|
| 5,977,987 A | 11/1999 | Duluk, Jr. | | 6,072,496 A | 6/2000 | Guenter et al. |
| 5,982,376 A | 11/1999 | Abe et al. | | 6,075,543 A | 6/2000 | Akeley |
| 5,982,390 A | 11/1999 | Stoneking et al. | | 6,075,546 A | 6/2000 | Hussain et al. |
| 5,986,659 A | 11/1999 | Gallery et al. | | 6,078,311 A | 6/2000 | Pelkey |
| 5,986,663 A | 11/1999 | Wilde | | 6,078,333 A | 6/2000 | Wittig et al. |
| 5,986,677 A | 11/1999 | Jones et al. | | 6,078,334 A | 6/2000 | Hanaoka et al. |
| 5,987,567 A | 11/1999 | Rivard et al. | | 6,078,338 A | 6/2000 | Horan et al. |
| 5,990,903 A | 11/1999 | Donovan | | 6,081,274 A | 6/2000 | Shiraishi |
| 5,995,120 A | 11/1999 | Dye | | 6,088,035 A | 7/2000 | Sudarsky et al. |
| 5,995,121 A | 11/1999 | Alckorn et al. | | 6,088,042 A | 7/2000 | Handelman et al. |
| 5,999,189 A | 12/1999 | Kajiya et al. | | 6,088,487 A | 7/2000 | Kurashige |
| 5,999,196 A | 12/1999 | Storm et al. | | 6,088,701 A | 7/2000 | Whaley et al. |
| 5,999,198 A | 12/1999 | Horan et al. | | 6,091,431 A | 7/2000 | Saxena et al. |
| 6,002,407 A | 12/1999 | Fadden | | 6,092,124 A | 7/2000 | Priem et al. |
| 6,002,409 A | 12/1999 | Harkin | | 6,092,158 A | 7/2000 | Harriman et al. |
| 6,002,410 A | 12/1999 | Battle | | 6,094,200 A | 7/2000 | Olsen et al. |
| 6,005,582 A | 12/1999 | Gabriel et al. | | 6,097,435 A | 8/2000 | Stanger et al. |
| 6,005,583 A | 12/1999 | Morrison | | 6,097,437 A | 8/2000 | Hwang |
| 6,005,584 A | 12/1999 | Kitamura et al. | | 6,104,415 A | 8/2000 | Gossett |
| 6,007,428 A | 12/1999 | Nishiumi et al. | | 6,104,417 A | 8/2000 | Nielsen et al. |
| 6,008,820 A | 12/1999 | Chauvin et al. | | 6,105,094 A | 8/2000 | Lindeman |
| 6,011,562 A | 1/2000 | Gagne et al. | | 6,108,743 A | 8/2000 | Debs et al. |
| 6,011,565 A | 1/2000 | Kuo et al. | | 6,111,582 A | 8/2000 | Jenkins |
| 6,014,144 A | 1/2000 | Nelson et al. | | 6,111,584 A | 8/2000 | Murphy |
| 6,016,150 A | 1/2000 | Lengyel et al. | | 6,115,047 A | 9/2000 | Deering |
| 6,016,151 A | 1/2000 | Lin | | 6,115,049 A | 9/2000 | Winner et al. |
| 6,018,350 A | 1/2000 | Lee et al. | | 6,118,462 A | 9/2000 | Margulis |
| 6,020,931 A | 2/2000 | Bilbrey et al. | | 6,128,026 A | 10/2000 | Brothers, III |
| 6,021,417 A | 2/2000 | Massarksy | | 6,144,365 A | 11/2000 | Young et al. |
| 6,022,274 A | 2/2000 | Takeda et al. | | 6,144,387 A | 11/2000 | Liu et al. |
| 6,023,261 A | 2/2000 | Ugajin | | 6,151,602 A | 11/2000 | Hejlsberg et al. |
| 6,023,738 A | 2/2000 | Priem et al. | | 6,155,926 A | 12/2000 | Miyamoto et al. |
| 6,025,853 A | 2/2000 | Baldwin | | 6,157,387 A | 12/2000 | Kotani |
| 6,026,182 A | 2/2000 | Lee et al. | | 6,166,748 A | 12/2000 | Van Hook et al. |
| 6,028,608 A | 2/2000 | Jenkins | | 6,172,678 B1 | 1/2001 | Shiraishi |
| 6,028,611 A | 2/2000 | Anderson et al. | | 6,173,367 B1 | 1/2001 | Aleksic et al. |
| 6,031,542 A | 2/2000 | Wittig | | 6,177,944 B1 | 1/2001 | Fowler et al. |
| 6,035,360 A | 3/2000 | Doidge et al. | | 6,181,352 B1 | 1/2001 | Kirk et al. |
| 6,037,948 A | 3/2000 | Liepa | | 6,191,794 B1 | 2/2001 | Priem et al. |
| 6,037,949 A | 3/2000 | DeRose et al. | | 6,198,488 B1 | 3/2001 | Lindholm et al. |
| 6,038,031 A | 3/2000 | Murphy | | 6,200,253 B1 | 3/2001 | Nishiumi et al. |
| 6,038,348 A | 3/2000 | Carley | | 6,204,851 B1 | 3/2001 | Netschke et al. |
| 6,040,843 A | 3/2000 | Monroe et al. | | 6,215,496 B1 | 4/2001 | Szeliski et al. |
| 6,040,844 A | 3/2000 | Yamaguchi et al. | | 6,215,497 B1 | 4/2001 | Leung |
| 6,041,010 A | 3/2000 | Puar et al. | | 6,226,012 B1 | 5/2001 | Priem et al. |
| 6,043,804 A | 3/2000 | Greene | | 6,226,713 B1 | 5/2001 | Mehrotra |
| 6,043,821 A | 3/2000 | Sprague et al. | | 6,229,553 B1 | 5/2001 | Duluk, Jr. et al. |
| 6,046,746 A | 4/2000 | Deering | | 6,232,981 B1 | 5/2001 | Gossett |
| 6,046,747 A | 4/2000 | Saunders et al. | | 6,236,413 B1 * | 5/2001 | Gossett et al. .............. 345/506 |
| 6,046,752 A | 4/2000 | Kirkland et al. | | 6,239,810 B1 | 5/2001 | Van Hook et al. |
| 6,049,337 A | 4/2000 | Van Overveld | | 6,252,608 B1 | 6/2001 | Snyder et al. |
| 6,049,338 A | 4/2000 | Anderson et al. | | 6,252,610 B1 | 6/2001 | Hussain |
| 6,052,125 A | 4/2000 | Gardiner et al. | | 6,259,460 B1 | 7/2001 | Gossett et al. |
| 6,052,126 A | 4/2000 | Sakuraba et al. | | 6,264,558 B1 | 7/2001 | Nishiumi et al. |
| 6,052,127 A | 4/2000 | Vaswani et al. | | 6,268,861 B1 | 7/2001 | Sanz-Pastor et al. |
| 6,052,129 A | 4/2000 | Fowler et al. | | 6,268,875 B1 | 7/2001 | Duluk, Jr. et al. |
| 6,052,133 A | 4/2000 | Kang | | 6,275,235 B1 | 8/2001 | Morgan, III |
| 6,054,993 A | 4/2000 | Devic et al. | | 6,285,378 B1 | 9/2001 | Duluk, Jr. |
| 6,054,999 A | 4/2000 | Strandberg | | 6,285,779 B1 | 9/2001 | Lapidous et al. |
| 6,057,847 A | 5/2000 | Jenkins | | 6,288,730 B1 | 9/2001 | Duluk, Jr. et al. |
| 6,057,849 A | 5/2000 | Haubner et al. | | 6,292,194 B1 | 9/2001 | Powll, III |
| 6,057,851 A | 5/2000 | Luken et al. | | 6,329,997 B1 | 12/2001 | We et al. |
| 6,057,852 A | 5/2000 | Krech, Jr. | | 6,331,856 B1 * | 12/2001 | Van Hook et al. .......... 345/503 |
| 6,057,859 A | 5/2000 | Handelman et al. | | 6,333,744 B1 * | 12/2001 | Kirk et al. .................. 345/506 |
| 6,057,861 A | 5/2000 | Lee et al. | | 6,337,689 B1 | 1/2002 | Hochmuth et al. |
| 6,057,862 A | 5/2000 | Margulis | | 6,339,428 B1 | 1/2002 | Fowler et al. |
| 6,057,863 A | 5/2000 | Olarig | | 6,342,892 B1 | 1/2002 | Van Hook et al. |
| 6,061,462 A | 5/2000 | Tostevin et al. | | 6,353,438 B1 | 3/2002 | Van Hook |
| 6,064,392 A | 5/2000 | Rohner | | 6,356,497 B1 | 3/2002 | Puar et al. |
| 6,067,098 A | 5/2000 | Dye | | 6,408,362 B1 | 6/2002 | Arimilli et al. |
| 6,070,204 A | 5/2000 | Poisner | | 6,417,858 B1 | 7/2002 | Bosch et al. |

| | | | |
|---|---|---|---|
| 6,426,747 B1 | 7/2002 | Hoppe et al. | |
| 6,437,781 B1 | 8/2002 | Tucker et al. | |
| 6,459,429 B1 | 10/2002 | Deering | |
| 6,466,223 B1 | 10/2002 | Dorbie et al. | |
| 6,469,707 B1 | 10/2002 | Voorhies | |
| 6,476,808 B1 | 11/2002 | Kuo et al. | |
| 6,476,822 B1 | 11/2002 | Burbank | |
| 6,483,505 B1 | 11/2002 | Morein et al. | |
| 6,496,187 B1 | 12/2002 | Deering et al. | |
| 6,501,479 B1 | 12/2002 | Root et al. | |
| 6,532,013 B1 | 3/2003 | Papakipos et al. | |
| 6,593,923 B1 | 7/2003 | Donovan et al. | |
| 6,597,363 B1 | 7/2003 | Duluk, Jr. et al. | |
| 6,628,290 B1 | 9/2003 | Kirk et al. | |
| 6,690,381 B1 | 2/2004 | Hussain et al. | |

FOREIGN PATENT DOCUMENTS

| | | |
|---|---|---|
| JP | 11076614 | 3/1999 |
| JP | 11161819 | 6/1999 |
| JP | 11203500 | 7/1999 |
| JP | 11226257 | 8/1999 |
| JP | 11259671 | 9/1999 |
| JP | 11259678 | 9/1999 |
| JP | 2000-66985 | 3/2000 |
| JP | 2000-92390 | 3/2000 |
| JP | 2000-132704 | 5/2000 |
| JP | 2000-132706 | 5/2000 |
| JP | 2000-149053 | 5/2000 |
| JP | 2000-156875 | 6/2000 |
| JP | 2000-182077 | 6/2000 |
| JP | 2000-207582 | 7/2000 |
| JP | 2000-215325 | 8/2000 |
| WO | WO/93/04429 | 3/1993 |
| WO | WO 93/23816 | 11/1993 |
| WO | WO 94/10641 | 5/1994 |
| WO | WO 97/05575 | 2/1997 |
| WO | WO 97/05576 | 2/1997 |
| WO | WO 99 01846 A | 1/1999 |
| WO | WO 00/10372 | 3/2000 |
| WO | WO 00/11562 | 3/2000 |
| WO | WO 00/11602 | 3/2000 |
| WO | WO 00/11603 | 3/2000 |
| WO | WO 00/11604 | 3/2000 |
| WO | WO 00/11605 | 3/2000 |
| WO | WO 00/11607 | 3/2000 |
| WO | WO 00/11613 | 3/2000 |
| WO | WO 00/11614 | 3/2000 |
| WO | WO 00/19377 | 4/2000 |

OTHER PUBLICATIONS

Whitepaper: Using GL_NV_vertex_array and GL_NV_fence, posted Aug. 1, 2000, www.nvidia.com.
Whitepaper: Anisotropic Texture Filtering in OpenGL, posted Jul. 17, 2000, www.nvidia.com.
Whitepaper: Mapping Texels to Pixels in D3D, posted Apr. 5, 2000, www.nvidia.com.
Whitepaper: Guard Band Clipping, posted Jan. 31, 2000, www.nvidia.com.
Whitepaper: Cube Environment Mapping, posted Jan. 14, 2000, www.nvidia.com.
Whitepaper: Color Key in D3D, posted Jan. 11, 2000, www.nvidia.com.
Whitepaper: Vertex Blending Under DX7 for the GeForce 256, Jan. 5, 2000, www.nvidia.com.
Whitepaper: Optimizing Direct3D for the GeForce 256, Jan. 3, 2000, www.nvidia.com.
Whitepaper: Dot Product Texture Blending, Dec. 3, 1999, www.nvidia.com.
Whitepaper: Technical Brief: AGP 4X with Fast Writes, Nov. 10, 1999, www.nvidia.com.
Technical Brief: Transform and Lighting, Nov. 10, 1999, www.nvidia.com.
Technical Brief: What's New With Microsoft DirectX7, posted Nov. 10, 1999, www.nvidia.com.
Mitchell et al., "Multitexturing in DirectX6", Game Developer, Sep. 1998, www.gdmag.com.
VisionTek, "GeForce2 GS Graphics Processing Unit", ©2000 www.visiontek.com.
Jim Bushnell et al. "Advanced Multitexture Effects With Direct3D and OpenGL", Pyramid Peak Design & ATI Research, Inc., GameDevelopers Conference, ©1999.
Sony PlayStation II Instruction Manual, Sony Computer Entertainment Inc., ©2000.
Stand and Be Judged, Next Generation, May 2000.
Playstation II: Hardware Heaven or Hell?, Next Generation, Jan. 2000.
Chris Charla, "Play Station II: The Latest News", Next Generation, Sep. 1999.
"First PlayStation II Gameplay Screens Revealed!", Next Generation, Sep. 1999.
Game Enthusiast Online Highlights, Mar. 18, 1999.
Game Enthusiast Online Highlights, Mar. 19, 1999.
Game Enthusiast Online Highlights, Mar. 17, 1999.
Game Enthusiast Online Highlights, Oct. 20, 1999.
Joel Easley, "PlayStation II Revealed", Game Week, Sep. 29, 1999.
Inside Sony's Next Generation Playstation, ©1999.
Press Releases, Mar. 18, 1999.
Chris Johnston, "PlayStation Part Deux", Press Start, ©1999.
Nikkei Shimbun, "Sony Making SME, Chemical and SPT into wholly–Owned Subsidiaries", Mar. 9, 1999.
AM News: Japanese Developers Not All Sold on PS2, Next Generation, Mar. 16, 1999.
Sony To Turn PlayStation Maker Into Wholly Owned Unit–Nikkei, Dow Jones News Service, Mar. 8, 1999.
Yumiko Ono, Sony Antes Up Its Chips In Bet On New Game System, Dow Jones News Service, Mar. 4, 1999.
MacWeek.Com Gets Inside Story on Connectix VGS for Windows; Controversial Emulator of Sony PlayStation Games Cureently Available for Macs Only, Business Wire, Mar. 12, 1999.
"DexDrive Bridges Gap", The Tampa Tribune, Mar. 12, 1999.
A Microprocessor With a 128b CPU, 10 Floating–Point MAC's, 4 Floating–Point Dividers, and an MPEG2 Decoder, 1999 IEEE International Solid–State Circuits Conference, Feb. 16, 1999.
Dreamcast Instruction Manual, Sega Enterprises, Ltd., ©1998.
"Sega To Launch Video Camera for Dreamcast", Reuters Business News, Feb. 16, 2000.
David Prescovitz, "Dream On", Wired, Aug. 1999.
Randy Nelson, "Dreamcast 101: Everything You Ever Wanted To Know About Sega's Powerful New Console", Official Sega Dreamcast Magazine, Jun. 1999.
2D/3D Graphics Card User Manual, Guillemot ©1999.
Nintendo 64 Instruction Booklet, Nintendo of America, 1998.
Steven Levy, "Here Comes PlayStation II", Newsweek, Mar. 6, 1999.

David Sheff, "Sony Smackage: Test Driving The PlayStation II", Wired, Nov. 1999.

Introducing The Next Generation PlayStation, Sony Computer Entertainment Inc., ©1999.

Leadtek GTS, Aug. 3, 2000, www.hexus.net.

Voodoo 5 5500 Review, Jul. 26, 2000, www.hexus.net.

ATI Radeon 64 Meg DDR OEM, Aug. 19, 2000, www.hexus.net.

Microsoft Xbox—The Future of Gaming, Microsoft Xbox Performance Sheet, www.xbox.com.

Robert L. Cook, "Shade Trees", Computer Graphics, vol. 18, No. 3, Jul. 1984.

Wang et al., "Second–Depth Shadow Mapping", Department of Computer Science, Univ. N.C, Chapel Hill, N.C. pp. 1–7.

Peercy et al., "Efficient Bump Mapping Hardware", Computer Graphics Proceedings, Annual Conference Series, 1997.

Gustavo Oliveira, "Refractive Texture Mappig, Part One", www.gamasutra.com, Nov. 10, 2000.

John Schlag, Fast Embossing Effects on Raster Image Data, Graphics Gems IV, Edited by Paul S. Heckbert, Computer Science Department, Carnegie Mellon University, Academic Press, Inc., 1994, pp. 433–437.

James F. Blinn, "Simulationof Wrinkled Surfaces," Caltech/JPL, pp. 286–292, SIGGRAPH 78 (1978).

Tomas Möller and Eric Haines "Real–Time Rendering", AK Peters, Ltd., ©1999, pp. 127–142.

Technical Presentation: Vertex Buffers, posted Jun. 12, 2000, www.nvidia.com.

Technical Presentation: Hardware Transform and Lighting, www.nvidia.com, posted Jun. 12 2000.

Technical Presentation: Hardware Bump–mapping Choices and Concepts, Jun. 7, 2000, www.nvidia.com.

Technical Presentation; How to Bump Map a Skinned Polygonal Model, Jun. 7, 2000, www.nvidia.com.

Technical Presentation: Computations for Hardware Lighting and Shading, Mar. 17, 2000, www.nvidia.com.

Technical Presentation: Practical Bump–mapping for Today's GPUs, Mar. 17, 2000 www.nvidia.com.

Technical Presentation: Shadows, Transparency, & Fog, Mar. 17, 2000 www.nvidia.com.

Technical Presentation: GeForce 256 Register Combiners, Mar. 17, 2000,www.nvidia.com.

Technical Presentation; TexGen & The Texture Matrix, Mar. 15, 2000 www.nvidia.com.

Technical Presentation: Toon Shading, Mar. 15, 2000, www.nvidia.com.

Technical Presentation: D3D 7 Vertex Lighting, Mar. 15, 2000, www.nvidia.com.

Technical Presentation: Per–Pixel Lighting (by S. Dietrich) Mar. 14, 2000 www.nvidia.com.

Technical Presentation: GeForce 256 256 and RIVA TNT Combiners, Dec. 8, 1999, www.nvidia.com.

Technical Presentation: Vertex Cache Optimization, Nov. 12, 1999, www.nvidia.com.

Technical Presentation: Vertex Blending, Nov. 12, 1999, www.nvidia.com.

Technical Presentation: Hardware Transform and Lighting, Nov. 12, 1999, www.nvidia.com.

Technical Presentation: GeForce 256 Overview, Nov. 12, 1999, www.nvidia.com.

Technical Presentation: DirectX 7 and Texture Management, Nov. 12, 1999, www.nvidia.com.

Technical Presentation: Dot Product Lighting, Nov. 12, 1999, www.nvidia.com.

Technical Presentation: Texture Coordinate Generation, Nov. 3, 1999, www.nvidia.com.

Technical Presentation: Phong Shading and Lightmaps, Nov. 3, 1999, www.nvidia.com.

Technical Presentation: The ARB_multitexture Extension, Nov. 3, 1999 www.nvidia.com.

Technical Presentation: Multitexture Combiners, Nov. 3, 1999, www.nvidia.com.

Technical Presentation: Emboss Bump Mapping, Nov. 3, 1999, www.nvidia.com.

Technical Presentation: Hardware Accelerated Anisotropic Lighting, Nov. 3, 1999 www.nvidia.com.

Technical Presentation: Guard Band Clipping, Nov. 3, 1999, www.nvidia.com.

The RenderMan Interface, Stephan R. Keith, Version 3.1, Pixar Animation Studios, Sep. 1989.

The RenderMan Interface, Version 3.2, Pixar Animation Studios, Jul. 2000, www.pixar.com.

NVIDIA Product Overview, "GeForce2Ultra", NVIDIA Corporation, Aug. 21, 2000, www.nvidia.com.

Duke, "Dreamcast Technical Specs", Sega Dreamcast Review, Sega, 2/99, www.game–revolution.com.

Marlin Rowley, "GeForce 1 & 2 GPU Speed Tests", May 11, 2000, www.g256.com.

"Dreamcast: The Full Story", Next Generation, Sep. 1998.

DirectX 7.0 Programmer's Reference, Microsoft Corporation, 1995–1999 (as part of the DirectX 7.0 SDK on the Companion CD included with "Inside Direct3D", Microsoft Programming Series, Peter J. Kovach, Microsoft Press, 1999).

"Inside Direct3D", Microsoft Programming Series, Peter J. Kovach, Microsoft Press, 1999.

"OpenGL Programming Guide, The Official Guide to Learning OpenGL, Release 1", Jackie Nieder, Tom David, Mason Woo, Addision–Wesley Publishing Co., 1993.

"Procedural Elements for Computer Graphics," Second Edition, David F. Rogers, McGraw Hill, 1998.

"Real–Time Rendering," Tomas Molleir, Eric Haines, AK Peters, 1999.

"Computer Graphics, Principles and Practice," Second Edition, The Systems Programming Series, Foley, van Dam, Fiener, Hughes, Addison Wesley, 1990.

"Principles of Three–Dimensional Computer Animation", Revised Edition, Michael O'Rourke, W.W. Norton & Company, 1998.

Render Man Artist Tools, Using Arbitrary Output Variables in Photoreasistic Renderman (With Applications) PhotoRealistic Renderman Application Note #24 (Jun. 1998).

Dacaudin, Philippe, "Cartoon–Looking Rendering of 3D Scenes," Inria Syntim Project (Dec. 6, 1998).

Gooch et al., "A non–Photorealistic Lighting Model for Automatic Technical Illustration," presented at "SIGGRAPH 98," Orange county Convention Center, Orlando, FL (Jul. 19–24, 1998).

Lance Williams, "Pyramidal Parametrics"; Jul. 1983; Computer Graphics, vol. 17, No. 3; Computer Graphics Laboratory, New York Institute of Technology, Old Westbury, NY; pp 1–11.

James F. Blinn et al., "Texture and Reflection in Computer Generated Images"; Oct. 1976; Graphics and Image Processing; Association for Computing Machinery, Inc. pp. 542–547.

Ned Greene, New York Institute of Technology; "Environment Mapping and Other Applications of World Projections"; Nov., 1986; The Institute of Electrical and Electronics Engineers Inc. Computer society; pp. 21–29.

"The RenderMan Interface Version 3.1," (Sep. 1989).

"The RenderMan Interface Version 3.2," (Jul. 2000).

"Renderman Artist Tools, PhotoRealistic RenderMan Tutorial," Pixar (Jan. 1996).

Web site materials, "Renderman Artist Tools, PhotoRealistic RenderMan 3.8 User's Manual," Pixar, (Aug. 1998).

Cook, Robert L., "Shade Trees," *Computer Graphics*, vol. 18, No. 3 (Jul. 1984).

McCool, Michael D., et al., "Texture Shaders," *1999 Eurographics Los Angeles CA* (1999).

NVIDIA.com, technical presentation, "AGDC Per–Pixel Shading" (Nov. 15, 2000).

NVIDIA.com, technical presentation, Introduction to DX8 Pixel Shaders (Nov. 10, 2000).

NVIDIA.com, technical presentation, "Advanced Pixel Shader Details" (Nov. 10, 2000).

"Developer's Lair, Multitexturing with the ATI Rage Pro," (7 pages) from ati.com web site (2000).

GDC 2000: Advanced OpenGL Game Development, "A Practical and Robust Bump–mapping Technique for Today's GPUs," by Mark Kilgard, Jul. 5, 2000, www.nvidia.com.

Technical Presentations: "Texture Space Bump Mapping," Sim Dietrich, Nov. 10, 2000.

Whitepapers: "Texture Addressing," Sim Dietrich, Jan. 6, 2000, www.nvidia.com.

White paper, Huddy, Richard, "The Efficient Use of Vertex Buffers," (Nov. 1, 2000).

White paper, Spitzer, John, et al., "Using GL_NV_array_range and GL_NV_Fence on GEForce Products and Beyond" (Aug. 1, 2000).

White paper, Rogers, Douglas H., "Optimizing Direct3D for the GeForce 256" (Jan. 3, 2000).

Hook, Brian, "An Incomplete Guide to Programming DirectDraw and Direct3D Immediate Mode (Release 0.46)," printed from web site: www.wksoftware.com, 42 pages.

Thompson, Tom, "Must–See 3–D Engines," Byte Magazine, printed from web site www.byte.com, 10 pages (Jun. 1996).

Thompson, Nigel, "Rendering with Immediate Mode," Microsoft Interactive Developer Column: Fun and Games, printed from web site mdsn.microsoft.com, 8 pages (Mar. 97)

"HOWTO: Animate Textures in Direct3D Immediate Mode," printed from web site support.microsoft.com, 3 pages (last reviewed Dec. 15, 2000).

INFO: Rendering a Triangle Using an Execute Buffer, printed from web site support.microsoft.com, 6 pages (last reviewed Oct. 20, 2000).

U.S. application Ser. No. 09/337,293, filed Jun 21, 1999, Multi–Format Vertex Data Processing Apparatus and Method [issued as U.S. Patent No. 6,501,479 B1 on Dec. 31, 2002].

Datasheet, SGS–Thomson Microelectronics, nVIDIA™, RIVA 128™ 128–Bit 3D Multimedia Accelerator (Oct. 1997).

Product Presentation, "RIVA128™ Leadership 3D Acceleration," 2 pages.

ZDNet Reviews, from PC Magazine, "Other Enhancements," Jan. 15, 1999, wysiwyg://16/http://www.4.zdnet.com . . . ies/reviews/0,416,2188286,00.html.

ZDNet Reviews, from PC Magazine, "Screen Shot of Alpha–channel Transparency," Jan. 15, 1999, wysiwyg://16/http://www4.zdnet.com . . . ies/reviews/0,4161,2188286, 00.html.

Alpha (transparency) Effects, Future Technology Research Index, http://www.futuretech.vuurwerk.n1/alpha.html.

Blythe, David, 5.6 Transparency Mapping and Trimming with Alpha, http://toolbox.sgi.com/TasteOfDR/d...penGL/advanced98/notes/node41.html, Jun. 11, 1998.

10.2 Alpha Blending, http://www.sgi.com/software/opengl/advanced98/notes/node146.html.

10.3 Sorting, http://www.sgi.com/software/opengl/advanced98/notes/node147.html.

10.4 Using the Alpha Function, http://www.sgi.com/software/opengl/advanced98/notes/node148.html.

Winner, Stephanie, et al., "Hardware Accelerated Rendering Of Antialiasing Using A Modified A–buffer Algorithm," Computer Graphics Proceddings, Annual Conference Series, 1997, pp 307–316.

Debevec, Paul, et al., "Efficient View–Dependent Image–Based Rendering with Projective Texture–Mapping," University of California at Berkeley.

Gibson, Simon, et al., "Interactive Rendering with Real–World Illumination," Rendering Techniques 2000; 11th Eurographics Workshop on Rendering, pp. 365–376 (Jun. 2000).

Segal, Mark, et al., "Fast Shadows and Lighting Effects Using Texture Mapping," Computer Graphics, 26, 2, pp. 249–252 (Jul. 1992).

White paper, Kilgard, Mark J., "Improving Shadows and Reflections via the Stencil Buffer" (Nov. 3, 1999).

"OpenGL Projected Textures," from web site:HTTP://reality.sgi.com, 5 pages.

"5.13.1 How to Project a Texture," from web site: www.sgi.com, 2 pages.

Arkin, Alan, email, subject: "Texture distortion problem," from web site: HTTP://reality.sgi.com (Jul. 1997).

Moller, Tomas et al., "Real–Time Rendering," pp. 179–183 (AK Peters Ltd., 1999).

Williams, Lance, "Casting Curved Shadows on Curved Surfaces," Computer Graphics (SIGGRAPH '78 Proceddings), vol. 12, No. 3, pp. 270–274 (Aug. 1978).

Woo et al., "A Survey of Shadow Algorithms," IEEE Computer Graphics and Applications, vol. 10, No. 5, pp. 13–32 (Nov. 1990).

Heidrich et al., "Applications of Pixel Textures in Visualization and Realistic Image Synthesis," Proceedings 1999 Symposium On Interactive 3D Graphics, pp. 127–134 (Apr. 1999).

Hourcade et al., "Algorithms for Antialiased Cast Shadows", Computers and Graphics, vol. 9, No. 3, pp. 260–265 (1985).

Michael McCool, "Shadow Volume Reconstruction from Depth Maps", ACM Transactions on Graphics, vol. 19, No. 1, Jan. 2000, pp. 1–26.

RenderMan Artist Tols, PhotoRealistic RenderMan 3.8 User's Manual, Pixar (Aug. 1998).

White paper, Dietrich, Sim, "Cartoon Rendering and Advanced Texture Features of the GeForce 256 Texture Matrix, Projective Textures, Cube Maps, Texture Coordinate Generation and DOTPRODUCT3 Texture Blending" (Dec. 16, 1999).

Peter J. Kovach, Inside Direct 3D, "Alpha Testing," ppp.289–291 (1999).

Web site information, CartoonReyes, REM Infografica, http://www.digimotion.co.uk/cartoonreyes.htm.

Raskar, Ramesh et al., "Image Precision Silhouette Edges," Symposium on Ineractive 3D Graphics 1999, Atlanta, 7 pages (Apr. 26–29, 1999).

Schlechtweg, Stefan et al., Rendering Line–Drawings with Limited Resources, Proceedings of GRAPHICON '96, 6th International Conference and Exhibition on Computer Graphics and Visualization in Russia, (St. Petersburg, Jul. 1–5, 1996) vol. 2, pp 131–137.

Haeberli, Paul et al., "Texture Mapping as a Fudamental Drawing Primitive,"Proceedings of the Fourth Eurographics Workshop on Rendering, 11pages, Paris, France (Jun. 1993).

Schlechtweg, Stefan et al., "Emphasising in Line–drawings, "Norsk samarbeid innen grafisk databehandling: NORSIGD Info, medlemsblad for NORSIGD, Nr Jan. 1995, pp. 9–10.

Markosian, Lee et al., "Real–Time Nonphotorealistic Rendering," Brown University site of the NSF Science and Technology Center for Computer Graphics and Scientific Visualization, Providence, RI, 5 pages (undated).

Feth, Bill, "Non–Photorealistic Rendering, "wif3@cornell.edu, CS490—Bruce Land, 5 pages (Spring 1998).

Elber, Gershon, "Line Art Illustrations of Parametric and Implicit Forms," IEEE Transactions on Visualization and Computer Graphics, vol. 4, No. 1, Jan.–Mar. 1998.

Zeleznik, Robert et al. "SKETCH: An Interface for Sketching 3D Scenes," Computer Graphics Proceedings, Annual Conference Series 1996, pp. 163–170.

Computer Graphics World, Dec. 1997.

Reynolds, Craig, "Stylized Depiction in Computer Graphics, Non–Photorealistic, Painterly and Toon Rendering," an annotated survey of online resources, 13 pages, last update May 30, 2000, http://www.red.com/cwr/painterly.html.

Render Man Artist Tools, Using Arbitrary Output Variables in Photorealistic Renderman (with Applications), PhotoRealistic Renderman Application Note #24, 8 pages, Jun. 1998, http://www.pixar.com/products/renderman/toolkit/Toolkit/AppNotes/appnote.24.html.

Decaudin, Philippe, "Cartoon–Looking Rendering of 3D Scenes," Syntim Project Inria, 6 pages, http://www–syntim.inria.fr/syntim/recherche/decaudin/cartoon–eng.html.

Hachigian, Jennifer, "Super Cel Shader 1.00 Tips and Tricks," 2 pages, wysiwyg://thePage.13/http://members.xoom.com/_XMCM.jarvia/3dcelshade.html.

Digimation Inc., "The Incredible Comicshop," info sheet, 2 pages, http://www.digimation.com/asp/product/asp?product_id=33.

Softimage/3D Full Support, "Toon Assistant," 1998 Avid Technology, Inc., 1 page, http://www.softimage.com/3dssupport/techn . . . uments/3.8/features3.8/rel_notes.56.html.

Cambridge Animo —Scene III, info sheet, Cambridge Animation Systems, 2 pages, http://www.cam–ani.co.uk/casweb/products/software/SceneIII.htm.

Mulligan, Vikram, "Toon," info sheet, 2 pages, http://digitalcarversguild.com/products/toon/toon.thml.

Toony Shaders, "Dang I'm tired of photorealism," 4 pages, http://www.visi.com/~mcdonald/toony.html.

"Cartoon Shading, Using Shading Mapping," 1 page, http://www.goat.com/alias/shaders.html#toonshad.

web site information, CartoonReyes, http://www.zentertainment.com/zentropy/review/cartoonreves.html.

VIDI Presenter 3D Repository, "Shaders." 2 pages, http://www.webnation.com/vidirep/panels/renderman/shaders/toon.phtml.

Slide Presentation, Sébastien Dominé, "nVIDIA Mesh Skinning, OpenGl".

Singh, Karan et al., "Skinning Characters using Surface–Oriented Free–Form Deformations," Toronto Canada.

"Hardware Technology," from ATI.com web site, 8 pages (2000).

"Skeletal Animation and Skinning," from ATI.com web site, 2 pages (Summer 2000).

"Developer Relations, ATI Summer 2000 Developer Newsletter," from ATI.com web site, 5 pages (Summer 2000).

Press Releases, "ATI's RADEON family of products delivers the most comprehensive support for the advance graphics features of DirectX 8.0," Canada, from ATI.com web site, 2 pages (Nov. 29, 2000).

"ATI RADEON Skinning and Tweening," from ATI.com web site, 1 page (2000).

Hart, Evan et al., "Vertex Shading with Direct3D and OpenGL," Game Developers Conference 2001, from ATI.com web site (2001).

Search Results for: skinning, from ATI.com web site, 5 pages (May 24, 2001).

Hart, Evan et al., "Graphics by rage," Game Developers Conference 2000, from ATI.com web site (2000).

Efficient Command/Data Interface Protocol For Graphics, IBM TDB, vol. 36 issue 9A, Sep. 1, 1993, pp. 307–312.

Shade, Jonathan et al., "Layered Depth Images," Computer Graphics Proceedings, Annnual Conference Series, pp. 231–242 (1998).

Videum Conference Pro (PCI) Specification, product of Winnov (Winnov), published Jul. 21, 1999.

Hoppe, Hugues, "Optimization of Mesh Locality for Transparent Vertex Caching," Proceedings Of Siggraph, pp. 269–276 (Aug. 8–13, 1999).

Whiepaper: Implementing Fog in Direct3D, Jan. 3, 2000, www.nvidia.com.

Akeley, Kurt, "Reality Engine Graphics", 1993, Silicon Graphics Computer Systems, pp. 109–116.

Heidrich, W. et al., "Illuminating Micro Geometry Based On Precomputed Visibility," (Jul. 23–28, 2000), 2000 SIGGRAH Annual Conference Proceedings (XP–001003586, ACM Jul. 2000).

Matthews, M., "Graphics: Pick a Card . . . Any Card," 10 pages.

Peercy, M., et al., "Efficient Bump Mapping Hardware," 4 pages.

Press Release, "NVIDIA Introduces New Groundbreaking GPU" (Apr. 26, 2000).

Press Release, "NVIDIA Introduces Breakthrough GPU for Mainstream PCs" (Jun. 28, 2000).

Press Release, "New NVIDIA Software Unleashes The Power of the GeForce Architecture–Provides Up to 50% Performance Gain" (Apr. 14, 2000).

Press Release, "New NVIDIA GPU Break One Billion Pixels Per Second Barrier" (Aug. 14, 2000).

\* cited by examiner

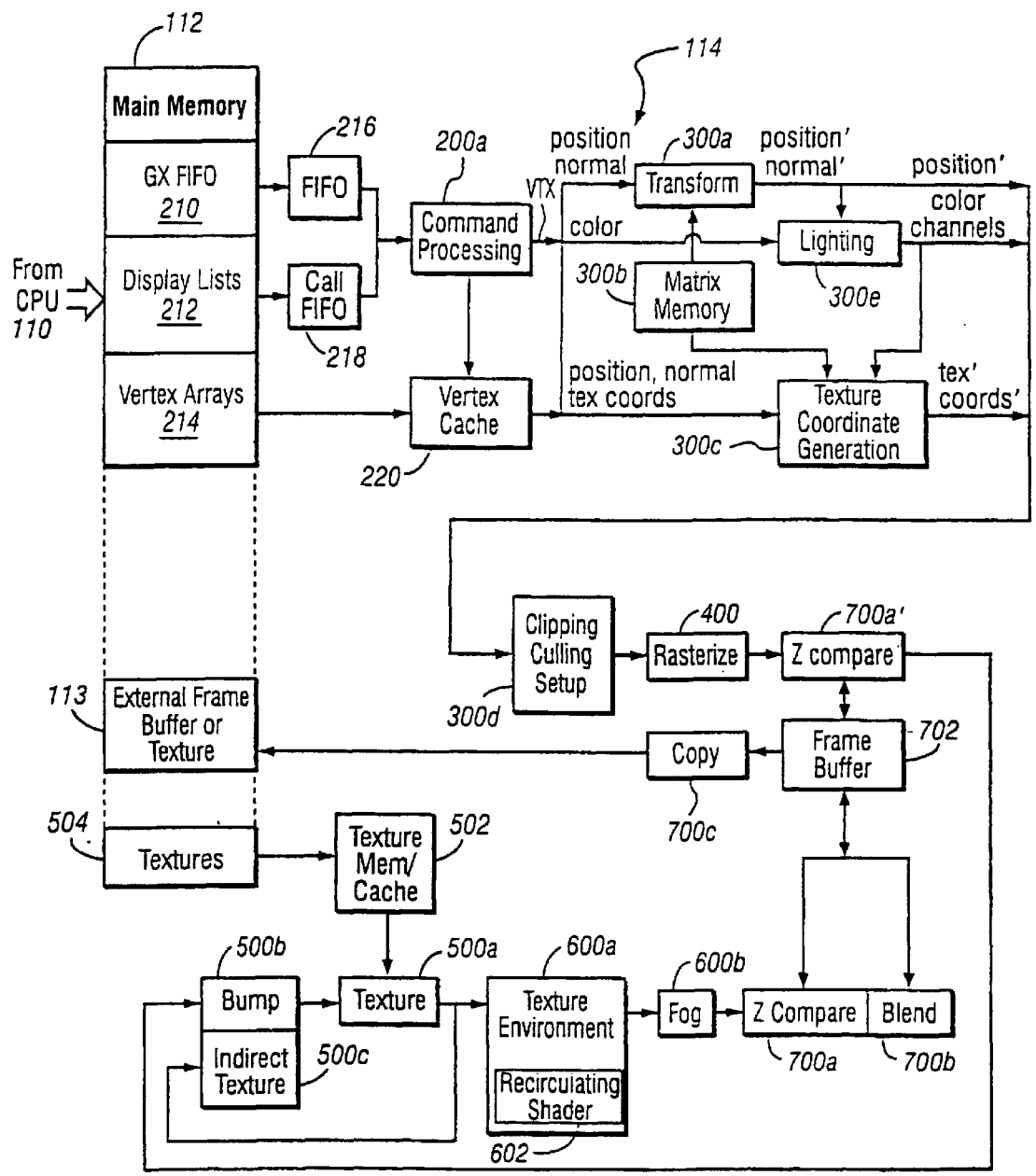
Fig. 5 EXAMPLE GRAPHICS PROCESSOR FLOW

Example Shader Pipeline tc = texture color/nop, cc = computed color, rc = rasterized color Example Reusable Sub-Blend Stage

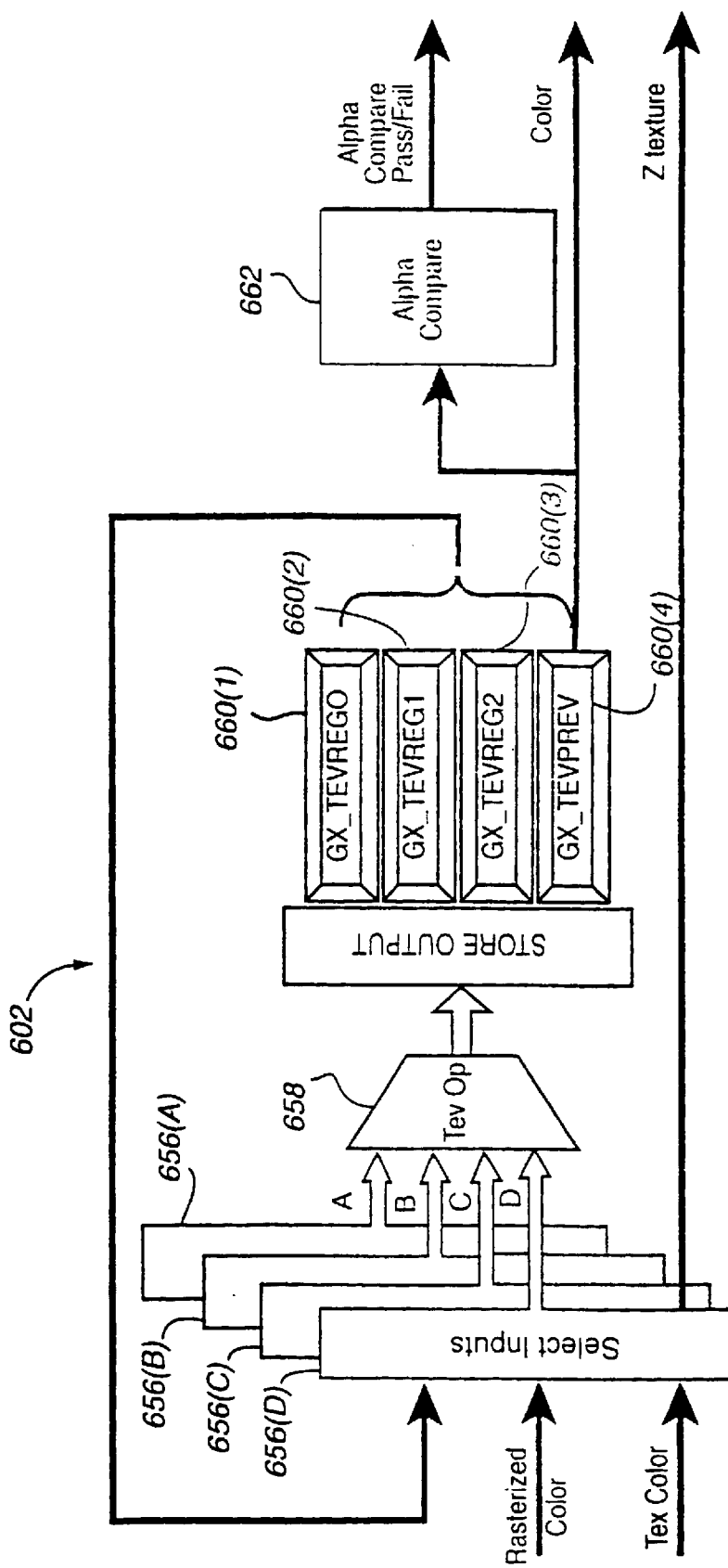
Fig. 8 Example Recirculating Shader

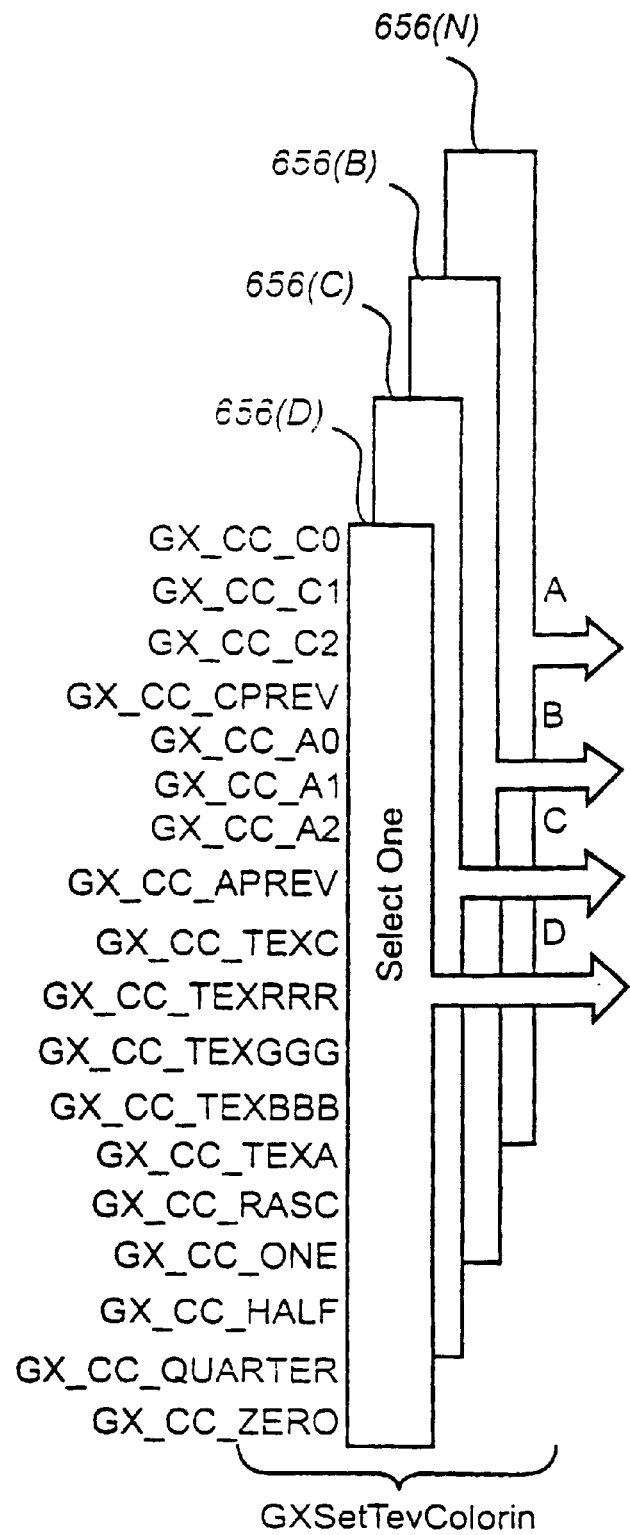
Fig. 9 Example Recirculating Shader Input Multiplexer

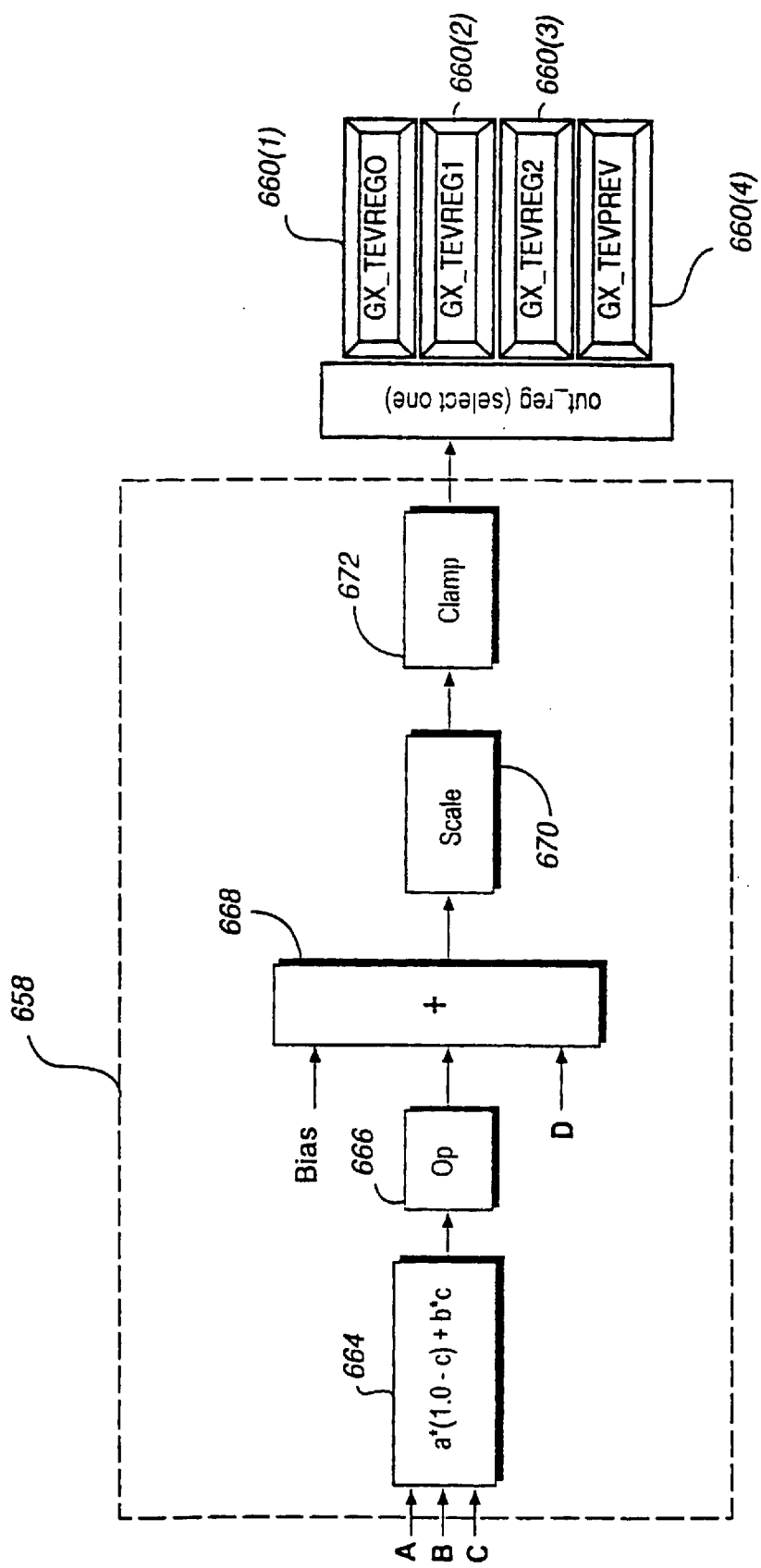
*Fig. 10* Example Recirculating Shader Operation Block Diagram

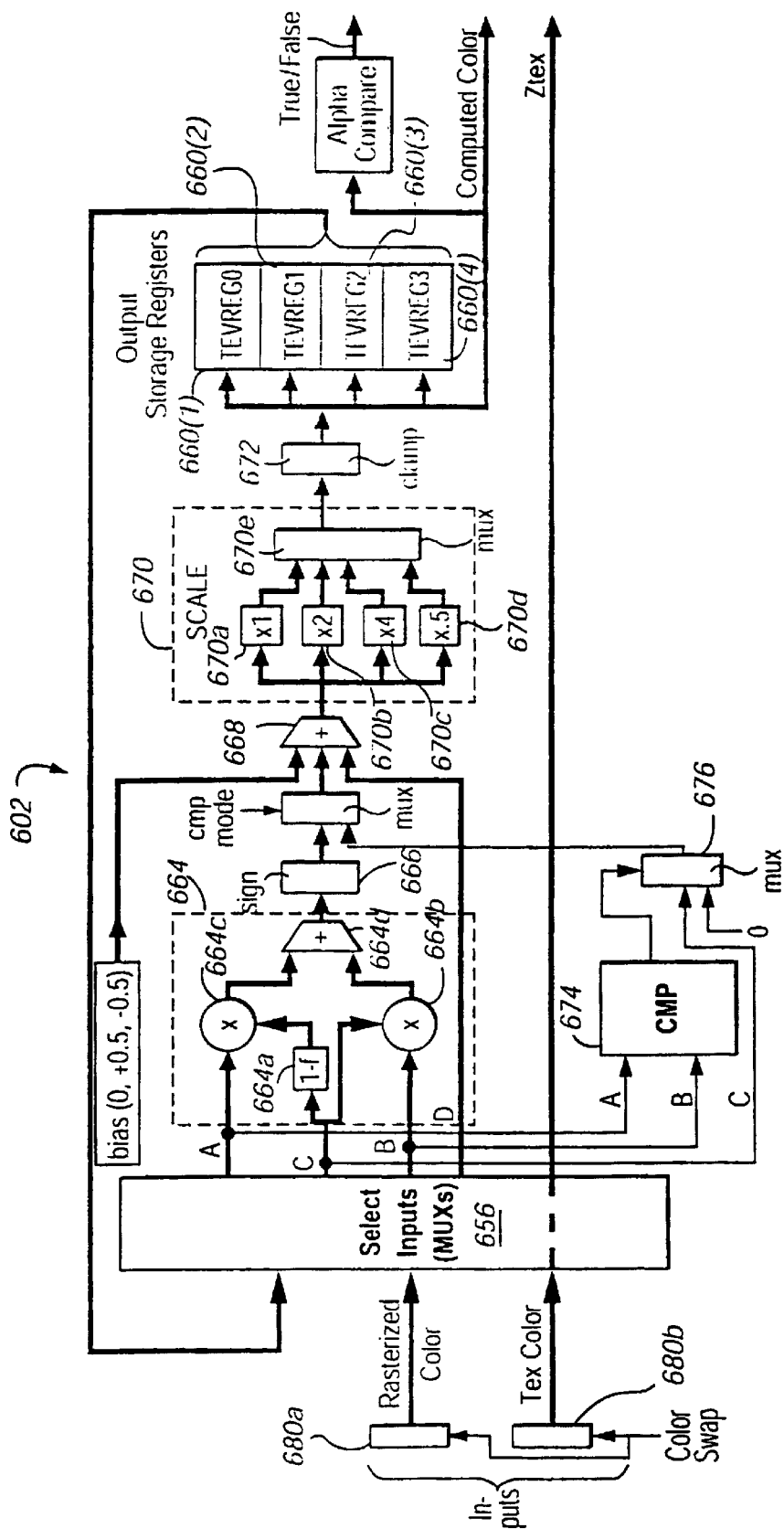
Fig. 11 Example Recirculating Shader Implementation

Fig. 12a  Example Color Swap Feature
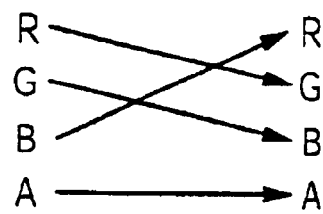
Programmable Color Swap
Fig. 12b  Example Color Swap Feature
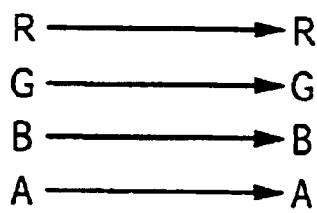
Default

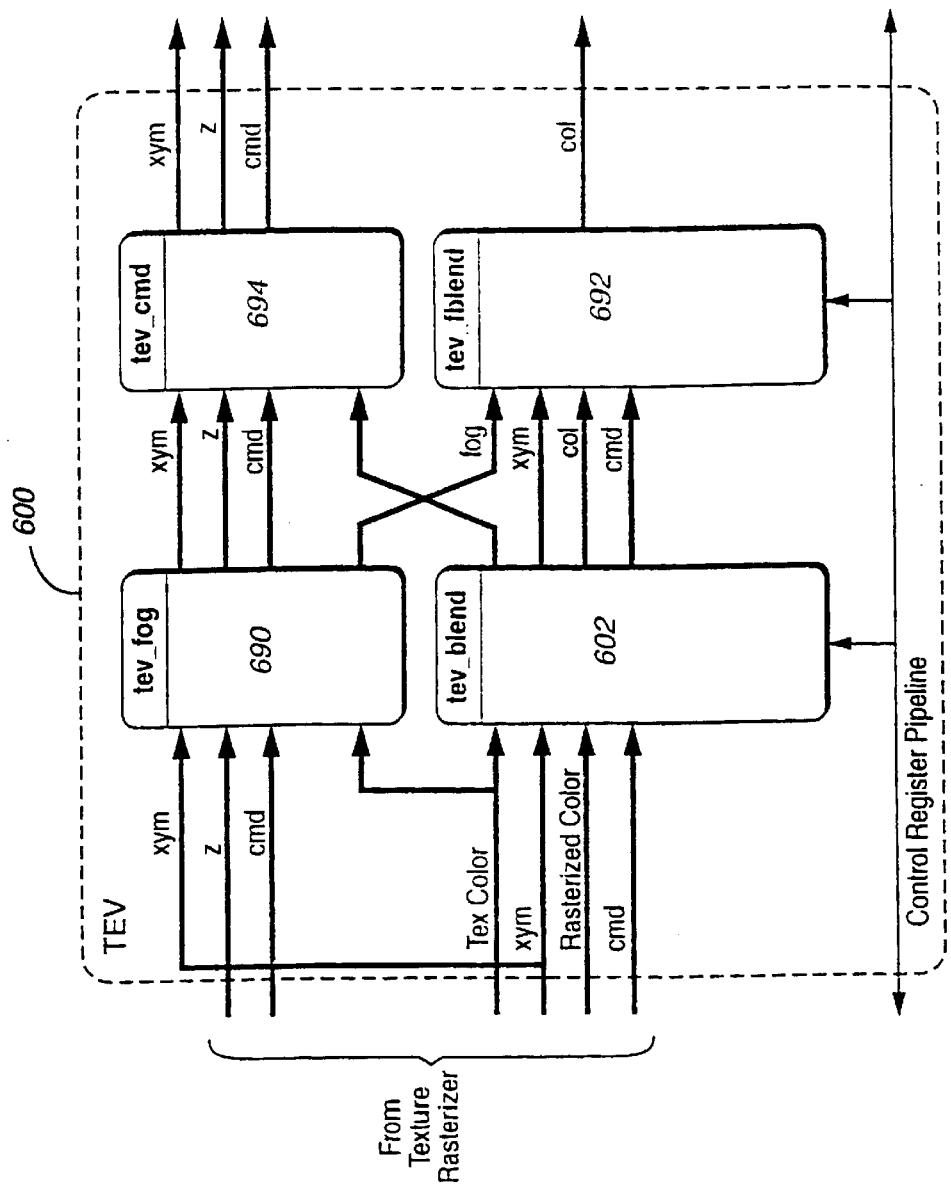
*Fig. 13* Example Texture Environment Unit

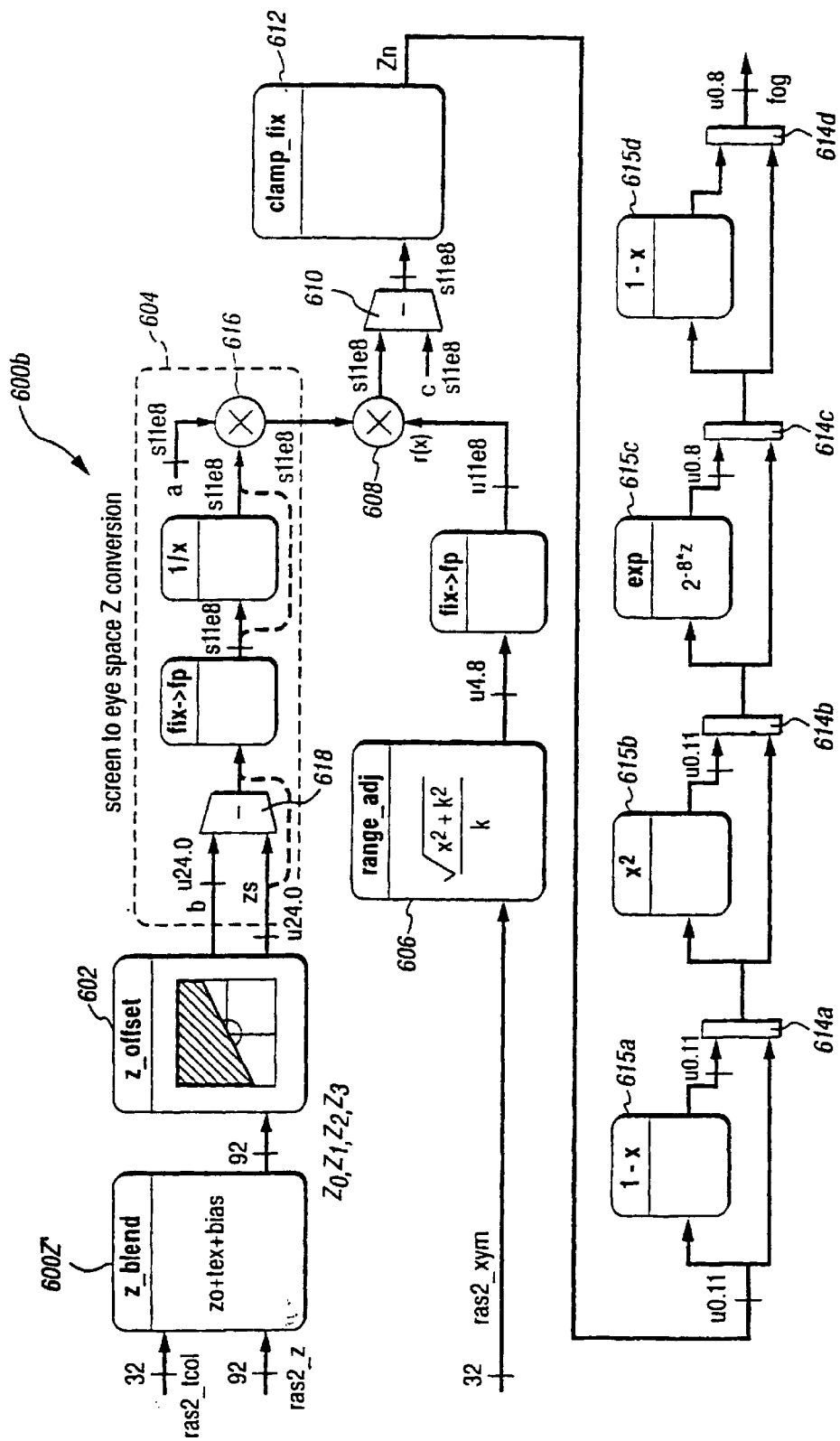
Fig. 14  EXAMPLE FOG CALCULATION UNIT

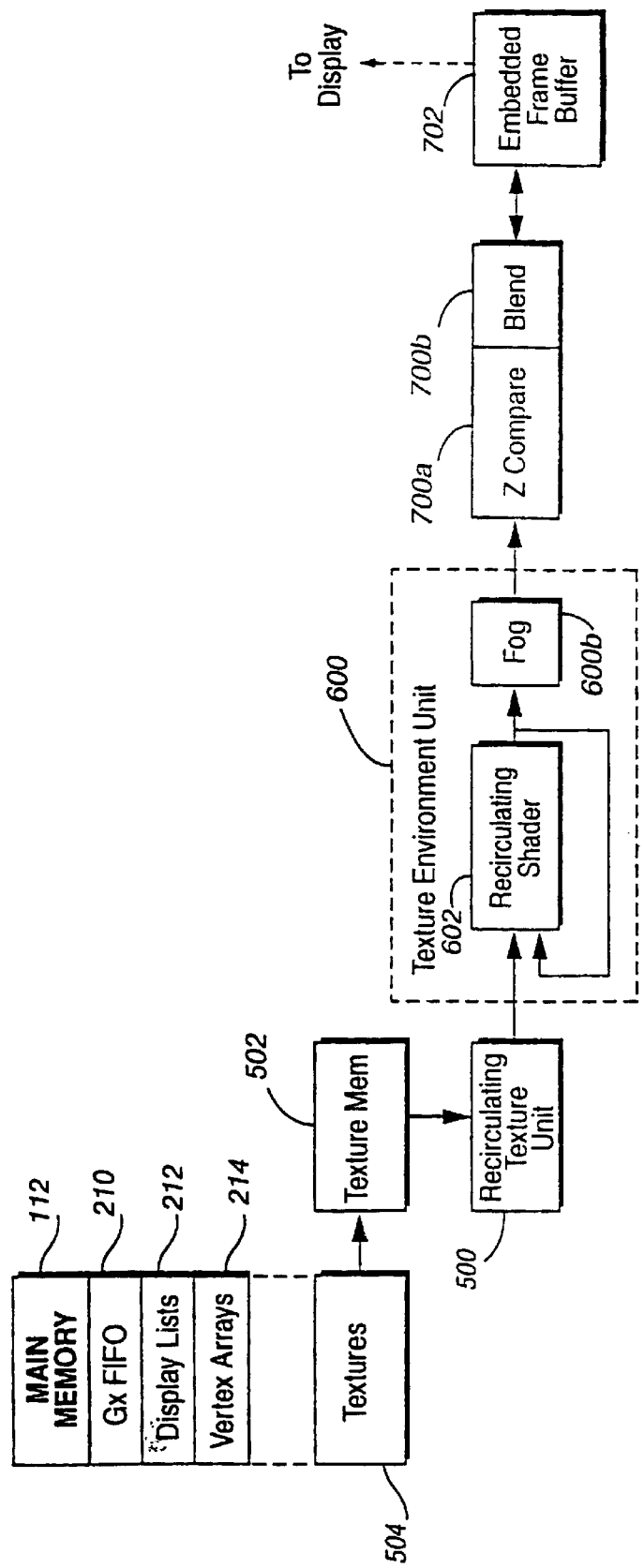
*Fig. 15* Example Recirculating Shader

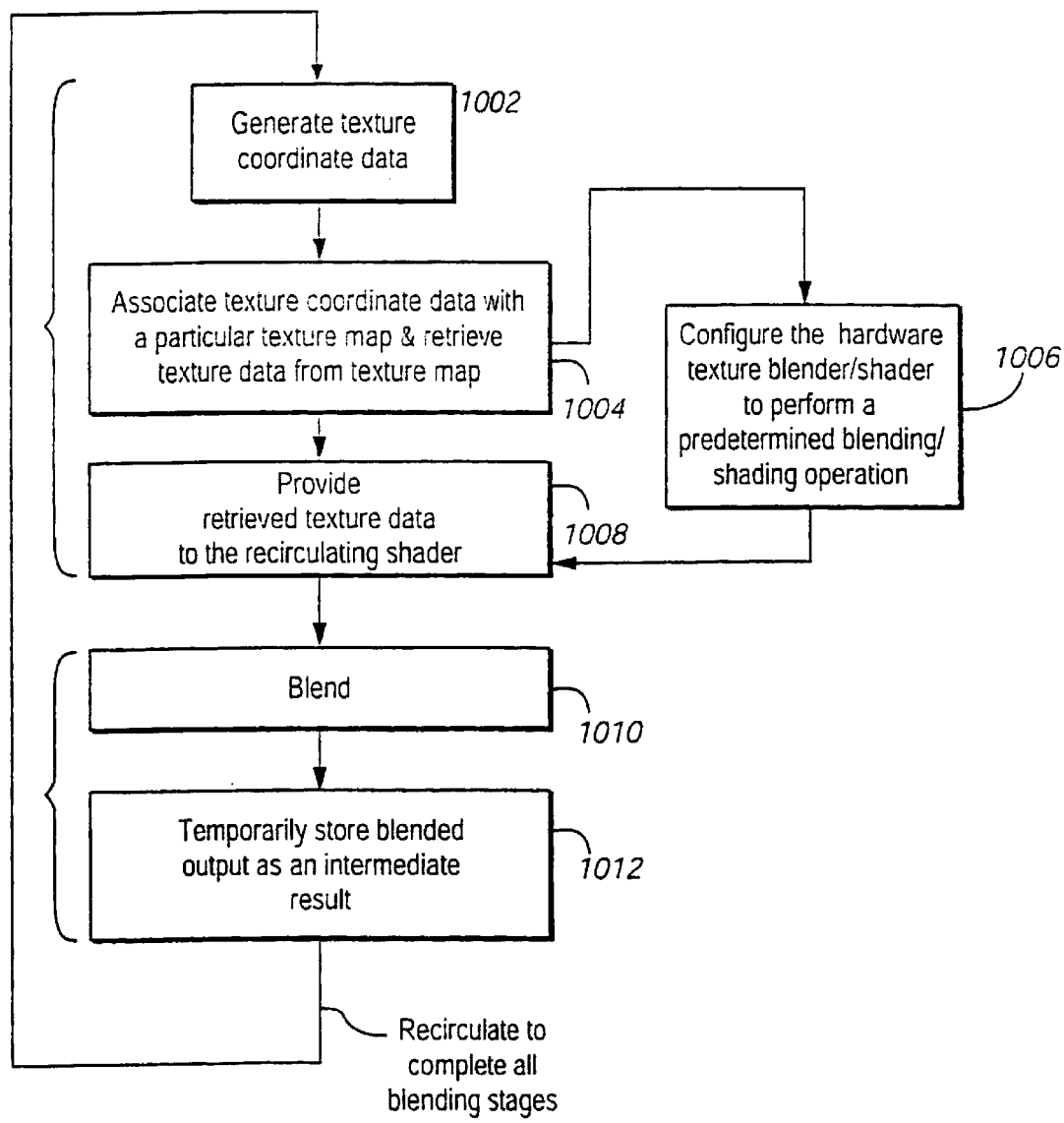
FIG. 16 Example Multi-Texturing Process

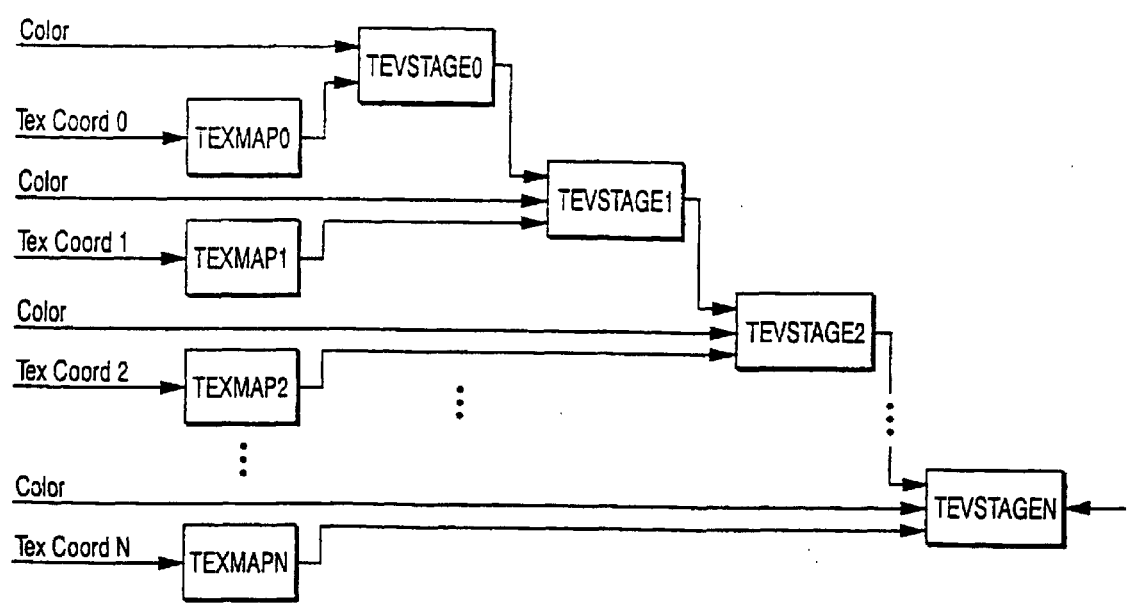
Fig. 17 Example Multi-Texture Pipeline Using Recirculating Shader

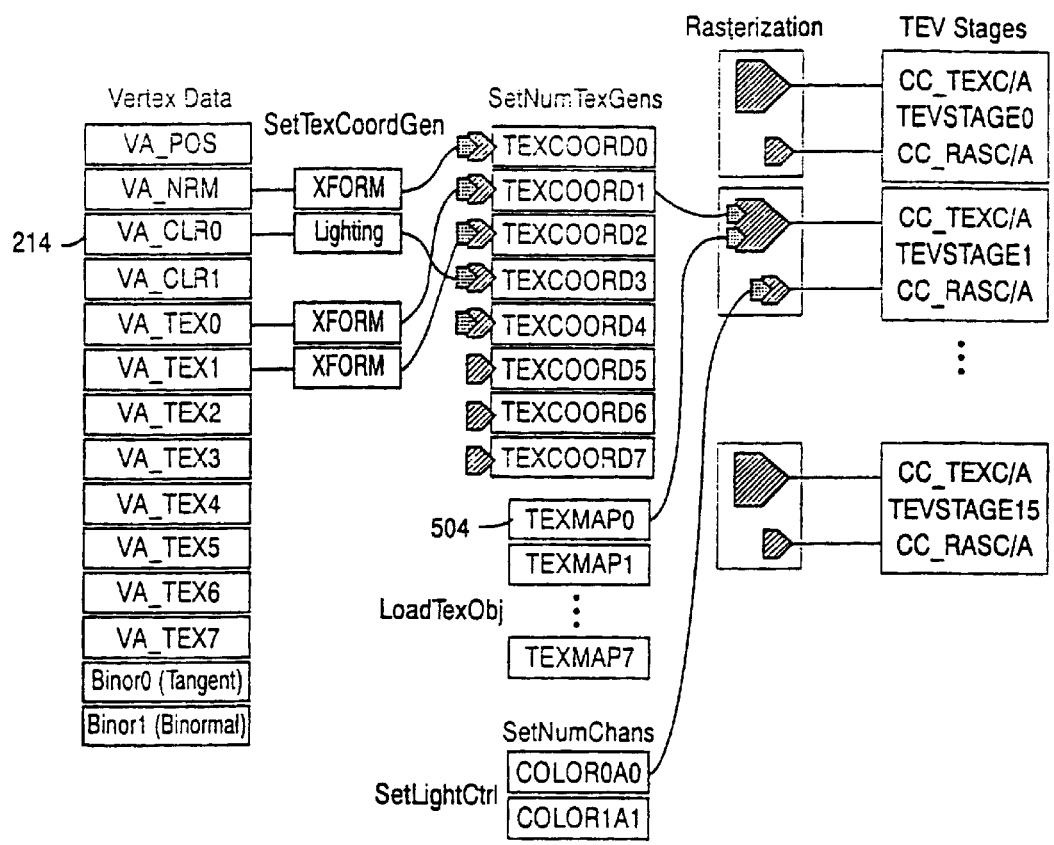
Fig. 18 Example Multi-Texture Pipeline Control

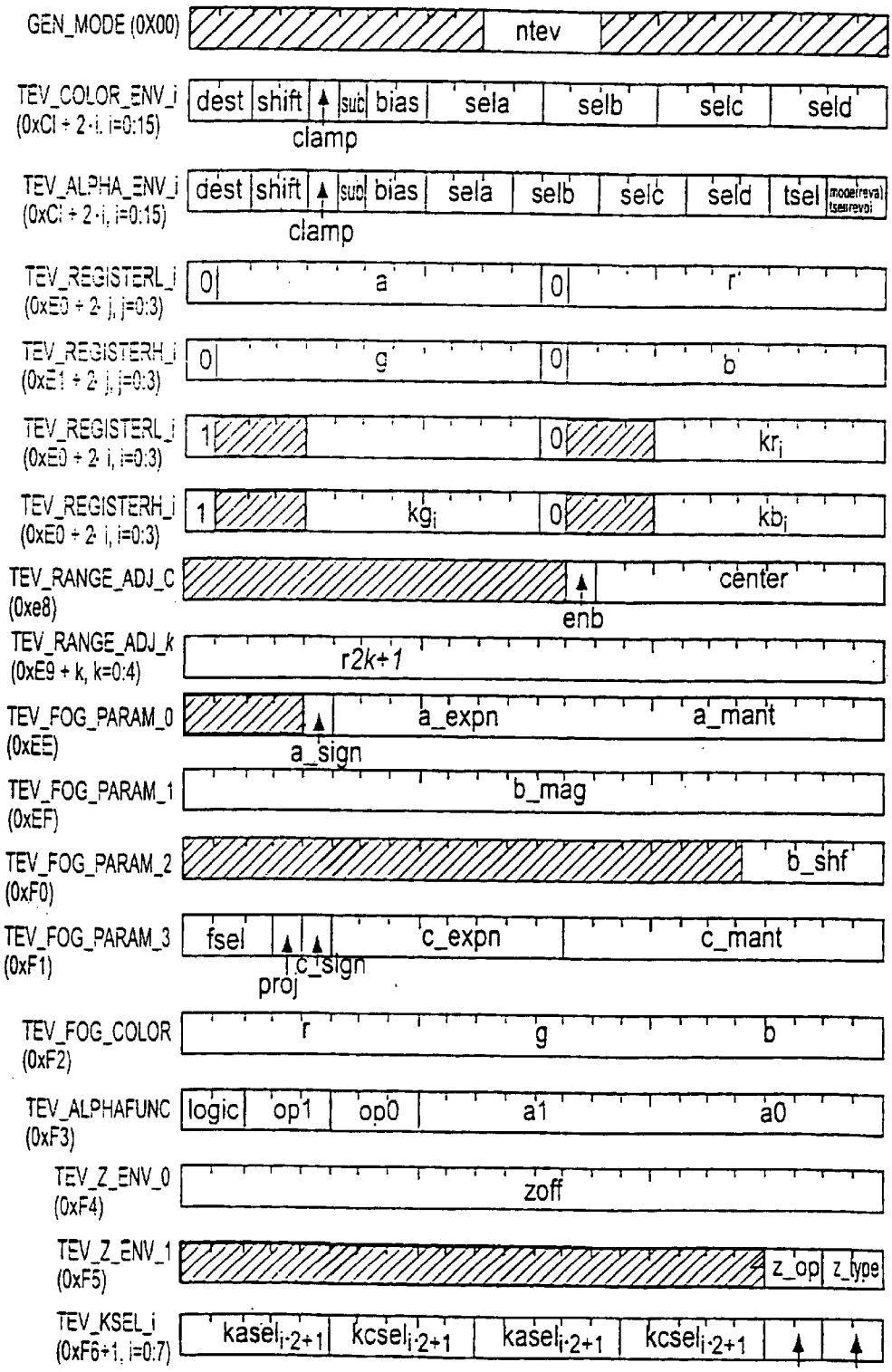
Fig. 19 Example Control Registers

RECIRCULATING SHADE TREE BLENDER FOR A GRAPHICS SYSTEM

This application claims the benefit of U.S. Provisional Application serial No. 60/226,888, filed Aug. 23, 2000, the entire content of which is hereby incorporated by reference in this application. This application is related to concurrently-filed application Ser. No. 09/726,212 of Law et al entitled "Method And Apparatus For Providing Logical Combination Of N Alpha Operations Within A Graphics System".

FIELD OF THE INVENTION

The present invention relates to computer graphics, and more particularly to interactive graphics systems such as home video game platforms. Still more particularly this invention relates to recirculating shader hardware for implementing shade trees for multitexturing and other effects.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64® and various 3D graphics cards now available for personal computers. It is now possible to interact with exciting 3D animations and simulations on relatively inexpensive computer graphics systems in your home or office.

A problem graphics system designers confronted in the past was how to efficiently implement shaders in a graphics system. Generally, shading is the process performing lighting computations and determining pixel colors/opacities from them. Generally, there are three main types of shading in common use: flat, Gouraud, and Phong. These correspond to computing the light per polygon, per vertex and per pixel. A wide variety of shading models have been created. There is no one shading model that pleases all users and is suitable for all applications. Therefore, several design approaches have been suggested to provide flexibility in terms of programmer selection and specification of shading models.

In the paper by R. L. Cook called "Shade Trees" (*SIGGRAPH* 84, pages 223–231, the author described a special purpose language in which a shader is built as a tree expression called a shade tree. Generally speaking, a shade tree is a tree of nodes each of which takes parameters from its children and produces parameters for its parent. For example, the parameters may be the terms of the illumination equation (e.g., specular coefficient or surface Normal). Other parameters might comprise atmospheric effects (e.g., haze) or projections. The RenderMan Interface uses shade trees to provide user-defined and system-defined shaders for a variety of purposes.

While shade trees have been used extensively in non-real-time rendering graphics systems, problems arise when trying to accommodate the flexibility that shade trees provide within the context of real-time rendering. It would be highly desirable to be able to provide the flexibility of shade trees within low cost real-time rendering systems such as, for example, home video game platforms and personal computer graphics cards.

Another problem confronting graphics systems designers has been how to efficiently provide a feature called single-pass multitexturing. Basically, texturing is a technique for efficiently modeling the properties of a surface. For example, instead of modeling the geometry of each individual brick and mortar line within a brick wall, it is possible to electronically "glue" an image of a brick wall onto a surface. Such texturing capabilities can be used to significantly increase image complexity without a corresponding increase in modeling and processing costs.

The extension to texturing known as multitexturing allows two or more textures to be applied to the same surface. For example, suppose you want to create an image of the earth as it might be seen from outer space. You could model the earth as a sphere and apply two different textures to it. The first texture could be an image of the continents and oceans. The second texture could be an image of cloud cover. By moving the cloud cover texture image relative to the continent/ocean texture image, you could create a very realistic dynamic texture-mapped image.

Some graphics accelerators support multitexturing in which two or more textures are accessed during the same rendering pass. See, for example, Microsoft's Direct X 6.0 SBK (1998); Segal et al., "The Open GL Graphics System: A Specification" (Version 1.2.1) (March 1998) (www.OpenGL.org). Certain PC graphics accelerator cards also provide single pass multitexturing. However, further improvements are possible.

The present invention provides a generalized shade tree blender that can be used for multitexturing as well as a number of other flexible blending effects. In accordance with one aspect provided by this invention, recirculating shader hardware within a graphics pipeline can be controlled to provide a number of independently controllable blending stages. A shader hardware includes intermediate storage for results of previous blending operations. The shader hardware can select different inputs and perform different operations for each blending stage. Thus, relatively low cost and compact shader hardware can be used to implement arbitrarily complex shade trees.

In accordance with another aspect provided by this invention, the results of a first texture mapping operation is provided to a reconfigurable shader. The shader performs a blending operation in response to the first texture mapping operation. The shader is then reconfigured, and is connected to receive the results of a further texturing operation. The reconfigured shader combines its previous results with the results of the further texturing operation to provide a blended output.

In accordance with a further aspect provided by this invention, a shader can be recirculated any desired number of times to implement an arbitrarily complex shading model.

Each recirculation or "stage" can be programmed to have any one of a number of desired blending operations and to blend from selected ones of a variety of color, opacity or depth sources. The number of recirculations may be limited in a particular implementation in view of real-time rendering timing constraints, but a reasonable number of recirculation stages (e.g., fifteen) can provide great flexibility in implementing a variety of complex shading models.

In accordance with another aspect provided by this invention, a recirculating shade tree pixel blender is implemented in hardware to minimize processing time per stage. In more detail, a preferred embodiment of this invention provides a relatively low chip-footprint, versatile texture-environment processing subsystem including a hardware accelerated programmable texture shader/pixel blender that circulates computed color, opacity and other data over multiple cycles/stages. The texture environment subsystem can combine per-vertex lighting, textures, rasterized colors, opacities, and depths to form pixel parameters for display. Blending operations for color (e.g., RGB) and alpha components may be independently processed within the texture environment subsystem by a blending unit comprising a set of color/alpha combiner (shader) hardware that is reused over multiple processing stages to implement multitexturing and other effects. Selectable current-color/opacity input/output registers may be shared among all stages to store intermediate results. The shader hardware can be reconfigured for each stage to provide a chain of specifiable blending/shading operations supporting single rendering pass multitexturing and other effects.

BRIEF DESCRIPTION OF THE DRAWINGS

These and other features and advantages provided by the invention will be better and more completely understood by referring to the following detailed description of presently preferred embodiments in conjunction with the drawings, of which:

FIG. 5 is an example logical flow diagram of the FIG. 4 graphics and audio processor;

FIG. 8 shows an example recirculating shader block diagram;

FIG. 9 shows an example recirculating shader input multiplexer;

FIG. 10 shows an example recirculating shader operation block diagram;

FIG. 11 shows an example recirculating shader implementation;

FIGS. 12A and 12B illustrate an example color swap feature;

FIG. 13 shows an example texture environment unit implementation;

FIG. 14 shows an example fog calculation unit;

FIG. 15 shows an example of how the recirculating shader can be used for multitexturing;

FIG. 16 shows an example multitexturing process using the recirculating shader;

FIG. 17 shows an example multi-texture pipeline using the recirculating shader;

FIG. 18 shows an example multi-texture pipeline control;

FIG. 19 shows example texture environment unit control registers; and

DETAILED DESCRIPTION OF EXAMPLE EMBODIMENTS OF THE INVENTION

Figure 1:
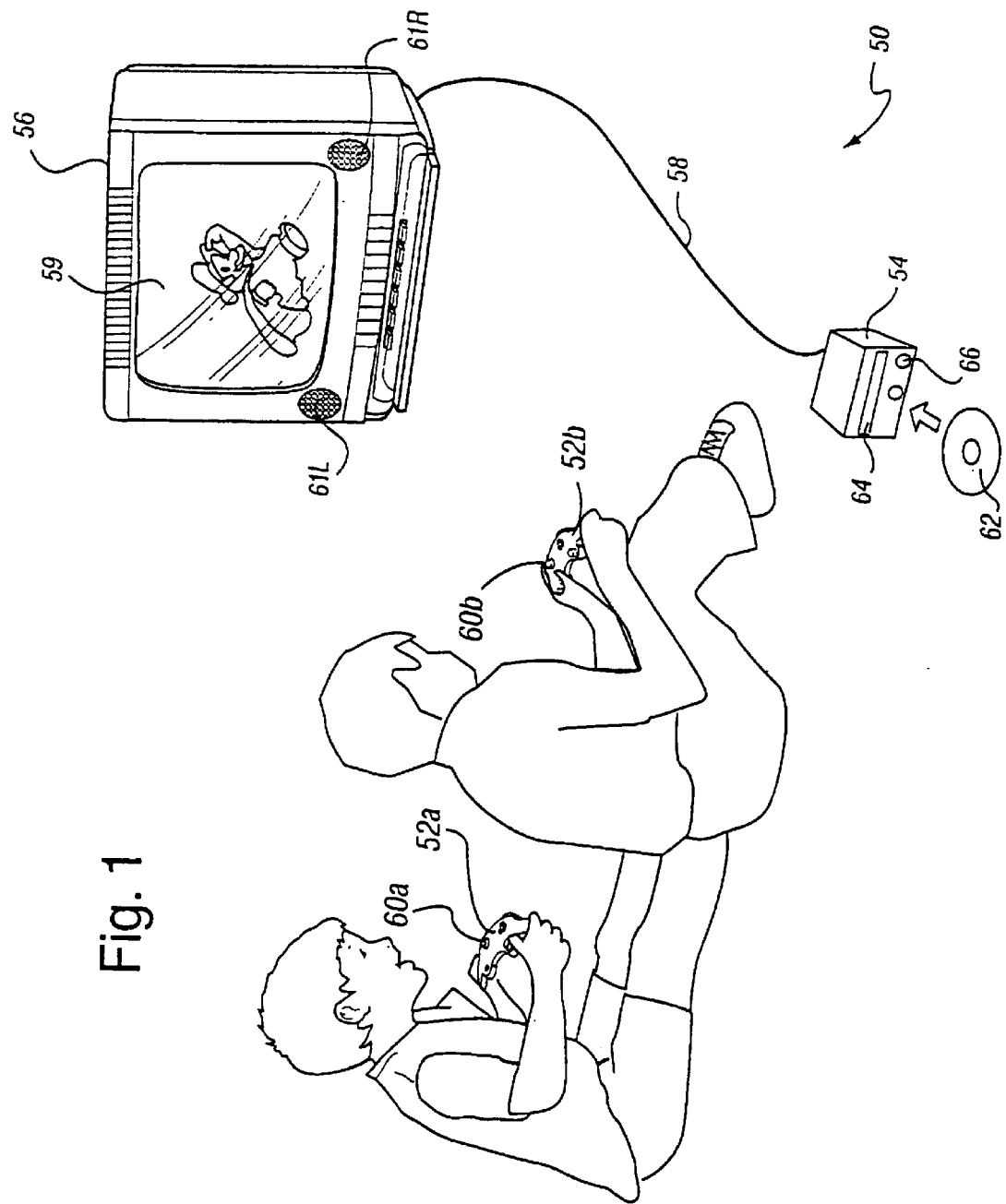
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real-time, a digital representation or model of a three-dimensional world. System 50 can display some or all of the world from any arbitrary viewpoint. For example, system 50 can interactively change the viewpoint in response to real-time inputs from handheld controllers 52a, 52b or other input devices. This allows the game player to see the world through the eyes of someone within or outside of the world. System 50 can be used for applications that do not require real-time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
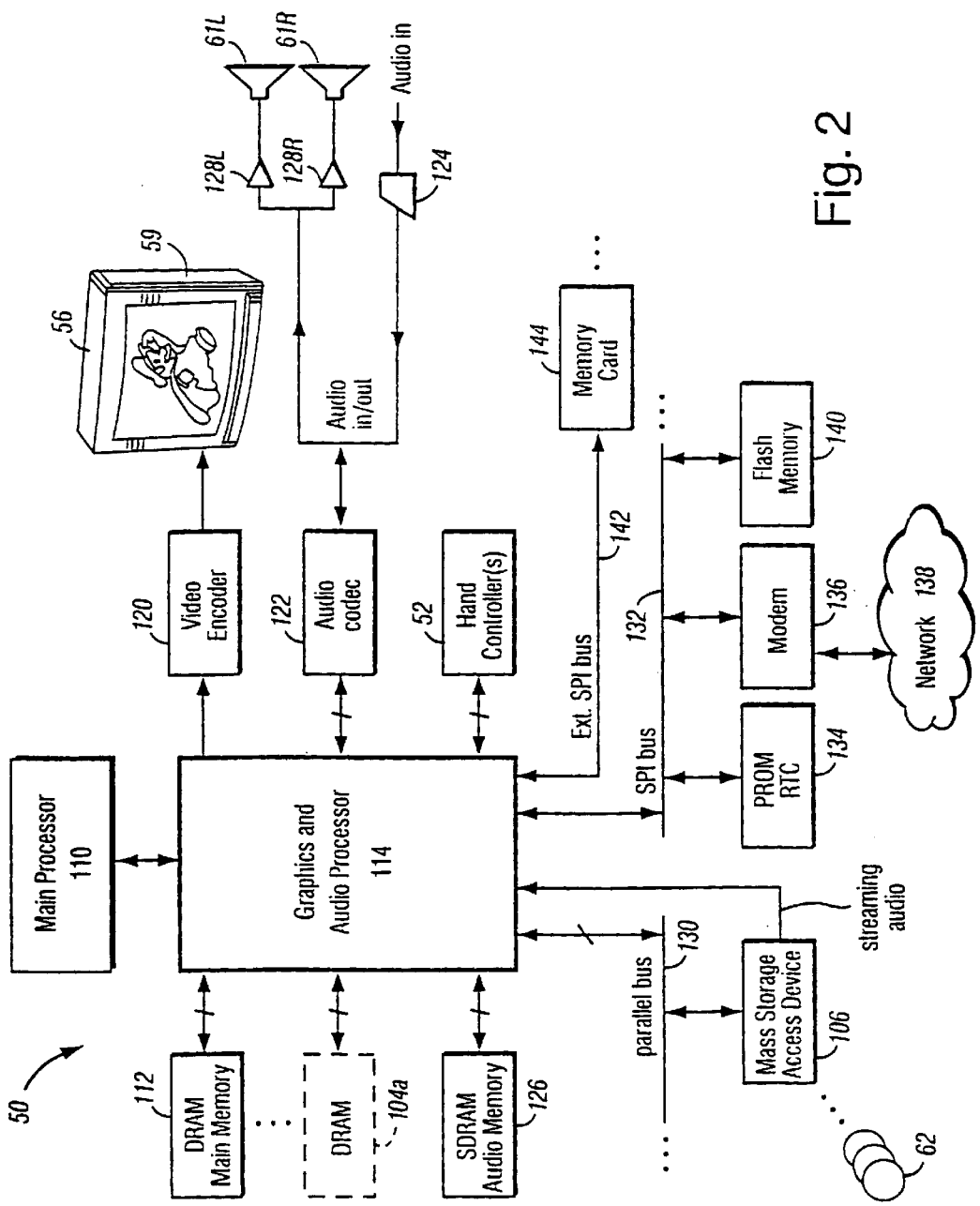
FIG. 2 is a block diagram of the FIG. 1 example computer graphics system.

FIG. 2 shows a block diagram of example components of system 50. The primary components include:
- a main processor (CPU) 110,
- a main memory 112, and
- a graphics and audio processor 114.

In this example, main processor 110 (e.g., an enhanced IBM Power PC 750) receives inputs from handheld controllers 108 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:
- a programmable read-only memory and/or real-time clock 134,
- a modem 136 or other networking interface (which may in turn connect system 50 to a telecommunications network 138 such as the Internet or other digital network from/to which program instructions and/or data can be downloaded or uploaded), and
- flash memory 140.

A further external serial bus 142 may be used to communicate with additional expansion memory 144 (e.g., a memory card) or other devices. Connectors may be used to connect various devices to busses 130, 132, 142.

Example Graphics and Audio Processor

Figure 3:
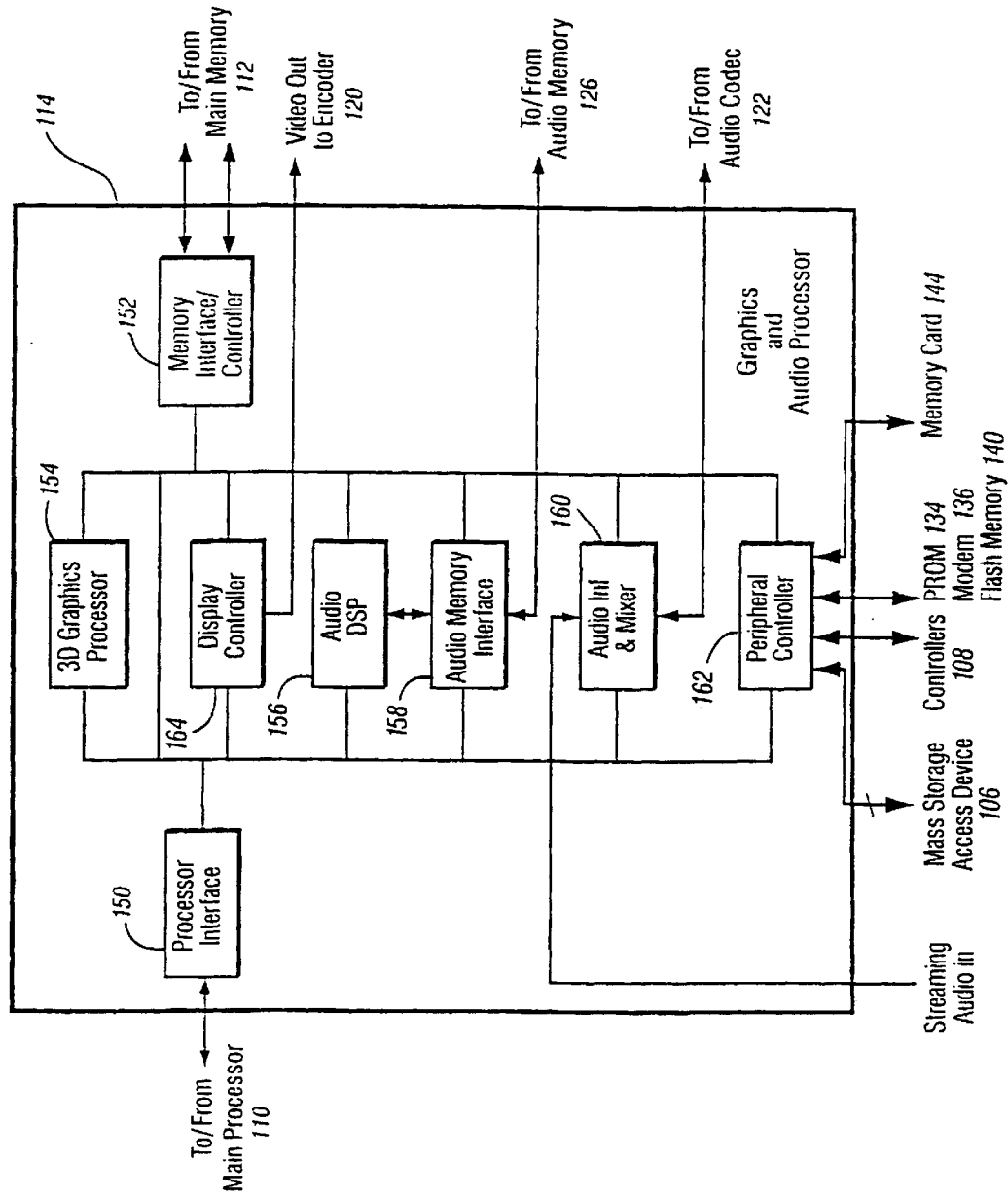
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:
- a processor interface 150,
- a memory interface/controller 152,
- a 3D graphics processor 154,
- an audio digital signal processor (DSP) 156,
- an audio memory interface 158,
- an audio interface and mixer 160,
- a peripheral controller 162, and
- a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 160 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
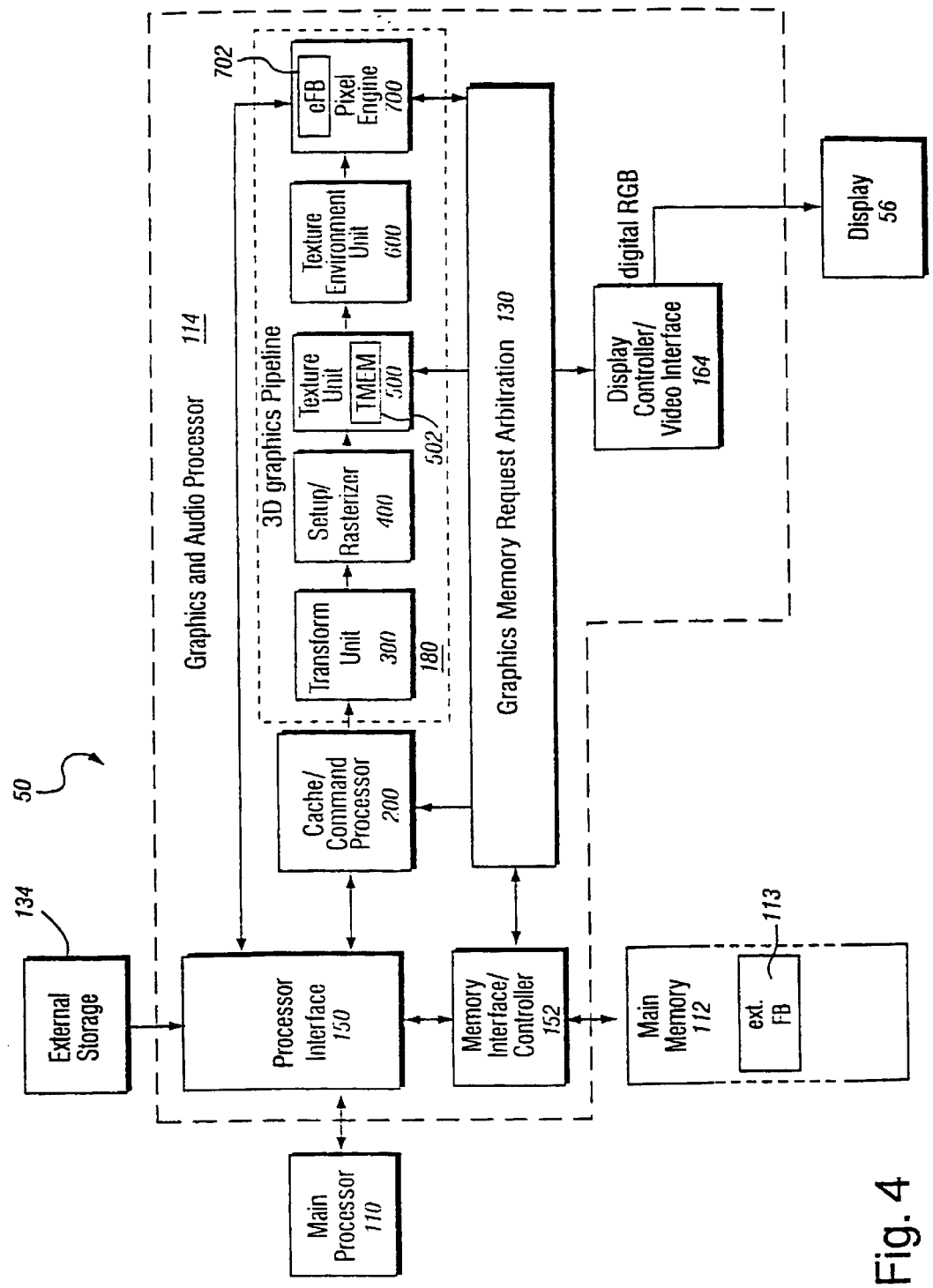
FIG. 4 is a block diagram of the example 3D graphics processor shown in FIG. 3.

FIG. 4 shows a more detailed view of an example 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 115 to minimize memory latency, and also has a write-gathering buffer 111 for uncached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 56.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 110. The command processor 200 fetches:

- command streams from main memory 112 via an on-chip FIFO memory buffer 216 that receives and buffers the graphics commands for synchronization/flow control and load balancing,
- display lists 212 from main memory 112 via an on-chip call FIFO memory buffer 218, and
- vertex attributes from the command stream and/or from vertex arrays 214 in main memory 112 via a vertex cache 220.

Command processor 200 performs command processing operations 200a that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:
- a transform unit 300,
- a setup/rasterizer 400,
- a texture unit 500,
- a texture environment unit 600, and
- a pixel engine 700.

Transform unit 300 performs a variety of 2D and 3D transform and other operations 300a (see FIG. 5). Transform unit 300 may include one or more matrix memories 300b for storing matrices used in transformation processing 300a. Transform unit 300 transforms incoming geometry per vertex from object space to screen space; and transforms incoming texture coordinates and computes projective texture coordinates (300c). Transform unit 300 may also perform polygon clipping/culling 300d. Lighting processing 300e also performed by transform unit 300b provides per vertex lighting computations for up to eight independent lights in one example embodiment. Transform unit 300 can also perform texture coordinate generation (300c) for embossed type bump mapping effects, as well as polygon clipping/culling operations (300d).

Setup/rasterizer 400 includes a setup unit which receives vertex data from transform unit 300 and sends triangle setup information to one or more rasterizer units (400b) performing edge rasterization, texture coordinate rasterization and color rasterization.

Texture unit 500 (which may include an on-chip texture memory (TMEM) 502) performs various tasks related to texturing including for example:
- retrieving textures 504 from main memory 112,
- texture processing (500a) including, for example, multi-texture handling, post-cache texture decompression, texture filtering, embossing, shadows and lighting through the use of projective textures, and BLIT with alpha transparency and depth,
- bump map processing for computing texture coordinate displacements for bump mapping, pseudo texture and texture tiling effects (500b), and
- indirect texture processing (500c).

For details concerning the operation of blocks 500a, 500b and 500c, a more detailed description of the example graphics pipeline circuitry and procedures for performing regular and indirect texture look-up operations is disclosed in commonly assigned co-pending patent application, Ser. No. 09/722,382, entitled "Method And Apparatus For Direct And Indirect Texture Processing In A Graphics System" and its corresponding provisional application, Ser. No. 60/226,891, filed Aug. 23, 2000, both of which are incorporated herein by this reference.

Texture unit 500 outputs filtered texture values to the texture environment unit 600 for texture environment processing (600a). Texture environment unit 600 blends polygon and texture color/alpha/depth, and can also perform texture fog processing (600b) to achieve inverse range based fog effects. Texture environment unit 600 can provide multiple stages to perform a variety of other interesting environment-related functions based for example on color/alpha modulation, embossing, detail texturing, texture swapping, clamping, and depth blending.

As shown in FIG. 5, texture environment unit 600a in the example embodiment includes a recirculating shader 602. Recirculating shader 602 in this example comprises a hardware-based general purpose blender that can blend between a number of selected inputs and can retain blended results for further blending in a subsequent blending operation. Recirculating shader 602 in this example comprises reusable blending logic that can implement a number of different blending operations. In the example embodiment, recirculating shader 602 can retain a number of different distinct previous blending results and can blend newly provided values with any of these previously blended results. This allows recirculating shader 602 to implement any arbitrary shade tree through successive recirculated stages. See, for example, Cook, *Shade Trees, SIGGRAPH Proceedings*, pages 223–231 (July 1984). The complexity of the shade tree that recirculating shader 602 can implement is limited by the total number of times recirculating shader 602 can recirculate within a given rendering pass. In the example embodiment, recirculating shader 602 can provide up to fifteen recirculated stages in the example embodiment but different implementations could provide different numbers of recirculating stages.

Once texture environment unit 600 generates a blended color/alpha/z output, pixel engine 700 performs depth (z) compare (700a) and frame buffer pixel blending (700b). In this example, pixel engine 700 stores data into an embedded (on-chip) frame buffer memory 702. Graphics pipeline 180 may include one or more embedded DRAM memories 702 to store frame buffer and/or texture information locally. Z compares 700a' can also be performed at an earlier stage in the graphics pipeline 180 depending on the rendering mode currently in effect (e.g., z compares can be performed earlier if alpha blending is not required). The pixel engine 700 includes a copy operation 700c that periodically writes on-chip frame buffer 702 to main memory 112 for access by display/video interface unit 164. This copy operation 700c can also be used to copy embedded frame buffer 702 contents to textures in the main memory 112 for dynamic texture synthesis effects. Anti-aliasing and other filtering can be performed during the copy-out operation. The frame buffer output of graphics pipeline 180 (which is ultimately stored in main memory 112) is read each frame by display/video interface unit 164. Display controller/video interface 164 provides digital RGB pixel values for display on display 102.

Example Recirculating Shader

Figure 7:
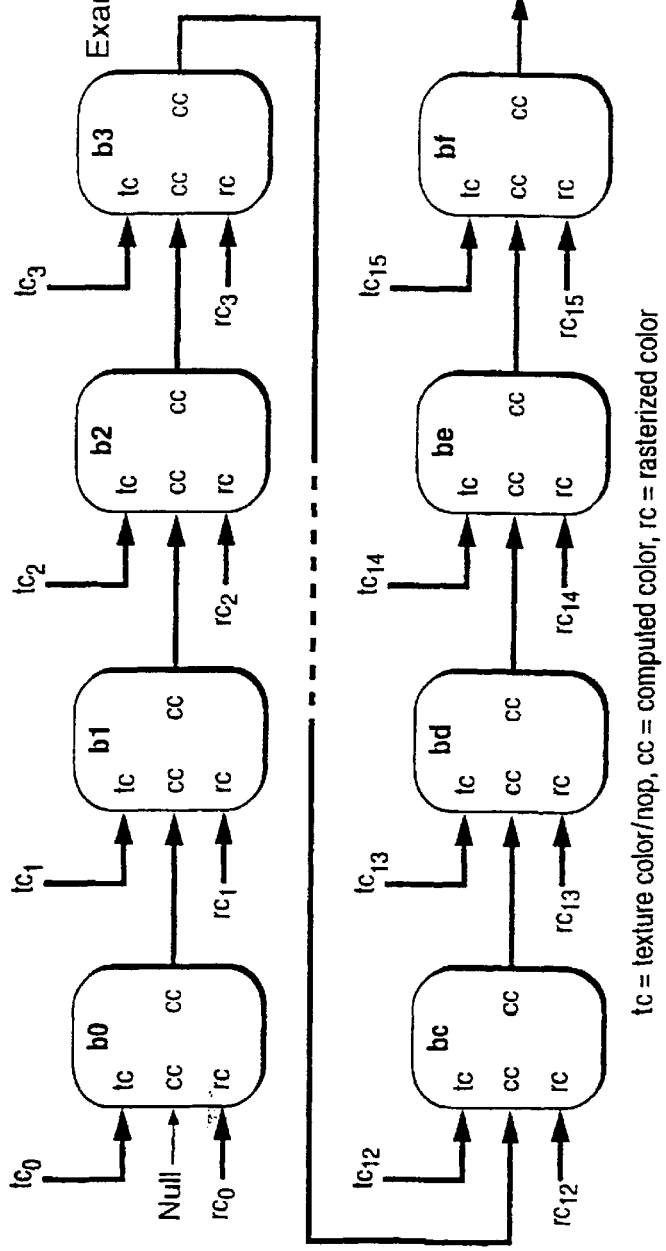
FIG. 7 shows an example shading pipeline implemented using the recirculating shader.
Figure 6:
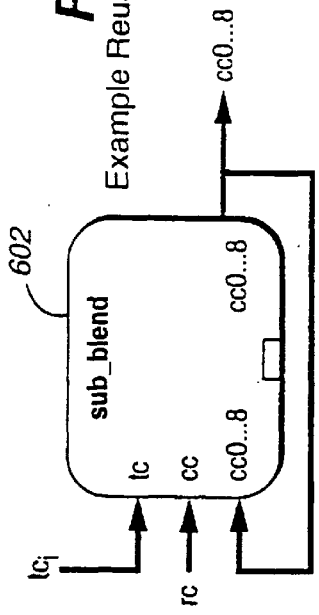
FIG. 6 shows an example reusable recirculating shader.

FIG. 6 shows a high-level block diagram of an example recirculating shader implementation, and FIG. 7 shows a logical diagram of an example shader pipeline that can be implemented using the FIG. 6 recirculating shader. As shown in FIG. 6, recirculating shader 602 receives a number of different inputs and generates an output that can be fed back to its input.

In more detail, recirculating shader 602 in the example embodiment can select between any of the following types of inputs:

rasterized color/alpha, texture color/alpha, computed color/alpha, other.

In the example embodiment, the rasterized color/alpha may be provided by rasterizer 400. For example, the rasterized color/alpha can be Gouraud shaded pixels determined by rasterizer 400 based on lighting calculations performed by transform unit 300 on a per-vertex basis. Texture color/alpha may be the result of a direct or indirect texture mapping operation performed by texture unit 500. Recirculating shader 602 blends any/all of these values and/or constants based on a programmable blending operation to provide a computed color/alpha value at its output. This computed color/alpha value can be fed back as an input to recirculating shader 602 for use in a subsequent blending operation.

Each independently controlled recirculation of recirculating shader 602 may be referred to as a "stage." In the example embodiment, recirculating shader 602 is implemented by high-speed hardware logic in an application-specific integrated circuit (ASIC). Recirculation of a high-speed hardware logic functionality to provide a number of independently-controlled logical stages provides flexibility by allowing any desired number of shading/blending stages while reducing hardware complexity and required integrated circuit real estate. Each recirculating shader 602 stage in the example embodiment computes independent blending operations for color (RGB) and alpha (transparency). The blending computation in the example embodiment can be programmed by the application running on main processor 110 from a number of different operations including, for example:

modulate, modulate 2×, modulate 4×, add, add sign, add sign 2×, subtract, add smooth, blend diffuse alpha, blend texture alpha, blend factor alpha, blend current alpha, blend texture alpha pre-multiplied, modulate alpha and add color, modulate color and add alpha, modulate inverse alpha and add color, modulate inverse color and add alpha, specular color and texture (multiple stages), embossing (multiple stages), detail texture (multiple stages), other operations.

FIG. 7, shows an example recirculating shading pipeline that can be provided by recirculating shader 602. This logical pipeline provides multiple sequential blending stages each of which can blend a computed color/alpha with a texture color/alpha and/or a rasterized color/alpha. In the example embodiment, up to sixteen different stages of blending operations can be provided with each stage receiving interpolated texture and raster color/alpha. Programming of rasterizer 400 (see FIG. 5) specifies which one of eight texture coordinate sets and which one of eight physical textures 504 to use for texture interpolation provided by recirculating shader 602. Rasterizer 400 may also control which one of two rasterized colors is used for a given recirculating shader 602 stage.

Example Recirculating Shader Implementation

FIG. 8 shows a block diagram of an example implementation of recirculating shader 602 suitable for use in texture environment block 600. In the example shown, recirculating shader 602 includes a number of input multiplexers 656 for selecting among various different inputs (e.g., texture color/alpha, rasterized color/alpha, and results of prior blending operations) to be operated on by a blending operator 658. The results of blending operator 658 can be stored in any one of four intermediate registers 660 in the example embodiment. Any one of these registers 660 may then be selected by input multiplexers 656 for a further blending operation in a subsequent blending stage.

In the example embodiment, recirculating shader 8 provides a color component operation and a separate alpha component operation for each blending stage. For a given stage, the operation performed by block 658 can be different for the color component and the alpha component. The color and alpha component operations can be independently controlled by the application running on main microprocessor 110. This ability to provide independent color and alpha operation controls for each recirculating stage allows recirculating shader 602 to perform arbitrarily complex alpha (transparency) trees of operations at no additional cost in terms of processing speed. The alpha produced by the last stage of recirculating shader 602 is input to alpha compare block 662. The results of this alpha compare operation 662 can be used to, for example, conditionally mask color and/or z writes to embedded frame buffer 702.

In the example embodiment, the final blended output of the last blending stage is stored in register 660(4) for color output and/or alpha thresholding 662. A z-texturing path is also provided for z-texturing. See copending commonly assigned U.S. patent application Ser. No. 09/722,378 of Leather et al. entitled "Z-Texturing" and its corresponding Provisional Application No. 60/226,913, filed Aug. 23, 2000, both of which are incorporated herein by reference.

Example Input Multiplexer Configuration

FIG. 9 shows an example recirculating shader input multiplexer configuration 656. As shown in FIG. 9, each one of four multiplexers 656a . . . 656d can select one of a number of different color inputs including:

the contents of register 660(1), the contents of register 660(2), the contents of register 660(3), the contents of register 660(4), texture color(s), texture alpha(s), constant (register) color(s), constant (register) alpha(s), rasterized color(s), rasterized alpha(s), a few useful fixed constants, programmable constants, texture color components copied to other texture color channels (this feature is useful for dot product, intensity calculation and color space conversion), other inputs.

Input controls to multiplexers 656 can be specified independently for each r recirculating shader stage. Multiplexer 656 outputs in example embodiment are unsigned 8-bit values or signed 10-bit values but other implementations could provide different precisions.

Example Blending Calculations/Operations

FIG. 10 shows an example blending/shading operator 658. In the example embodiment, recirculating shader 602 can perform, for each stage, a computation that can be generalized as:

$$R=(D+(-1)^{sub}*((1-C)*A+C*B)+bias<<shift$$

The arguments A, B, C and D in calculation block 664 in the example embodiment are selected from:

four color registers, rasterized color (diffuse or specular), texture, the alpha components of the above colors or the defined constants, static constants, programmable constants.

Calculation block 664 operates on values A, B and C in the example embodiment. The output of calculation block 664 is passed through an optional negate block 666 and is added by adder 668 with the output of "D" multiplexer 656(D) and an optional bias value. The resulting sum can be scaled by a scaler block 670 and clamped by a clamp block 672 before being stored in any one of registers 660(1), 660(2), 660(3), 660(4) for output and/or subsequent further blending.

In the example embodiment, scale block 670 can scale by 0.5, 1, 2 or 4—but other implementations would provide other scaling factors. Clamping block 672 can support a number of different clamping modes. In one implementation, incoming values A, B, C may be unsigned 8-bit values in one implementation, incoming value D can be a signed 10-bit value, and the output of clamp block 672 can be a signed 10-bit value.

FIG. 11 shows a more detailed implementation of recirculating shader 602. In this example, calculation block 664 is implemented by hardware multipliers 664b, 664c; a "1−f" complementing block 664a; and an adder 664d. In this example, the multiplier 664b multiplies the B and C inputs and provides the resulting product to one input of adder 664d. The other multiplier 664c multiplies the A input by the value (1−C) and provides its resulting product to the other input of adder 664d. This hardware computes the equation shown in FIG. 10 as being computed by block 664. The resulting product provided by an adder 664 is outputted to the sign reversal block 666.

In the embodiment shown in FIG. 11, an additional comparator 674 is provided to compare multiplexer 656 outputs A and D, with the results of the comparison being used to select between multiplexer 656 output C and a zero value (via multiplexer 676). An additional multiplexer 678 is provided in the data path to select between the output of sign operator 666 and the output of multiplexer 676 (i.e., the result of the comparison operation). Such comparisons can save recirculation stages by performing a blending calculation and a compare result operation all in one recirculation stage. This comparator 674 in the example embodiment can compare one, two or three channels simultaneously to provide 8-bit, 16-bit or 24-bit compares.

In the example embodiment shown in FIG. 11, scale operation 670 provides scaling at any of the following factors:

0.5,

1,

2,

4.

In the example embodiment, different scaling blocks 670a, 670b, 670c, 670d are selected by a multiplexer 670e for providing to clamp block 672.

In the example embodiment shown in FIG. 11, inputs to multiplexer 656 may optionally be passed through "color swap" blocks 680 before calculation by block 664. Color swap block 680 can be used to broadcast each color component (R, G, or B) to the other two color components. See FIGS. 12A, 12B. This feature can be used for dot product, intensity calculation and color space conversion, for example.

The example embodiment shown in FIG. 11 includes support for static and programmable constants. In one embodiment, a constant select is used to select an arbitrary constant value determined by constant select registers specifying whether to use one of plural statically defined values or one of plural programmable color register values. Such programmable and fixed constants provide flexibility in the blending operation. In other embodiments, a smaller number of fixed constants (e.g., 1.0) could be used instead.

The FIG. 11 data path can be set up for different blending operations such as, for example, those specified in D3D of DirectX 6.0 or 7.0. In the example embodiment, seven parameters are used to program a recirculating shader 602 blending stage:

argument A, argument B, argument C, argument D, sub, bias, shift.

The following are some example blending operations:

SelectArg $$R=(0, 0, 0, D, 0, 0, 0)=D$$

Modulate, Modulate2×, Modulate4×

$$R=(0, B, C, 0, 0, 0, 0)=B*C$$

The components of argument B and C are multiplied together. A scaling factor of 2 or 4 can be used for brightening:

$$R=(0, B, C, 0, 0, 0, 1)=B*C*2$$

$$R=(0, B, C, 0, 0, 0, 2)=B*C*4$$

Add

The components of the arguments are added together:

$$R=(A, 0, 0, D, 0, 0, 0)=A+D$$

AddSigned, AddSigned2×

The components of the arguments are added with a −0.5 bias, making the effective range of values from −0.5 to 0.5. The result can be multiplied by two for brightening:

$R=(A, 0, 0, D, 0, -0.5, 0)=A+D-0.5$ $R=(A, 0, 0, D, 0, -0.5, 1)=(A+D-0.5)*2$

Subtract

The components of the second argument is subtracted from the first argument:

$R=(A, 0, 0, D, 1, -0, 0)=D-A$

AddSmooth

The basic add operation is mathematically correct for glows, fog, etc. However, it can saturate abruptly causing a contouring artifact. A better looking but less mathematically correct approach is to subtract the product:

$R=(A, 0, , C, C, 0, 0, 0)=C+A*(1-C)$

BlendDiffuseAlpha, BlendTextureAlpha, BlendFactorAlpha, BlendCurrentAlpha

Linear blending is performed using the alpha from: interpolated alpha from vertices (C=rasterized alpha), alpha from current texture (C=texture alpha), a constant alpha (C=constant alpha), and/or alpha of current color (C=computed alpha):

$R=(A, B, C_A, 0, 0, 0, 0)=A*(1-C_A)+B*C_A$

BlendTextureAlphaPM

Linear blending with a pre-multiplied alpha:

$R=(A, 0, C_A, D, 0, 0, 0)=D+A*(1-C_A)$

ModulateAlpha__AddColor

The second argument is modulated with the first's alpha and the result is added to the first argument.

$R_{GBA}=(0, B_A, C_{RGB}, B_{RGB}, 0, 0, 0)=B_{RGB}*C_{RGB}$

ModulateColor__AddAlpha

The arguments are modulated and the first argument's alpha is then added:

$R_{GBA}=(0, B_{RGB}, C_{RGB}, B_A, 0, 0, 0)=B_{RGB}*C_{RGB}+B_A$

ModulateInvAlpha__AddColor

Similar to ModulateAlpha__AddColor, but it uses the inverse of the first argument's alpha:

$R_{GBA}=(A_{RGB}, 0, C_A, C_{RGB}, 0, 0, 0)=(1-C_A)*A_{RGB}+C_{RGB}$

ModulateInvColor__AddAlpha

Similar to ModulateColor__AddAlpha, but it uses the inverse of the first color:

$R_{RGB}=(A_{RGB}, 0, C_A, C_{RGB}, 0, 0, 0)=(1-C_A)*A_{RGB}+C_{RGB}$

ModulateInvColor__AddAlpha

Similar to ModulateColor__AddAlpha, but it uses the inverse of the first color:

$R_{RGB}=(A_{RGB}, 0, C_{RGB}, C_A, 0, 0, 0)=(1-C_{RGB})*A_{RGB}+C_A$

Specular Color and Texture

In addition to the above operation, more complicated blending can be achieved by using multiple stages. For example:

Final Color=Specular Texture*Specular Color+Diffuse Texture*Diffuse Color

It can be implemented using two stages as:

1. $R=(0, T_{SPEC}, C_{SPEC}, 0, 0, 0, 0)=T_{SPEC}*C_{SPEC}$

2. $R=(0, T_{DIFF}, C_{DIFF}, R, 0, 0, 0)=T_{SPEC}*C_{SPEC}+T_{DIFF}*C_{DIFF}$

Embossing

This example is for embossing:

Final Color=(Diffuse Color+Constant*(Normal1−Normal2))*Material Texture

It can be implemented using three stages as:

1. $R=(0, T_{NORM1}, \text{Constant}, C_{DIFF}, 0, 0, 0)=T_{NORM1}*\text{Constant}+C_{DIFF}$ 2. 1 $R=(0, T_{NORM2}, \text{Constant}, R, 1, 0, 0)=(T_{NORM1}-T_{NORM2})*\text{Constant}+C_{DIFF}$ 3. $R=(R, 0, T_{MAT}, 0, 0, 0, 0)=((T_{NORM2})*\text{Constant}+C_{DIFF})*T_{MAT}$ Detail Texture This example is for detail texturing. The difference textures have a bias of 0.5.

Final Color=Base Texture+(Difference Texture A−0.5)+(Difference Texture B=0.5)

It can be implemented as:

1. $R=(0, 0, 0, T_{BASE}, 0, 0, 0)=T_{BASE}$

2. $R=(T_{DIFFA}, 0, 0, R, 0, 0, 0)=T_{BASE}+T_{DIFFA}-0.5$

3. $R=(T_{DIFFB}, 0, 0, R, 0, 0, 0)=T_{BASE}+T_{DIFFA}-0.5+T_{DIFFB}-0.5$

In the example embodiment, clamp block 672 may provide any of the following clamping modes:

| tev_alpha_env(mode) | clamp | description |
|---|---|---|
| TEV_MODE_LINEAR | TEV_CLAMP_HI | S = (R > 11023) ? 1023:(R <− 1024)? −1024:R) |
| | TEV_CLAMP_LO | S + (R > 255) ? 255:((R < 0) ? 0:R) |
| TEV_MODE_GEO | TEV_CLAMP_HI | S = (R >= 0) ? 255:0 |
| | TEV_CLAMP_LO | S = (R >= 0) ? 0:255 |
| | TEV_CLAMP_HI | S = (R == 0) ? 255:0 |
| | TEV_CLAMP_LO | S = (R == 0) ? 0:255 |
| | TEV_CLAMP_HI | S = (R <= 0) ? 255:0 |
| | TEV_CLAMP_LO | S = (R <= 0) ? 0:255 |

Alpha Function Support

The example embodiment recirculating shader 602 supports different alpha functions. Note that in the example embodiment, the alpha compare operation is not part of the recirculation stage, but rather, is performed after recirculation is complete. See FIG. 11. In the example embodiment, the alpha function compares the source alpha with a reference alpha using any one of the following operations:

always,
    never,
    not equal,
    equal,
    less,
    greater than or equal,
    less than or equal,
    greater than.

The two functions are combined in the example embodiment using:

AND,
    OR,
    XOR,
    XNOR.

If all of the valid pixels in a pixel quad fail the alpha test, the quad is discarded and the frame buffer 702 is thus not updated. The following are some examples of what can be implemented:

Asrc>Aref0 AND Asrc<Aref1              Example 1

Asrc>Aref0 OR Asrc<Aref1               Example 2

The alpha functionality of recirculating shader 602 (e.g., in combination with the non-recirculating alpha compare) can be used to provide a transparency tree analogous to a shade tree. In particular, recirculating shader 602's alpha functionality can be used to provide N logical alpha operations on M alpha inputs, where N and M can be any integers. The combination of alpha compares and alpha logical operations can be used, for example, to provide non-photorealistic effects such as cartoon outlining. See, for example, commonly assigned copending U.S. patent application Ser. No. 09/726,212 of Law et al. entitled "Method and Apparatus For Providing Non-Photorealistic Cartoon Outlining Within A Graphics System" and its corresponding provisional application, serial No. 60/226,915, filed Aug. 23, 2000, both of which are incorporated herein by this reference.

Example Z Texturing

Shader 602 supports sprites with depth by modifying the screen z value using texture mapping. Once enabled, shader 602 sends four z values to pixel engine 700 per quad instead of a reference z and two slopes. Each z value is obtained by adding a z texel to the quad reference z or replacing the reference z with the z texel. See the commonly-assigned z texturing patent application referenced above.

FIG. 13 shows an example block diagram of texture environment unit 600 including shader 602. Texture environment unit 600 in the example embodiment includes a fog operator 690 and a fog blender operator 692 in addition to a command section 694 and shader 602. For details concerning the operation of blocks 690, 692, see copending commonly assigned U.S. patent application Ser. No. 09/726,225 of Law et al. entitled "Method And Apparatus For Providing Improved Fog Effects In A Graphics System" and its corresponding provisional application, serial No. 60/227,032, filed Aug. 23, 2000, both of which are incorporated herein by this reference.

FIG. 14 shows a more detailed block diagram of the fog operations.

Example Use of Recirculating Shader for Multitexturing

FIG. 15 shows how a recirculating shader 602 can be used for multitexturing. In the example embodiment, recirculating texture unit 500 is capable of presenting a sequence of texture mapping outputs corresponding to a given surface. For example, it is possible in one implementation to map up to eight different textures onto the same primitive surface. Recirculating texture unit 500 can provide direct (and indirect) texturing operations generating a corresponding sequence of texture mapping outputs. In the example embodiment, recirculating shader 602 receives each mapped texture output as it becomes available and blends the mapped texture output with primitive surface color/alpha information derived from the lighting operations performed by transform unit 300 and/or with other, previously generated texture mappings. Recirculating shader 602 performs its blending operations in a pipelined manner so that the recirculating shader blends a texture output previously generated by texture unit 500 while the texture unit is generating a further texture output in the sequence.

In the example embodiment, recirculating shader 602 retains intermediate blending results for further blending with additional information provided by recirculating texture unit 500. Soon after recirculating texture unit 500 develops a final texture mapping output in a sequence of texture mapping outputs, recirculating shader 602 can perform a corresponding final blend operation and output the blending results via fog block 600*b* for depth buffering, final color blending with frame buffer 702 contents, and display.

FIG. 16 shows an example multitexturing process using recirculating shader 602 shown in FIG. 6. In the illustrative non-limiting example of FIG. 16, transform unit 300 generates texture coordinate data (block 1002). System 50 then associates the generated texture coordinate data with a particular texture map, and texture unit 500 retrieves the corresponding texels (texture data) from the texture map (block 1004). Meanwhile, recirculating shader 602 is configured to perform a predetermined blending/shading operation, and the retrieved texture data is provided to the recirculating shader 602 for blending (block 1008). Recirculating shader 602 can blend the retrieved texture data with some other input and/or a retained prior result (block 1010). For example, recirculating shader 602 might blend a retrieved texture data with a color or opacity value generated by lighting block 300*e* corresponding to a Gouraud shading operation performed on a polygon on a per-vertex basis. Blending operation 1010 might in some cases operate to blend retrieved texture data with previously retrieved texture data. Sometimes blend operation 1010 may perform a transformation on the retrieved texture data, or may simply act to pass through the retrieved texture data for storage within recirculating shader 602 for a subsequent blending operation.

Recirculating shader 602 temporarily stores the output of blend operation 1010 as an intermediate result (block 1012). The entire process may then be recirculated any number of times to retrieve and blend additional sets of texture data. In the example embodiment, recirculating shader 602 can perform blocks 1010, 1012 at the same time that texture unit 500 performs blocks 1004, 1008 to retrieve an additional texture mapping.

FIG. 17 shows an example multi-texture pipeline using recirculating shader 602. FIG. 17 illustrates that each time recirculating shader 602 recirculates, it provides an additional, independently controlled blending stage capable of blending a new data set with any or all of the blend results provided by previous blending operations.

Because example preferred embodiment system 50 is a real-time rendering system, the number of times that recirculating texture unit 500 can recirculate is limited by the amount of time it takes for each recirculation relative to the time between image frames (e.g., 1/30 or 1/60 of a second). In one example embodiment, the total number of recirculations that recirculating texture unit 500 can perform in a single rendering pass might be eight, although different implementations might provide different numbers of recirculations. In the example embodiment, recirculating shader 602 can recirculate approximately twice as many times as texture unit 500 can recirculate. The additional recirculations provided by recirculating shader 602 can be used to perform a number of enhanced and interesting image effects including, for example, fog, z texturing, environment mapping, embossing, detailed texturing, and other imaging effects. The texture input to recirculating shader 602 are preferably set to null during stages where texture unit 500 cannot make a texture available.

FIG. 18 shows an example control step for controlling recirculating shader 602 to provide a multi-texturing operation. In this particular example, main processor 110 may specify a number of different vertices 214 to be lit and/or transformed by transform unit 300. Transform unit 300 may generate appropriate texture coordinates for application to texture unit 500, while rasterizer 400 may rasterize the vertices based on lighting calculations. The texture coordinates so generated can be used in a series of texture mapping operations based on a number of texture maps 504. These texture mapping results may be provided sequentially to a number of sequential recirculating shader 602 stages to provide multitexture blending.

Example Register Interface

FIG. 19 provides detailed example definitions of register contents. The following shows further, more detailed descriptions of the various registers shown in FIG. 19:

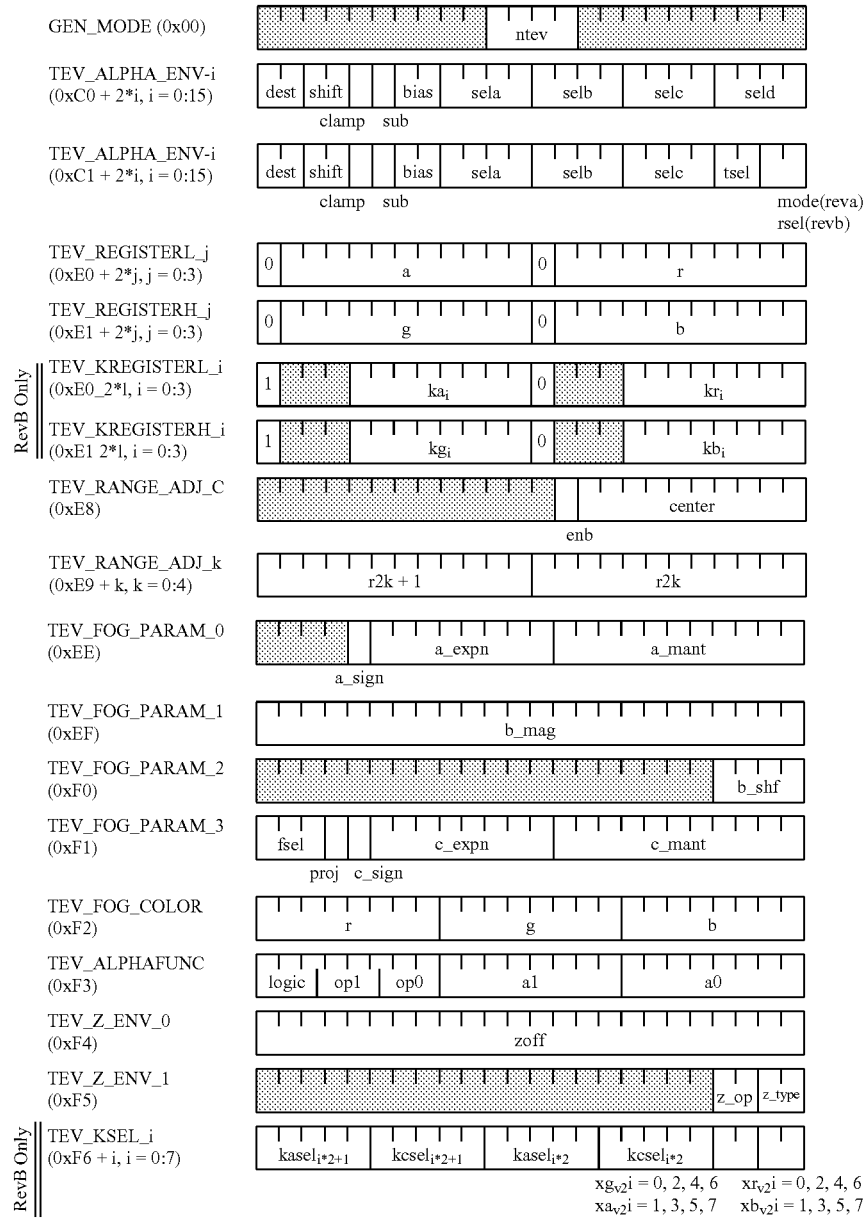

| register | name | format | description | |
|---|---|---|---|---|
| gen_mode | ntev | 4 | Specifies the current texture stage count (1–16). | |
| tev_color_env_i | dest | 2 | Specifies the destination register. | |
| | | | 0 TEV_CDEST_CC0 | Color Register 0 |
| | | | 1 TEV_CDEST_CC1 | Color Register 1 |
| | | | 2 TEV_CDEST_CC2 | Color Register 2 |
| | | | 3 TEV_CDEST_CC3 | Color Register 3 |
| | shift | 2 | When in analog blend mode, this field specifies the amount to shift the output: | |
| | | | 0 TEV_SHIFT_0 | No shift. |
| | | | 1 TEV_SHIFT_1 | Shift left by 1. |
| | | | 2 TEV_SHIFT_2 | Shift left by 2. |
| | | | 3 TEV_SHIFT_R | Shift right by 1. |
| | | | When in compare mode (bias=3, revB only), the field specifies the size and component select for the compare: | |
| | | | 0 TEV_SHIFT_R8 | Compare red channels only. |
| | | | 1 TEV_SHIFT_RG16 | Compare red/green channels as 16 bit values. |
| | | | 2 TEV_SHIFT_RGB24 | Compare red/green/blue channels as 24 bit values |
| | | | 3 TEV_SHIFT_RGB8 | Compare red, green and blue channels separately |
| | clamp | 1 | Specifies the clamping operation (see Section 9). | |
| | | | 0 TEV_CLAMP_HI | Clamp to −1024, +1023 |
| | | | 1 TEV_CLAMP_LO | Clamp to 0.255 |
| | sub | 1 | When in analog blend mode, this field specifies add or subtract of the blend result: | |
| | | | 0 TEV_SUB_ADD | output = d + (1−c)*a + c*b + bias |
| | | | 1 TEV_SUB_SUB | output = d − (1−c)*a − c*b + bias |
| | | | When in compare mode (bias=3, revB only), the field specifies the size and component select for the compare: | |
| | | | 0 TEV_SUB_GT | output = d + ((a>b)?c:0) |
| | | | 1 TEV_SUB_EQ | output = d + ((a==b)?c:0) |
| | bias | 2 | Specifies the value of bias. | |
| | | | 0 TEV_SHIFT_R8 | Compare red channels only. |
| | | | 1 TEV_SHIFT_RG16 | Compare red/green channels as 16 bit values. |
| | | | 2 TEV_SHIFT_RGB24 | Compare red/green/blue channels as 24 bit values |
| | | | 3 TEV_SHIFT_RGB8 | Compare red, green and blue channels separately |
| | clamp | 1 | Specifies the clamping operation (see Section 9). | |
| | | | 0 TEV_CLAMP_HI | Clamp to −1024, +1023 |
| | | | 1 TEV_CLAMP_LO | Clamp to 0.255 |
| | sub | 1 | Specifies add or subtract of the blend result. | |
| | | | 0 TEV_SUB_ADD | Add blend result. |
| | | | 1 TEV_CLAMP_SUB | Subtract blend result. |
| | | | When in compare mode (bias=3, revB only), this field specifies the compare function: | |
| | | | 0 TEV_SUB_GT | output = d + ((a>b)?c:0) |
| | | | 1 TEV_SUB_EQ | output = d + ((a==b)?c:0) |
| | bias | 2 | Specifies the value of bias. | |
| | | | 0 TEV_BIAS_ZERO | 0 |
| | | | 1 TEV_BIAS_PLUS | +0.5 |
| | | | 2 TEV_BIAS_MINUS | −0.5 |
| | | | 3 TEV_BIAS_COMPARE | Select "compare" mode for blender. (revB only) |
| | sela | 3 | Specifies argument A: | |
| | | | 0 TEV_ASEL_A_CA0 | Register 0 alpha. |
| | | | 1 TEV_ASEL_A_CA1 | Register 1 alpha. |
| | | | 2 TEV_ASEL_A_CA2 | Register 2 alpha. |
| | | | 3 TEV_ASEL_A_CA3 | Register 3 alpha. |
| | | | 4 TEV_ASEL_A_TXA | Texture alpha. |
| | | | 5 TEV_ASEL_A_RSA | Rasterized alpha. |
| | | | 6 TEV_ASEL_A_KK | Constant Color (see kasel) |
| | | | 7 TEV_ASEL_A_K00 | 0.0 |
| | selb | 3 | Specifies argument B. selb is similar to sela. | |
| | selc | 3 | Specifies argument C. selc is similar to sela. | |
| | seld | 3 | Specifies argument D. seld is similar to sela. | |
| | tsel, (revA) | 2 | Specifies the texture color swapping mode. | |
| | | | 0 TEV_BIAS_ZERO | 0 |
| | | | 1 TEV_BIAS_PLUS | +0.5 |
| | | | 2 TEV_BIAS_MINUS | −0.5 |
| | | | 3 TEV_BIAS_COMPARE | Select "compare" mode for blender. (revB only) |

-continued

| register | name | format | description | | |
|---|---|---|---|---|---|
| | sela | 4 | Specifies argument A. | | |
| | | | 0 TEV_CSEL_CC0 | Register 0 color. | |
| | | | 1 TEV_CSEL_CA0 | Register 0 alpha. | |
| | | | 2 TEV_CSEL_CC1 | Register 1 color. | |
| | | | 3 TEV_CSEL_CA1 | Register 1 alpha. | |
| | | | 4 TEV_CSEL_CC2 | Register 2 color. | |
| | | | 5 TEV_CSEL_CA2 | Register 2 alpha. | |
| | | | 6 TEV_CSEL_CC3 | Register 3 color. | |
| | | | 7 TEV_CSEL_CA3 | Register 3 alpha. | |
| | | | 8 TEV_CSEL_TXC | Texture color. | |
| | | | 9 TEV_CSEL_TXA | Texture alpha. | |
| | | | A TEV_CSEL_RSC | Rasterized color. | |
| | | | B TEV_CSEL_RSA | Rasterized alpha. | |
| | | | C REVA: TEV_CSEL_K10 | 1.0 | |
| | | | REVB: TEV_CSEL-KK | Constant Color (see kcsel) | |
| | | | D TEV_CSEL_K05 | 0.5 | |
| | | | E TEV_CSEL_K25 | 0.25 | |
| | | | F TEV_CSEL_K00 | 0.0 | |
| | selb | 4 | Specifies argument B. selb is similar to sela | | |
| | selc | 4 | Specifies argument C. selc is similar to sela. | | |
| | seld | 4 | Specifies argument D. seld is similar to sela. | | |
| tev_alpha_env_i | dest | 2 | Specifies the destination register. | | |
| | | | 0 TEV_ADEST_CA0 | Color Register 0 | |
| | | | 1 TEV_ADEST_CA1 | Color Register 1 | |
| | | | 2 TEV_ADEST_CA2 | Color Register 2 | |
| | | | 3 TEV_ADEST_CA3 | Color Register 3 | |
| | shift | 2 | Specifies the amount to shift. | | |
| | | | 0 TEV_SHIFT_0 | No shift. | |
| | | | 1 TEV_SHIFT_1 | Shift left by 1. | |
| | | | 2 TEV_SHIFT_2 | Shift left by 2. | |
| | | | When in compare mode (bias=3, revB only), the field specifies the size and component select for the compare: | | |
| | | | 0 TEV_SWAP_0 | RGBA => RGBA | |
| | | | 1 TEV_SWAP_R | RGBA => RRRA | |
| | | | 2 TEV_SWAP_G | RGB1 => GGGA | |
| | | | 3 TEV_SWAP_B | RGBA => BBBA | |
| | mode (revA) | 2 | Specifies the clamping mode (see Section 9). Rev. A. only! | | |
| | | | 0 TEV_MODE_LINEAR | Linear clamping. | |
| | | | 1 TEV_MODE_GE0 | Greater than ore equal to 0. | |
| | | | 2 TEV_MODE_EQ0 | Equal to 0. | |
| | | | 3 TEV_MODE_LE0 | Less than or equal to 0. | |
| | tsel, rsel (revB) | 2 | Specifies the texture and raster color swapping mode. | | |
| | | | 0 TEV_SWAP_0 | Use swap mode 0 | |
| | | | 1 TEV_SWAP_R | Use swap mode 1 | |
| | | | 2 TEV_SWAP_G | Use swap mode 2 | |
| | | | 3 TEV_SWAP_B | Use swap mode 3 | |
| tev_registerl_i | r, a | s2.8 | Specifies the value of the texture current color. | | |
| tev_registerh_i | g, b | s2.8 | Specifies the value of the texture current color. | | |
| tev_kregisterl_i | kr, ka | 0.8 | Specifies the value of the constant color. This feature only applies to rev B. | | |
| tev_kregisterh_i | kg, kb | 0.8 | Specifies the value of the constant color. This feature only applies to rev | | |
| tev_range_adj_c | center | 10 | Specifies the screen's x center for range adjustment. | | |
| | enb | 1 | Enable range adjustment | | |
| | | | 0 TEV_ENB_DISABLE | Disable range adjustment. | |
| | | | 1 TEV_ENB_ENABLE | Enable range adjustment. | |
| rev_range_adj_k | r2k, r2k+l | u4.8 | Specifies the range adjustment function. $$adj = \frac{\sqrt{x^2 + k^2}}{k}$$ | | |
| tev_fog_param_0 | a | s11e8 | Specifies the "a" parameter of the screen to eye space conversion function: $$Z_e = \frac{a}{b - Z_s}$$ | | |
| tev_fog_param_1 | b_mag | u0.24 | Specifies the "b" parameter of the z screen to eye space conversion function: $$Z_e = \frac{a}{b\_mag - (zs \gg b\_shf)}$$ | | |
| tev_fog_param_2 | b_shf | 5 | Specifies the amount to pre-shift screen z. This is equivalent to the value of "b" parameter's exponent +1. | | |

-continued

| register | name | format | description | | |
|---|---|---|---|---|---|
| tev_fog_param_3 | fsel | 3 | Specifies the fog type as follows: | | |
| | | | 0 TEV_FSEL_OFF | No Fog. | |
| | | | 1 reserved | | |
| | | | 2 TEV_FSEL_LIN | Exponential Fog | |
| | | | 3 reserved | | |
| | | | 4 TEV_FSEL_EXP | Exponential Fog | |
| | | | 5 TEV_FSEL_EX2 | Exponential Squared Fog | |
| | | | 6 TEV_FSEL_BXP | Backward Exp Fog | |
| | | | 7 TEV_FSEL_BX2 | Backward Exp Squared Fog | |
| | proj | 1 | Specifies whether we have a perspective or orthographic projection. | | |
| | | | 0 TEV_FOG_PERSP | Perspective projection | |
| | | | 1 TEV_FOG_ORTHO | Orthographic projection | |
| | c | s11e8 | Specifies the amount to subtract from eye-space Z after range adjustment. | | |
| tev_fog_color | r, g, b | 8 | Specifies the value of fog color. | | |
| tev_alphafunc | op0 | 3 | Specifies under what condition the alpha 0 for a pixel is to be forced to 1. | | |
| | | | 0 TEV_AOP_NEVER | Never | |
| | | | 1 TEV_AOP_LESS | Alpha < AF_VAL | |
| | | | 2 TEV_AOP_EQUAL | Alpha = AF_VAL | |
| | | | 3 TEV_AOP_LE | Alpha <= AF_VAL | |
| | | | 4 TEV_AOP_GREATER | Alpha > AF_VAL | |
| | | | 5 TEV_AOP_NOTEQUAL | Alpha != AF_VAL | |
| | | | 6 TEV_AOP_GE | Alpha >= AF_VAL | |
| | | | 7 TEV_AOP_ALWAYS | Always | |
| | op1 | 3 | Specifies alpha operation 1. Similar to op0. | | |
| | logic | 2 | Specifies the logic operation in combining the two alpha comparison. | | |
| | | | 0 TEV_LOGIC_AND | AND | |
| | | | 1 TEV_LOGIC_OR | OR | |
| | | | 2 TEV_LOGIC_XOR | XOR | |
| | | | 3 TEV_LOGIC_XNOR | XNOR | |
| | a0 | 8 | Reference alpha 0. | | |
| | a1 | 8 | Reference alpha 1. | | |
| tev_env_z_0 | zoff | u24.0 | Specifies the z bias used in a z texture. | | |
| tev_env_z_1 | type | 2 | Specifies the z texel type. | | |
| | | | 0 TEV_Z_TYPE_U8 | u8.0 | |
| | | | 1 TEV_Z_TYPE_U16 | u16.0 | |
| | | | 2 TEV_Z_TYPE_U24 | u24.0 | |
| | | | 3 reserved | | |
| | op | 2 | Enables z texturing. | | |
| | | | 0 TEV_Z_OP_OFF | Disable | |
| | | | 1 TEV_Z_OP_ADD | Add | |
| | | | 2 TEV_Z_OP_REP | Replace | |
| | | | 3 reserved | | |
| tev_ksel_i (RevB) | kcsel, kasel | 5 | Selects constant color/scalar for each of 16 states. This feature only applies to rev B. | | |
| | | | 0 TEV_KSEL_1 | 1.0 | |
| | | | 1 TEV_KSEL_7_8 | 0.875 | |
| | | | 2 TEV_KSEL_3_4 | 0.75 | |
| | | | 3 TEV_KSEL_5_8 | 0.625 | |
| | | | 4 TEV_KSEL_1_2 | 0.5 | |
| | | | 5 TEV_KSEL_3_8 | 0.375 | |
| | | | 6 TEV_KSEL_1_4 | .025 | |
| | | | 7 TEV_KSEL_1_8 | 0.125 | |
| | | | 8 | | |
| | | | 9 | | |
| | | | 10 | | |
| | | | 11 | | |
| | | | 12 TEV_KSEL_K0 | Constant Color 0 (rgb) | ⎤ |
| | | | 13 TEV_KSEL_K1 | Constant Color 1 (rgb) | |
| | | | 14 TEV_KSEL_K2 | Constant Color 2 (rgb) | kcsel only |
| | | | 15 TEV_KSEL_K3 | Constant Color 3 (rgb) | ⎦ |
| | | | 16 TEV_KSEL_K0_R | Constant Color 0 (r) | |
| | | | 17 TEV_KSEL_K1_R | Constant Color 1 (r) | |
| | | | 18 TEV_KSEL_K2_R | Constant Color 2 (r) | |
| | | | 19 TEV_KSEL_K3_R | Constant Color 3 (r) | |
| | | | 20 TEV_KSEL_K0_R | Constant Color 0 (g) | |
| | | | 21 TEV_KSEL_K1_G | Constant Color 1 (g) | |
| | | | 22 TEV_KSEL_K2_G | Constant Color 2 (g) | |
| | | | 23 TEV_KSEL_K3_G | Constant Color 3 (g) | |
| | | | 24 TEV_KSEL_K0_B | Constant Color 0 (b) | |
| | | | 25 TEV_KSEL_K1_B | Constant Color 1 (b) | |
| | | | 26 TEV_KSEL_K2_B | Constant Color 2 (b) | |
| | | | 27 TEV_KSEL_K3_B | Constant Color 3 (b) | |
| | | | 28 TEV_KSEL_K0_A | Constant Color 0 (a) | |

-continued

| register | name | format | description |
|---|---|---|---|
| | | | 29 TEV_KSEL_K1_A    Constant Color 1 (a) |
| | | | 30 TEV_KSEL_K2_A    Constant Color 2 (a) |
| | | | 31 TEV_KSEL_K3_A    Constant Color 3 (a) |
| | xr, xg, xb, xa | | Specifies one of four swap modes. During each stage, "tsel" selects the swap mode for texture and "rsel" selects the swap mode for the rasterization color: |

| | red | green | blue | alpha |
|---|---|---|---|---|
| | xr | xg | xb | xa |
| | 0 0   red | 0 0   red | 0 0   red | 0 0   red |
| | 0 1   green | 0 1   green | 0 1   green | 0 1   green |
| | 1 0   blue | 1 0   blue | 1 0   blue | 1 0   blue |
| | 1 1   alpha | 1 1   alpha | 1 1   alpha | 1 1   alpha |

On reset, these values get initialized as follows (for revA compatibility):

| | xr | xg | xb | xa |
|---|---|---|---|---|
| Swap Mode 0 | 0 0 | 0 1 | 1 0 | 1 1 |
| Swap Mode 1 | 0 0 | 0 0 | 0 0 | 1 1 |
| Swap Mode 2 | 0 1 | 0 1 | 0 1 | 1 1 |
| Swap Mode 3 | 1 0 | 1 0 | 1 0 | 1 1 |

The following are example application programming interface calls:

GXSetTevOp

Description: This is a convenience function designed to make initial programming of the Texture Environment unit easier. This macro calls GXSetTevColorIn, GXSetTevColorOp, GXSetTevAlphaIn, and GXSetTevAlphaOp with predefined arguments to implement familiar texture combining functions.

To enable a consecutive set of recirculating shader stages, the application should call the GXSetNumTevStages function.

In the table below, Cv is the output color for the stage, Cr is the output color of previous stage, and Ct is the texture color. Av is the output alpha for a stage, Ar is the output alpha of previous stage, and At is the texture alpha. As a special case, rasterized color (GX_CC_RASC) is used as Cr and rasterized alpha (GX_CA_RASA) is used as Ar at the first recirculating shader stage because there is no previous stage.

| Mode | Color Op | Alpha Op |
|---|---|---|
| GX_MODULATE | Cv = CrCt | Av = ArAt |
| GX_DECAL | Cv = (1 − At)Cr + AtCt | Av = Ar |
| GX_REPLACE | Cv = Ct | Av = At |
| GX_BLEND | Cv = (1 − Ct)Cr + Ct | Av = AtAr |
| GX_PASSCLR | Cv = Cr | Av = Ar |

Arguments: id=stage id, mode=predefined color combining modes.

Example usage:

void GXSetTevOp(GXTevStageID id, GXTevMode mode);

GXTevStageID

Enumerated Values

GX_TEVSTAGE0
  GX_TEVSTAGE1
  GX_TEVSTAGE2
  GX_TEVSTAGE3
  GX_TEVSTAGE4
  GX_TEVSTAGE5
  GX_TEVSTAGE6
  GX_TEVSTAGE7
  GX_TEVSTAGE8
  GX_TEVSTAGE9
  GX_TEVSTAGE10
  GX_TEVSTAGE11
  GX_TEVSTAGE12
  GX_TEVSTAGE13
  GX_TEVSTAGE14
  GX_TEVSTAGE15
  GX_MAX_TEVSTAGE

Description

Texture Environment (Recirculating shader) stage name.

GXTevMode

Enumerated Values:

GX_DECAL
  GX_MODULATE
  GX_REPLACE
  GX_PASSCLR
  GX_BLEND

Description: sets Texture Environment control.

GXSetNumTevStages

Description

This function enables a consecutive number of Texture Environment (recirculating shader) stages. The output pixel color (before fogging and blending) is the result from the last stage. The last recirculating shader stage must write to register GX_TEVPREV, see GXSetTevColorOp and GXSetTevAlphaOp. At least one recirculating shader stage should be enabled. If a Z-texture is enabled, the Z texture is looked up on the last stage, see GXSetZTexture.

The association of lighting colors, texture coordinates, and texture maps with a recirculating shader stage is set using GXSetTevOrder. The number of texture coordinates available is set using GXSetNumTexGens. The number of color channels available is set using GXSetNumChans.

GXInit will set nStages to 1 as a default.

Arguments: nStages
Number of active recirculating shader stages. Minimum value is 1, maximum value is 16
Example usage: void GXSetNumTevStages(u8 nStages);
GXSetTevColorIn
Description This function sets the input operands of the Texture Environment (recirculating shader) color combiner unit. The input operands a, b, and c are RGB colors where each component is unsigned 8-bit (0<=a,b,c<=255). The d input operand is an RGB color where each component is a signed 10-bit input (−1024<=d<=1023).

In the cases where the input operand is an alpha value (GX_CC_A0, GX_CC_A1, GX_CC_A2, GX_CC_APREV, GX_CC_TEXA, GX_CC_RASA), the alpha value is replicated across the three color channels (R=A, G=A, B=A).

The function implemented by this recirculating shader stage is set using the function GXSetTevColorOp.

The output of this stage is directed by default to register GX_TEVPREV (see GXInit), but may be set explicitly by GXSetTevColorOp.

The registers used to store the output of Recirculating shader stages can also be used as inputs, GX_CC_C0, GX_CC_C1, GX_CC_C2, GX_CC_CPREV. You can program these registers with constant color values using GXSetTevColor or GXSetTevColorS10.

Each register can store either an unsigned 8-bit number or a signed 10-bit number per component (RGB). If a signed 10-bit number is selected for inputs a, b, or c, the number is truncated to 8 bits. No attempt is made to convert the number, the most significant bits are simply discarded.

The input operands GX_CC_RASC and GX_CC_RASA are the result of the per-vertex lighting equations. The input operands GX_CC_TEXC and GX_CC_TEXA are the texture inputs for this stage. The texture color input GX_CC_TEXC, may have its color components swapped before input by setting operands GX_TC_TEXRRR, GX_$_{TC}$_TEXGGG or GX_TC_TEXBBB. You can select one of the swap operands per Recirculating shader stage. In an example embodiment, it is illegal to use both GX_TC_TEXRRR and GX_TC_GGG in the same stage.

GXSetTevOrder associates a shader stage with particular colors and textures.

| | Arguments |
|---|---|
| stage | Name of the Recirculating shader stage. |
| a | Input color operand, unsigned 8b per component. |
| b | Input color operand, unsigned 8b per component. |
| c | Input color operand, unsigned 8b per component. |
| d | Input color operand, signed 10b per component. |

Example usage:
void GXSetTevColorIn(
   GXTevStageID stage,
   GXTevColorArg a,
   GXTevColorArg b,
   GXTevColorArg c,
   GXTevColorArg d);
GXSetTevAlphaIn
Description This function sets the input operands for one stage of the Texture Environment (recirculating shader) alpha combiner unit. The input operands a, b, and c are unsigned 8-bit inputs (0<=a,b,c<=255). The d input operand is a signed 10-bit input (−1024<=d<=1023).

Each shader stage implements the following function:

$$reg=(d(\text{op})((1.0-c)*a+c*b)+\text{bias})*\text{scale};$$

The operations described by op, bias, and scale are programmable using the GXSetTevAlphaOp function.

The output of this stage is directed by default to register GX_TEVPASS (see GXInit), but may be set explicitly by GXSetTevAlphaOp. The result can be clamped to two ranges, 0 to 255 or −1024 to 1023, based on the clamp mode set by GXSetTevClampMode. When the input a, b, or c is from a signed 10-bit number (either the results of a previous recirculating shader stage or an input constant) only the 8 least-significant bits are used. There is no attempt to convert the number, the upper bits are simply discarded.

The registers used to store the output of Recirculating shader stages can also be used as inputs, GX_CA_A0, GX_CA_A1, GX_CA_A2, GX_CA_APREV. You can program these registers with constant alpha values using GXSetTevColor or GXSetTevColorS10.

The input operand GX_CA_RASA is the result of the per-vertex lighting equations. The input operand GX_CA_TEXA is the texture alpha input for this stage. You can select the colors and textures to which these inputs correspond using GXSetTevOrder.

| | Arguments |
|---|---|
| stage | The name of the stage. |
| a | Input operand, u8. |
| b | Input operand, u8. |
| c | Input operand, u8 |
| d | Input operand, s10. |

Example usage:
void GXSetTevAlphaIn(
   GXTevStageID stage,
   GXTevAlphaArg a,
   GXTevAlphaArg b,
   GXTevAlphaArg c,
   GXTevAlphaArg d);
GXSetTevColorOp
Description This function sets the op, scale, bias, and clamping operation for the color combiner function for this stage of the Texture Environment (recirculating shader) unit. This function also specifies the output register, out_reg, that will contain the result of the color combiner function. The color combiner function is:

$$\text{out\_reg}=(d(\text{op})((1.0-c)*a+c*b)+\text{bias})*\text{scale};$$

The input parameters a, b, c, and d are selected using the GXSetTevColorIn function. The a, b, and c inputs are unsigned 8b inputs (0<=a,b,c<=255). The d input is a signed 10b input (−1024<=d<=1023). The result, out_reg, can also be a signed 10b result, depending on the clamp enable and the current clamping mode, see GXSetTevClampMode.

The recirculating shader output registers are shared among all the recirculating shader stages. The recirculating shader output registers can also be used as constant color inputs, so the application should be careful to allocate input and output registers so no collision occurs when implementing a particular equation. The application must output to GX_TEVPREV in the last active recirculating shader stage.

The function GXSetTevOp provides a simpler way to set the parameters of GXSetTevColorIn and GXSetTevColorOp based on predefined equation names. You should not mix usage of GXSetTevOp and GXSetTevColorIn/GXSetTevColorOp.

GXSetTevOp makes some assumptions about the output register usage, namely that GX_TEVPREV is always the output register and is used to pass the result of the previous recirculating shader stage to the next recirculating shader stage.

| Arguments | |
|---|---|
| stage | Recirculating shader stage name. |
| op | Recirculating shader operation. |
| add_bias | Bias value. |
| scale | Scale value. |
| clamp | Clamp results when GX_TRUE |
| out_reg | Output register name. The last active Recirculating shader stage writes to GX_TEVPREV. |

Example usage:
void GXSetTevColorOp(
  GXTevStageID stage,
  GXTevOp op,
  GXTevBias bias,
  GXTevScale scale,
  GXBool clamp,
  GXTevRegID out_reg);
GXSetTevAlphaOp
Description This function sets the op, scale, bias, and clamping operation for the alpha combiner function for this stage of the Texture Environment (recirculating shader) unit. This function also specifies the register, out_reg, that will contain the result of the alpha combiner function. The alpha combiner function is:

out_reg=(d(op)((1.0−c)*a+c*b)+bias)*scale;

The input parameters a, b, c, and d are set using GXSetTevAlphaIn. The a, b, and c inputs are unsigned 8b inputs (0<=a,b,c<=255). The d input is a signed 10b input (−1024<=d<=1023). The result, out_reg, can also be a signed 10b result, depending on the clamp enable and the current clamping mode, see GXSetTevClampMode.

You must enable a consecutive number of recirculating shader stages using GXSetTevStages. The last active recirculating shader stage writes its output to register GX_TEVPREV.

| Arguments | |
|---|---|
| stage | The name of the recirculating shader stage. |
| op | recirculating shader operation. |
| bias | Bias value. |
| scale | Scale value. |
| clamp | Clamp results when GX_TRUE. |
| out_reg | Output register name. |

Example usage:
void GXSetTevAlphaOp(
  GXTevStageID stage,
  GXTevOp op,
  GXTevBias bias,
  GXTevScale scale,
  GXBool clamp,
  GXTevRegID out_reg);
GXSetTevColor
Description This function is used to set one of the constant color registers in the Texture Environment (recirculating shader) unit. These registers are available to all recirculating shader stages. At least one of these registers is used to pass the output of one recirculating shader stage to the next in a multi-texture configuration. The application is responsible for allocating these registers so that no collisions in usage occur.

This function can set unsigned 8-bit colors. To set signed, 10-bit colors use GXSetTexColorS10.
Arguments
id=Color register id.
color=Constant color value.
Example usage: void GXSetTevColor(GXTevRegID id, GXColor color);
GXSetTevColorS10
Description This function is used to set one of the constant color registers in the Texture Environment (recirculating shader) unit. These registers are available to all recirculating shader stages. At least one of these registers is used to pass the output of one recirculating shader stage to the next in a multi-texture configuration. The application is responsible for allocating these registers so that no collisions in usage occur.

This function enables the color components to be signed 10-bit numbers. To set 8-bit unsigned colors (the common case) use GXSetTevColor.
Arguments
id=Color register id.
color=Constant color value. Each color component can have the range −1024 to +1023.
Example usage: void GXSetTevColorS10(GXTevRegID id, GXColorS10 color);
GXSetTevClampMode
Description This function sets the clamp mode for this stage in the Texture Environment (recirculating shader) unit. This mode is used for both alpha and color combiners. The mode effects how the clamp controls set by GXSetTevColorOp and GXSetTevAlphaOp are interpreted as shown in the table below. R is the TEV stage result color.

| GXInit sets mode to GX_TC_LINEAR. | | |
|---|---|---|
| mode - shared for alpha and color TEV | clamp - independent for alpha and color TEV | description |
| GX_TC_LINEAR | GX_FALSE | clamp such that −1024 <= R <= 1023 |
| | GX_TRUE | clamp such that 0 <= R <= 255 |

-continued

GXInit sets mode to GX_TC_LINEAR.

| mode - shared for alpha and color TEV | clamp - independent for alpha and color TEV | description |
|---|---|---|
| GX_TC_GE | GX_FALSE | output = (R >= 0) ? 255:0 |
| | GX_TRUE | output = (R >= 0) ? 0:255 |
| GX_TC_EQ | GX_FALSE | output = (R == 0) ? 255:0 |
| | GX_TRUE | output = (R == 0) ? 0:255 |
| GX_TC_LE | GX_FALSE | output = (R <= 0) ? 255:0 |
| | GX_TRUE | output = (R <= 0) ? 0:255 | stage = Tev stage ID.
mode = Clamp mode (Accepted values are GX_TC_LINEAR, GX_TC_GE, GX_TC_LE, GX_TC_EQ).

Example usage:
void GXSetTevClampMode(
GXTevStageID stage,
GXTevClampMode mode);
GXSetAlphaCompare
Description This function sets the parameters for the alpha compare function which uses the alpha output from the last active Texture Environment (recirculating shader) stage. The number of active recirculating shader stages are specified using GXSetTevStages.

The output alpha can be used in the blending equation (see GXSetBlendMode) to control how source and destination (frame buffer) pixels are combined.

The alpha compare operation is:

alpha_pass=(alpha_src (comp0) ref0)(op)(alpha_src (comp1) ref1)

where alpha_src is the alpha from the last active Recirculating shader stage. As an example, you can implement these equations:

alpha_pass=(alpha_src>ref0) AND (alpha_src<ref1)

or alpha_pass=(alpha_src>ref0) OR (alpha_src<ref1)

The Z compare can occur either before or after texturing, see GXSetZCompLoc. in the case where Z compare occurs before texturing, the Z is written based only on the Z test. The color is written if both the Z test and alpha test pass.

When Z compare occurs after texturing, the color and Z are written if both the Z test and alpha test pass. When using texture to make cutout shapes (like billboard trees) that need to be correctly Z buffered, you should configure the pipeline to Z buffer after texturing.
Arguments
comp0=Comparison subfunction 0.
ref0=Reference value for subfunction 0, 8-bit.
op=Operation for combining subfunction0 and subfunction1. Accepted values are: GX_AOP_AND, GX_AOP_OR, GX_AOP XOR, GX_AOP_XNOR.
comp1=Comparison subfunction 1.
ref1=Reference value for subfunction 1, 8-bit.
Example usage:
void GXSetAlphaCompare(
GXCompare comp0,
u8 ref0,
GXAlphaOp op,
GXCompare comp1,
u8 ref1);
GXSetTevOrder
Description This function specifies the texture and rasterized color that will be available as inputs to this Texture Environment (recirculating shader) stage. The texture coordinate coord is generated from input attributes using the GXSetTexCoordGen function, and is used to look up the texture map, previously loaded by GXLoadTexObj. The color to rasterize for this stage is also specified. The color is the result of per-vertex lighting which is controlled by the GXSetChanCtrl function.

Note that this function does not enable the recirculating shader stage. To enable a consecutive number of Recirculating shader stages, starting at stage GX_TEVSTAGE0, use the GXSetNumTevStages function.

The operation of each recirculating shader stage is independent. The color operations are controlled by GXSetTevColorIn and GXSetTevColorOp. The alpha operations are controlled by GXSetTevAlphaIn and GXSetTevAlphaOp.

The number of texture coordinates available for all the active recirculating shader stages is set using GXSetNumTexGens. The number of color channels available for all the active recirculating shader stages is set using GXSetNumChans. Active recirculating shader stages should not reference more texture coordinates or colors than are being generated.

Using GXSetTevOrder, it is possible to broadcast a single texture coordinate to many textures as long as the textures are the same size:
GXSetTevOrder(GX_TEVSTAGE0, GX_TEXCOORD0, GX_TEXMAP0, GX_COLOR0A0);
GXSetTevOrder(GX_TEVSTAGE1, GX_TEXCOORD0, GX_TEXMAP1, GX_COLOROA0);
GXSetTevOrder(GX_TEVSTAGE2, GX_TEXCOORD0, GX_TEXMAP2, GX_COLOR1A1);
GXSetTevOrder(GX_CTEVSTAGE3, GX_TEXCOORD0, GX_TEXMAP3, GX_COLOR0A0);

You may also use any generated texture coordinate in any recirculating shader stage:
GXSetTevOrder(GX_TEVSTAGE0, GX_TEXCOORD3, GX_TEXMAP0, GXCCOLOR0A0);
GXSetTevOrder(GX_TEVSTAGE1, GX_TEXCOORD2, GX_TEXMAP1, GX_COLOR0A0);
GXSetTevOrder(GX_TEVSTAGE2, GX_TEXCOORD1, GX_TEXMAP2, GX_COLOR1A1);
GXSetTevOrder(GX_TEVSTAGE3, GX_TEXCOORD0, GX_TEXMAP3, GX_COLOR0A0);

If no texture is used in a recirculating shader stage, set coord and map to NULL:
GXSetTevOrder(GX_TEVSTAGE0, GX_TEXCOORD2, GX_TEXMAP0, GX_COLOR0A0);
GXSetTevOrder(GX_TEVSTAGE1, GX_TEXCOORD_NULL, GX_TEXMAP_NULL, GX_COLOR0A0);
GXSetTevOrder(GX_TEVSTAGE2, GX_TEXCOORD1, GX_TEXMAP2, GX_COLOR1A1);
GXSetTevOrder(GX_TEVSTAGE3, GX_TEXCOORD0, GX_TEXMAP3, GX_COLOR0A0);

If no color is used in a recirculating shader stage, set color to NULL:
GXSetTevOrder(GX_TEVSTAGE0, GX_TEXCOORD3, GX_TEXMAP0, GX_COLOR0A0);
GXSetTevOrder(GX_TEVSTAGE1, GX_TEXCOORD2, GX_TEXMAP1, GX_COLOR_NULL);
GXSetTevOrder(GX_TEVSTAGE2, GX_TEXCOORD1, GX_TEXMAP2, GX_COLOR1A1);

GXSetTevOrder(GX_TEVSTAGE3, GX_TEXCOORD0, GX_TEXMAP3, GX_COLOR0A0);

GXSetTevOrder will scale the normalized texture coordinates produced by GXSetTexCoordGen according to the size of the texture map in the function call. For this reason, texture coordinates can only be broadcast to multiple texture maps if and only if the maps are the same size. In some case, you may want to generate a texture coordinate having a certain scale, but disable the texture lookup (this comes up when generating texture coordinates for indirect bump mapping). To accomplish this, use the GX_TEXMAP_DISABLE flag:
GXSetTevOrder(GX_TEVSTAGE1, GX_TEXCOORD0, GX_TEXMAP3|
GX TEXMAP_DISABLE, GX_COLOR_NULL);

This will scale GX_TEXCOOR0 using GX_TEXMAP3 but disable the lookup of GX_TEXMAP3.

GXInit describes the default recirculating shader order.

Arguments stage=Recirculating shader stage ID.
coord=Texture coordinate ID.
map=Texture Map ID.
color=Color channel. Accepted values are: GX_COLOR0A0, GX_COLOR1A1 and GX_COLOR_NULL.

Example usage:
  void GXSetTevOrder(
    GXTevStageID stage,
    GXTexCoordID coord,
    GXTexMapID map,
    GXChannelID color

EXAMPLES

This page shows some samples of the Texture Environment (TEV) settings.
One Rasterized Color
e.g. Polygons with vertex colors
e.g. Vertex lighting
This configuration passes rasterized color channel directly by using PASSCLR operation. No texture is used.
// One Rasterized Color
// The channel COLOR0A0 is supposed to have lit color.
GXSetNumTevStages(1);
GXSetTevOrder(
  GX_TEVSTAGE0,
  GX_TEXCOORD_NULL,
  GX_TEXMAP_NULL,
  GX_COLOR0A0);
GXSetTevOp(GX_TEVSTAGE0, GX_PASSCLR);
One Texture
e.g. Simple texture mapping
This configuration is used for displaying the texture color directly. No rasterized color can be used.
// One Texture
// A texture should be loaded to GX_TEXMAP0.
// An appropriate texcoord generation should be set to GX_TEXCOORD0.
GXSetNumTevStages(1);
GXSetTevOrder(
  GX_TEVSTAGE0,
  GX_TEXCOORD0,
  GX_TEXMAP0,
  GX_COLOR_NULL);
GXSetTevOp(GX_TEVSTAGE0, GX_REPLACE);
One Texture Modulated by Rasterized Color
e.g. Lit material texture
This configuration uses the MODULATE operation.
// One Texture Modulated by Rasterized Color
// The channel COLOR0A0 is supposed to have lit color.
// A texture should be loaded to GX_TEXMAP0.
// An appropriate texcoord generation should be set to GX_TEXCOORD0.
GXSetNumTevStages(1);
GXSetTevOrder(
  GX_TEVSTAGE0,
  GX_TEXCOORD0,
  GX_TEXMAP0,
  GX_COLOR0A0);
GXSetTevOp(GX_TEVSTAGE0, GX_MODULATE);
One Texture Overlayed on Rasterized Color
e.g. Highlight map on diffuse lit surface
e.g. Projected shadow map on lit surface
This configuration uses the DECAL operation. The texture should contain alpha value which will be used for blending.
// One Texture Modulated by Rasterized Color
// The channel COLOR0A0 is supposed to have lit color.
// A texture should be loaded to GX_TEXMAP0.
// An appropriate texcoord generation should be set to GX_TEXCOORD0.
GXSetNumTevStages(1);
GXSetTevOrder(
  GX_TEVSTAGE0,
  GX_TEXCOORD0,
  GX_TEXMAP0,
  GX_COLOR0A0);
GXSetTevOp(GX_TEVSTAGE0, GX_DECAL);
Constant Color
This configuration uses neither the output from lighting unit or any texture.
// Constant color from TEV register
GXSetNumTevStages(1);
GXSetTevOrder(
  GX_TEVSTAGE0,
  GX_TEXCOORD_NULL,
  GX_TEXMAP_NULL,
  GX_COLOR_NULL);
GXSetTevColorIn(//output=Register0
  GX_TEVSTAGE0,
  GX_CC_ZERO,
  GX_CC_ZERO,
  GX_CC_ZERO,
  GX_CC_C0);
GXSetTevColorOp(
  GX_TEVSTAGE0,
  GX_TEV_ADD,
  GX_TB_ZERO,
  GX_CS_SCALE_1,
  GX_DISABLE,
  GX_TEVPREV);
GXSetTevColor(GX_TEVREG0, constColor);
Add Two Rasterized Colors
e.g. Diffuse lit color+Specular lit color No texture is used. The first stage passes the first rasterized color by using PASSCLR operation. The second stage adds two colors where a detailed setting is required.
// Add Two Rasterized Colors
// Two Color channels COLOR0/COLOR1 will be used.
GXSetNumTevStages(2);
// Stage0 simply passes the rasterized color.
GXSetTevOrder(
   GX_TEVSTAGE0,
   GX_TEXCOORD_NULL,
   GX_TEXMAP_NULL,
   GX_COLOR0A0);
GXSetTevOp(GX_TEVSTAGE0, GX_PASSCLR);
// Stage1 adds the second color and output from previous stage.
GXSetTevOrder(
   GX_TEVSTAGE1,
   GX_TEXCOORD_NULL,
   GX_TEXMAP_NULL,
   GX_COLOR0A0);
GXSetTevColorIn(// output=RASC+CPREV
   GX_TEVSTAGE1,
   GX_CC_ZERO,
   GX_CC_RASC,
   GX_CC_ONE,
   GX_CC_CPREV);
GXSetTevColorOp(
   GX_TEVSTAGE1,
   GX_TEV_ADD,
   GX_TB_ZERO,
   GX_CS_SCALE_1,
   GX_ENABLE,
   GX_TEVPREV);
GXSetTevClampMode(GX_TEVSTAGE1, GX_TC_LINEAR);
Add Rasterized Color and Alpha
e.g. Diffuse lit color+Specular lit color processed in alpha channel If the specular color is allowed to be white only, you may use alpha channel for specular lit color which will be broadcasted to each RGB component on a TEV stage. Since it requires only one stage, we can obtain better fill-rate than using two channels. This method can be used if the alpha is not reserved for another purpose.
// Add Rasterized Color and Alpha
// Color0/Alpha0 may be processed independently.
GXSetNumTevStages(1);
GXSetTevOrder(
   GX_TEVSTAGE0,
   GX_TEXCOORD_NULL,
   GX_TEXMAP_NULL,
   GX_COLOR0A0);
GXSetTevColorIn(//output=RASC+RASA
   GX_TEVSTAGE0,
   GX_CC_ZERO,
   GX_CC_RASA,
   GX_CC_ONE,
   GX_CC_RASC);
GXSetTevColorOp(
   GX_TEVSTAGE0,
   GX_TEV_ADD,
   GX_TB_ZERO,
   GX_CS_SCALE_1,
   GX_ENABLE,
   GX_TEVPREV);
GXSetTevClampMode(GX_TEVSTAGE0, GX_TC_LINEAR);

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general purpose digital computer such as a personal computer, which executes a software emulator program that simulates the hardware and/or firmware of system 50.

Some general purpose digital computers (e.g., IBM or Macintosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

Figure 20A:
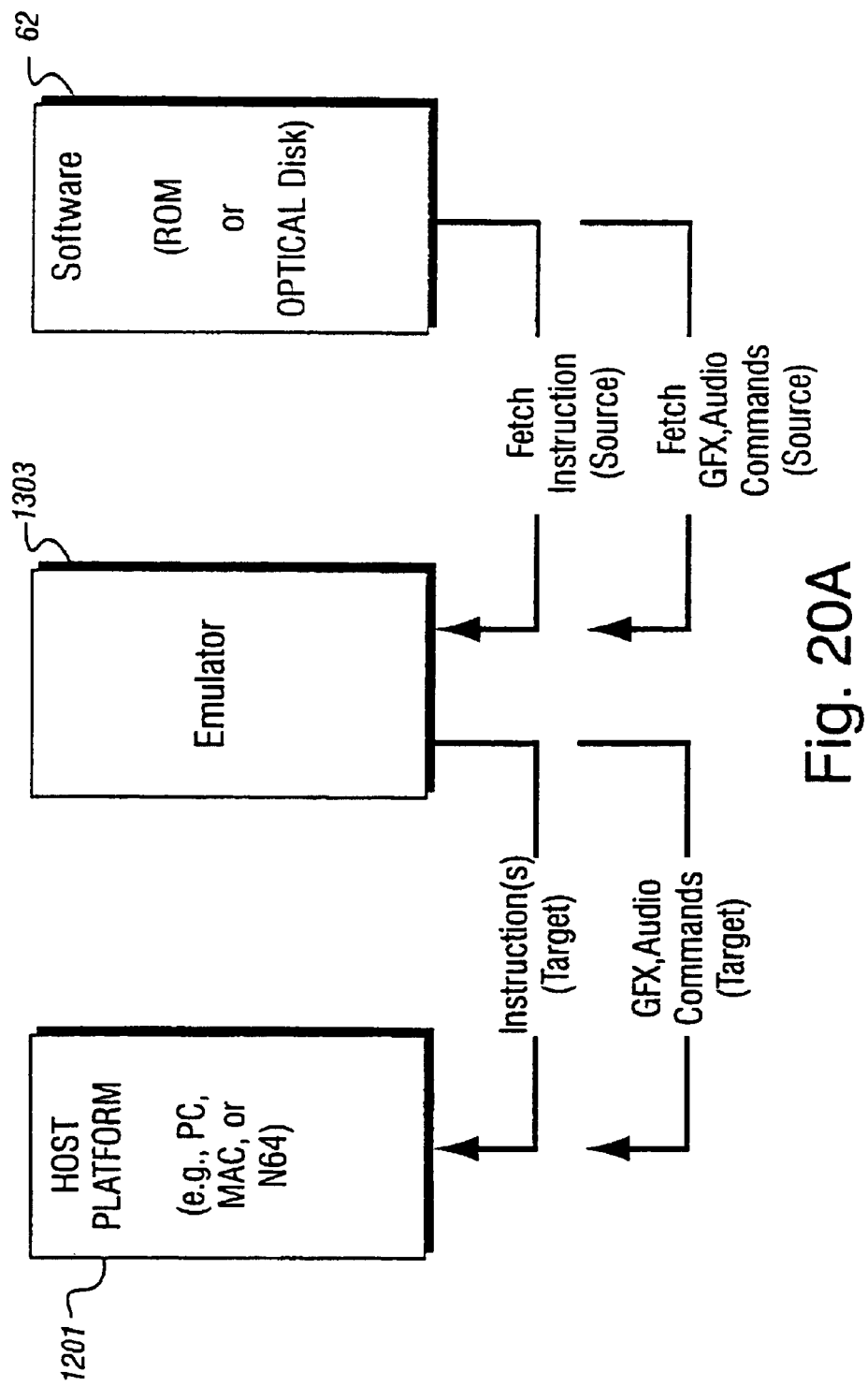
FIGS. 20A and 20B show example alternative compatible implementations.

FIG. 20A illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1303 fetches one or a sequence of binary-image program instructions from storage medium 62 and converts these program instructions to one or more equivalent Intel binary-image program instructions. The emulator 1303 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

Figure 20B:
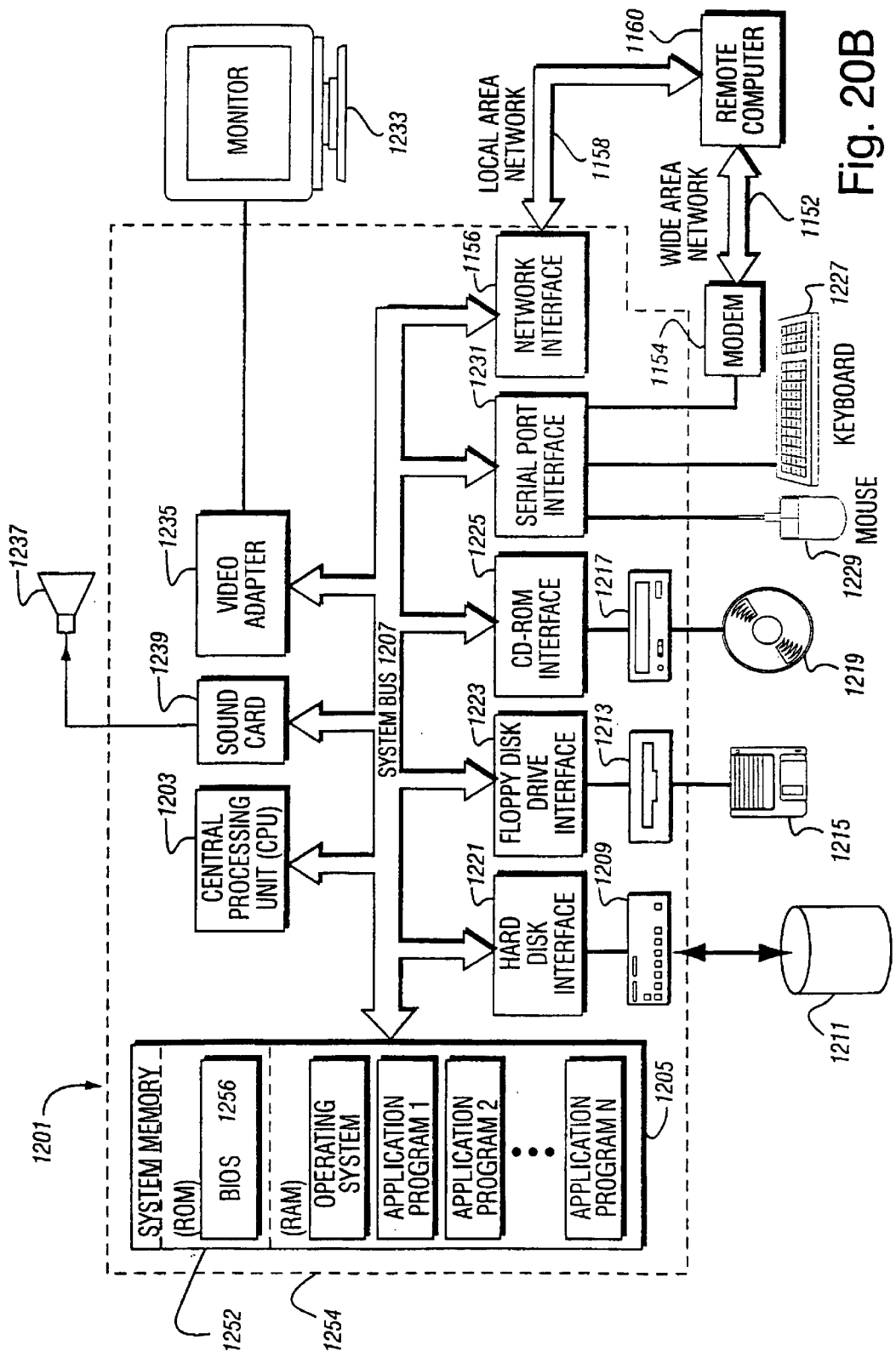

FIG. 20B illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected r by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 62.

All documents referenced above are hereby incorporated by reference.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

We claim:

1. A graphics pipeline including:
    a recirculating texture unit including a texture coordinate processor, a texture mapper and a texture data feedback path that recirculates selected texture-mapped data from the texture mapper back to the texture coordinate processor; and
    a hardware shader that blends selected inputs to provide a calculated color or opacity output that is fed back for use as an input to the hardware shader for a subsequent blending operation, wherein said hardware shader includes a blending operation stage that provides both color blend and alpha blend operations,
    wherein said texture coordinate processor interleaves the processing of direct and indirect texture coordinates.

2. The pipeline of claim 1 wherein an output of the shader can be recirculated to provide n blending stages.

3. The pipeline of claim 1 wherein recirculation of said shader output allows shade tree type combining operations.

4. The pipeline of claim 1 wherein the pipeline includes a recirculating texture unit coupled to the shader, and wherein said shader blends a texture output previously provided by the recirculating texture unit while the recirculating texture unit performs a further texture mapping operation to provide a further texture output for blending by the shader.

5. The pipeline of claim 1 wherein the shader includes a programmable clamper.

6. The pipeline of claim 1 wherein the shader includes a programmable scaler.

7. The pipeline of claim 1 wherein the shader includes a comparator.

8. The pipeline of claim 1 wherein the shader includes a programmable color swap.

9. The pipeline of claim 1 wherein an output of the shader is made available as an input for a plurality of subsequent blending operations.

10. The pipeline of claim 1 wherein the shader includes separate blending circuits for performing both color blend and alpha blend operations during a same blending operation stage.

11. The pipeline of claim 1 wherein the shader includes a feedback mechanism for providing an output to an input of said shader.

12. The pipeline of claim 11 wherein said feedback mechanism includes one or more storage buffers for retaining an output from a blending operation and at least one of said buffers has an output connected to an input of said shader.

13. In a graphics system, a multi-texturing method comprising:
(a) passing texture mapping data through a component combining arrangement to provide combined textured component outputs;
(b) reconfiguring the component combining arrangement; and
(c) passing said combined textured component outputs through the reconfigured but same component combining arrangement providing both color blend and alpha blend operations to generate combined multi-textured component outputs,
wherein said texture coordinate processor interleaves the processing of direct and indirect texture coordinates.

14. The method of claim 13 wherein said steps (b) and (c) are repeated plural times.

15. The method of claim 13 wherein the component combining arrangement includes a texture color combiner and an alpha combiner.

16. A method for providing multi-textured polygons comprising:
(a) processing) texture coordinates;
(b) generating first texture mapping data;
(c) passing the first texture mapping data through combiner hardware providing both color blend and alpha blend operations to provide a first output corresponding to the first texture mapping data;
(d) generating second texture mapping data; and
(e) passing the second texture mapping data and the first output through the combiner hardware to provide a second output corresponding to the first and second texture mapping data,
wherein said generating step (a) interleaves the processing of direct and indirect texture coordinates.

17. The method of claim 16 wherein step (b) is performed during a blending stage, and step (e) is performed during a further blending stage that is later than the first-mentioned blending stage.

18. The method of claim 16 wherein the combiner hardware provides more than ten successive stages of texture mapping data blending.

19. In a graphics rendering pipeline including at least one texture coordinate address unit and a texture environment unit including combiner circuits, an improvement comprising iteratively reusing the combiner circuits to provide multiple stages that apply multiple textures to a surface displayed within an image, wherein said multiple stages each provide both color blend and alpha blend operations, wherein said texture coordinate address unit interleaves the processing of direct and indirect texture coordinates.

20. The method of claim 19 wherein the iteratively reusing step includes using the combiner circuits to combine first texel colors during a first blending cycle/stage, and using the same combiner circuits to combine second texel colors using a second blending cycle/stage different from the first cycle/stage, the first and second cycles/stages both falling within a period for generating a single image frame.

21. The method of claim 19 where the first and second cycles/stages are consecutive.

22. The method of claim 19 wherein the combiner circuits include independent color combiner circuits and alpha combiner circuits.

23. In a graphics rendering pipeline including at least one texture mapping unit and a texture environment unit including combiner circuits, an improvement comprising iteratively reusing the combiner circuits to provide multiple stages that apply multiple textures to a surface displayed within an image, wherein the combiner circuits compute $$(D+(-1)^{sub}*((1-c)*A+C*B)+\text{bias})<<\text{shift}$$

where A, B, C and D are selected from four current-color registers, rasterized color, texture, alpha components, 0 and 1.

24. In a graphics system including a processing pipeline that renders and displays images at least in part in response to polygon vertex data and texture data stored in an associated memory, a multitexture processing subsystem for selectively mapping texture data corresponding to one or more different textures and/or texture characteristics to surfaces of said rendered and displayed images, said multitexture processing subsystem comprising:
a recirculating texture unit including a texture coordinate processor, a texture mapper and a texture data feedback path that recirculates selected texture-mapped data from the texture mapper back to the texture coordinate processor; and
a color/alpha-component blending unit configured within the pipeline to combine texture, rasterized color and alpha component data to produce a computed color and a computed alpha and having a feedback mechanism that enables reintroduction of the computed color and computed alpha into the pipeline, wherein a processing of multiple textures is achieved by an iterative use/reuse of the blending unit
wherein said texture coordinate processor interleaves the processing of direct and indirect texture coordinates.

25. A multitexture processing subsystem as in claim 24 wherein the blending unit comprises at least one multiplier and one adder and is configured to accept up to four input arguments for performing blending operations.

26. In a graphics system including a processing pipeline that renders and displays images at least in part in response to polygon vertex data and texture data stored in an associated memory, a multitexture processing subsystem for selectively mapping texture data corresponding to one or more different textures and/or texture characteristics to surfaces of said rendered and displayed images, said multitexture processing subsystem comprising:
a recirculating texture Unit including a texture coordinate processor, a texture mapper and a texture data feedback path that recirculates selected texture-mapped data from the texture mapper back to the texture coordinate processor; and a texture environment unit configured within the pipeline to process input texture, color and alpha data during a predetermined processing stage to accomplish a blending and/or mixing of textures and/or colors and alpha data, said texture environment unit including a color/alpha data blending unit having a feedback mechanism operable during selected temporal processing stages wherein an output of a current processing stage is made available as an input to a subsequent processing stage, wherein said texture environment unit provides both color blend and alpha blend operations in a same blending operation stage, wherein said texture coordinate processor interleaves the processing of direct and indirect texture coordinates.

27. A multitexture processing subsystem as in claim 26 wherein the blending unit is connected to at least one storage register for making an output of a current processing stage available as an input to a subsequent temporal processing stage.

28. A multitexture processing subsystem as in claim 26 wherein the texture environment unit accommodates up to sixteen successive temporal processing stages.

29. A multitexture processing subsystem as in claim 26 wherein the feedback mechanism comprises a plurality of storage registers.

30. A multitexture processing subsystem as in claim 26 wherein the blending unit comprises at least one multiplier and one adder and is configured to accept up to four input arguments for performing blending operations.

31. In a graphics system including a processing pipeline that renders and displays images at least in part in response to polygon vertex data and texture data stored in an associated memory, a multitexture processing subsystem for selectively mapping texture data corresponding to one or more different textures and/or texture characteristics to surfaces of said rendered and displayed images, said multitexture processing subsystem comprising:

a recirculating texture unit including a texture coordinate processor, a texture mapper and a texture data feedback path that recirculates selected texture-mapped data from the texture mapper back to the texture coordinate processor; and a texture environment unit configured within the pipeline to process input texture and rasterized color data to provide independent mathematical blending operations on input texture and rasterized color data during a predetermined temporal processing cycle/stage, said texture environment unit including a feedback mechanism operated during selected temporal processing cycles/stages wherein an output of a current temporal processing cycle/stage is made available as an input to a subsequent temporal processing cycle/stage, wherein said cycle/stage provides both color blend and alpha blend operations, wherein said texture coordinate processor interleaves the processing of direct and indirect texture coordinates.

32. A multitexture processing subsystem as in claim 31 wherein the input texture and rasterized color data comprises RGB and Alpha data.

33. A multitexture processing subsystem as in claim 31 wherein an output of a texture environment unit temporal processing cycle/stage is available as an input to a subsequent texture environment temporal processing stage.

34. A multitexture processing subsystem as in claim 31 wherein the texture environment unit may accommodate up to sixteen successive temporal processing stages.

35. A multitexture processing subsystem as in claim 31 wherein the texture environment unit further comprises a blending unit having at least one multiplier and one adder.

36. A multitexture processing subsystem as in claim 31 wherein the blending unit is configured to accept up to four input arguments for performing blending operations.

37. In a graphics system including a processing pipeline that renders and displays images at least in part in response to polygon vertex data and texture data stored in an associated memory, a texture processing subsystem for selectively mapping texture data corresponding to one or more different textures and/or texture characteristics to surfaces of said rendered and displayed images, and a texture environment unit for processing input texture and rasterized color data to provide independent mathematical blending operations on said input texture and rasterized color data, a method for processing multiple textures comprising the steps of:

(a) processing texture coordinates;

(b) performing blending operations on a first set of texture and rasterized color data during a first texture environment unit temporal processing cycle/stage; and (c) providing an output of said first temporal processing cycle/stage as an input to a subsequent texture environment unit temporal processing cycle/stage, wherein said at least one of said first and subsequent cycles/stages provides both color blend and alpha blend operations, and wherein said texture coordinate processing step (a) interleaves the processing of direct and indirect texture coordinates.

38. A method for processing multiple textures as in claim 37 wherein an output from up to sixteen successive texture environment temporal processing stages may be provided as an input to a subsequent texture environment unit temporal processing cycle/stage.

39. A method for processing multiple textures as in claim 37 wherein input texture and rasterized color data comprise RGB and Alpha data.

40. A multitexture processing subsystem as in claim 26 wherein an output of a current processing stage is made available as an input to a plurality of subsequent processing stages.

41. In a graphics system including a multitexture processing subsystem for selectively sampling texture data corresponding to one or more different textures and/or texture characteristics, said system comprising:

a recirculating texture unit including a texture coordinate processor a texture mapper and a texture data feedback path that recirculates selected texture-mapped data from the texture mapper back to the texture coordinate processor; and a hardware shader for performing shading/blending operations that receives a first texture data sample and a subsequent texture data sample from said texture unit and recirculates an output from a shading/blending operation performed using the first texture data sample to an input of said shader for performing a shading/blending operation using the subsequent texture data sample and the output from the shading/blending operation performed on the first texture data sample, said shader shading/blending providing both color blend and alpha blend operations, wherein said texture coordinate processor interleaves the processing of direct and indirect texture coordinates.

42. A graphics pipeline including a multitexture processing subsystem that sequentially provides samples of multiple textures to a hardware shader that performs blending/shading operations on texture sample outputs of the multitexture processing subsystem, wherein the system includes a texture coordinate processor and wherein said hardware shader recirculates a resulting output of a blending/shading operation for performing a subsequent blending/shading operation of said resulting output with a subsequent texture sample output, wherein said shader blending/shading operations provide both color blend and alpha blend operations, said texture coordinate processor interleaving the processing of direct and indirect texture coordinates.

43. A graphics processing pipeline that renders and displays images at least in part in response to polygon vertex data and texture data, comprising:

a recirculating texturing pipeline arrangement having a single texture address coordinate/data processing unit, a single texture retrieval unit, and a texture lookup data feedback path for recirculating selected retrieved texture lookup data from the texture retrieval unit back to the texture address coordinate/data processing unit; and a recirculating shade-tree alpha/color blender arrangement having a hardware shader connected to receive an output of the texture retrieval unit and a feedback path from an output of the hardware shader to an input of the shader for recirculating selected blended color or opacity output data, wherein the recirculating arrangement blends selected shader inputs to provide an output that is fed back for use as an input to the shader for a subsequent blending operation, wherein said alpha/color blender arrangement provides both color blend and alpha blend operations, and wherein the texture address coordinate/data precessing unit interleaves the processing of direct and indirect texture coordinates.

44. A graphics processing pipeline that renders and displays images at least in part in response to polygon vertex data and texture data, comprising:

a recirculating texturing pipeline arrangement having a single texture address coordinate/data processing unit, a single texture retrieval unit, and a texture lookup data feedback path for recirculating selected retrieved texture lookup data from the texture retrieval unit back to the texture address coordinate/data processing unit; and a recirculating shade-tree alpha/color blender arrangement having a hardware shader connected to receive an output of the texture retrieval unit and a feedback path from an output of the hardware shader to an input of the shader for recirculating selected blended color or opacity output data, wherein the recirculating arrangement blends selected shader inputs to provide an output that is fed back for use as an input to the shader for a subsequent blending operation, wherein said single texture address coordinate/data processing unit interleaves the processing of logical direct and indirect texture coordinate data.

45. In a graphics system, a multitexture processing subsystem comprising:

a texturing arrangement having a single texture address coordinate/data processing unit, a single texture retrieval unit, and a texture lookup data feedback path for recirculating retrieved indirect texture lookup data from a single texture retrieval unit back to the texture address coordinate/data processing unit; and a recirculating hardware shader connected to receive an output of the texture retrieval unit, wherein the shader blends selected received outputs to provide a calculated color or opacity output that is selectively fed back for use as an input to the shader for a subsequent blending operation, wherein said hardware shader provides both color blend and alpha blend operations, and wherein the texture address coordinate/data processing unit interleaves the processing of direct and indirect texture coordinates.

46. In a graphics system, a multitexture processing subsystem comprising:

a texturing arrangement having a single texture address coordinate/data processing unit, a single texture retrieval unit, and a texture lookup data feedback path for recirculating retrieved indirect texture lookup data from a single texture retrieval unit back to the texture address coordinate/data processing unit; and a recirculating hardware shader connected to receive an output of the texture retrieval unit, wherein the shader blends selected received outputs to provide a calculated color or opacity output that is selectively fed back for use as an input to the shader for a subsequent blending operation, wherein said single texture address coordinate/data processing unit interleaves the processing of logical direct and indirect texture coordinate data.

47. A graphics processing pipeline that renders images based at least in part on polygon and texture data, comprising:

a recirculating texture unit including a texture coordinate processor, a texture mapper and a texture data feedback path that recirculates selected texture-mapped data from the texture mapper back to the texture coordinate processor; and a recirculating shade-tree blender arrangement having shader inputs coupled to the recirculating texture unit, said recirculating shade tree blender blending selected shader inputs to provide outputs that are selectively fed back to said shader inputs for subsequent blender operations, wherein said texture coordinate processor interleaves the processing of direct and indirect texture coordinates.

* * * * *